US009190698B2

(12) United States Patent
Smart et al.

(10) Patent No.: US 9,190,698 B2
(45) Date of Patent: Nov. 17, 2015

(54) LITHIUM-ION ELECTROLYTES WITH IMPROVED SAFETY TOLERANCE TO HIGH VOLTAGE SYSTEMS

(75) Inventors: Marshall C. Smart, Studio City, CA (US); Ratnakumar V. Bugga, Arcadia, CA (US); Surya G. Prakash, Hacienda Heights, CA (US); Frederick C. Krause, Los Angeles, CA (US)

(73) Assignees: CALIFORNIA INSTITUTE OF TECHNOLOGY, Pasadena, CA (US); UNIVERSITY OF SOUTHERN CALIFORNIA, Los Angeles, CA (US)

( * ) Notice: Subject to any disclaimer, the term of this patent is extended or adjusted under 35 U.S.C. 154(b) by 492 days.

(21) Appl. No.: 13/396,322

(22) Filed: Feb. 14, 2012

(65) Prior Publication Data

US 2012/0141883 A1 Jun. 7, 2012

Related U.S. Application Data

(63) Continuation-in-part of application No. 12/543,495, filed on Aug. 18, 2009, now Pat. No. 8,795,903.

(60) Provisional application No. 61/442,428, filed on Feb. 14, 2011, provisional application No. 61/189,415, filed on Aug. 19, 2008, provisional application No. 61/201,842, filed on Dec. 16, 2008.

(51) Int. Cl.
*H01M 10/0567* (2010.01)
*H01M 6/16* (2006.01)
(Continued)

(52) U.S. Cl.
CPC .......... *H01M 10/0567* (2013.01); *H01M 6/164* (2013.01); *H01M 6/166* (2013.01);
(Continued)

(58) Field of Classification Search
CPC ..................... H01M 10/0569; H01M 10/0567; H01M 10/0568; H01M 6/164; H01M 6/168; H01M 6/166; H01M 6/24; H01M 2300/0037; H01M 2300/004; H01M 2300/0051; H01M 2300/0042; Y02E 60/122
USPC ................. 429/332, 330, 199, 200, 307, 323; 252/62.2
See application file for complete search history.

(56) References Cited

U.S. PATENT DOCUMENTS 8,795,903 B2 * 8/2014 Smart et al. .................. 429/332
2010/0047695 A1 2/2010 Smart et al.
(Continued)

FOREIGN PATENT DOCUMENTS

CN 101826635 * 9/2010

OTHER PUBLICATIONS

Nguyen, C.C., et al. "Characterization of SEI Layer Formed on High Performance Si-Cu Anode in Ionic Liquid Battery Electrolyte." *Electrochemistry Communications*, vol. 12(11), pp. 1593-1595. Nov. 2010.
(Continued)

*Primary Examiner* — Laura Weiner
(74) *Attorney, Agent, or Firm* — Steinfl & Bruno LLP

(57) ABSTRACT

The invention discloses various embodiments of electrolytes for use in lithium-ion batteries, the electrolytes having improved safety and the ability to operate with high capacity anodes and high voltage cathodes. In one embodiment there is provided an electrolyte for use in a lithium-ion battery comprising an anode and a high voltage cathode. The electrolyte has a mixture of a cyclic carbonate of ethylene carbonate (EC) or mono-fluoroethylene carbonate (FEC) co-solvent, ethyl methyl carbonate (EMC), a flame retardant additive, a lithium salt, and an electrolyte additive that improves compatibility and performance of the lithium-ion battery with a high voltage cathode. The lithium-ion battery is charged to a voltage in a range of from about 2.0 V (Volts) to about 5.0 V (Volts).

13 Claims, 59 Drawing Sheets

TRIPHENYL PHOSPHATE

(51) Int. Cl.
*H01M 10/0568* (2010.01)
*H01M 10/0569* (2010.01)

(52) U.S. Cl.
CPC ......... *H01M 6/168* (2013.01); *H01M 10/0568* (2013.01); *H01M 10/0569* (2013.01); *H01M 2300/004* (2013.01); *H01M 2300/0037* (2013.01); *H01M 2300/0042* (2013.01); *Y02E 60/122* (2013.01)

(56) References Cited

U.S. PATENT DOCUMENTS

2012/0060360 A1* 3/2012 Liu .............................. 29/623.2
2012/0141883 A1 6/2012 Smart et al.

OTHER PUBLICATIONS

Nakai, H. et al. "Investigation of the Solid Electrolyte Interphase Formed by Fluoroethylene Carbonate on Si Electrodes." *Journal of the Electrochemical Society*, vol. 158(7), A798-A810. 2011.

Li, M.Q., et al. "Electrochemical Performance of Si/Graphite/Carbon Composite Electrode in Mixed Electrolytes Containing LiBOB and LiPF6." *Journal of the Electrochemical Society*, vol. 156(4), A294-A298. 2009.

Han, G.B., et al. "Tris(pentafluorophenyl) borane as an Electrolyte Additive for High Performance Silicon Thin Film Electrodes in Lithium Ion Batteries", *Electrochimica Acta*, vol. 56(24), pp. 8997-9003. 2011.

Han, G.B., et al. "Effect of succinic anhydride as an electrolyte additive on electrochemical characteristics of silicon thin-film electrode", *Journal of Power Sources*, vol. 195(11), pp. 3709-3714. 2010.

Chen, L. et al. "Enhancing electrochemical performance of silicon film anode by vinylene carbonate electrolyte additive", *Electrochemical and Solid State Letters*, vol. 9(11), A512-A515. 2006.

Smart, M.C., et al. "Li-Ion electrolytes containing flame retardant additives for increased safety characteristics." New Technology Report NP0-46262. May 29, 2008. 8 pgs.

Smart, M.C. et al., "Optimized Li-ion electrolytes containing triphenyl phosphate as a flame retardant additive." NASA Tech Briefs, pp. 16. May 2011.

Smart, M.C., et al. "The Evaluation of Triphenyl Phosphate as a Flame Retardant Additive to improve the Safety of Lithium-ion Battery Electrolytes." *ECS Transactions*, vol. 35(13), 2011. 11 pgs.

Smart, M.C., et al. "Electrolytes for Low Temperature Lithium-Ion Batteries Based on Mixtures of Aliphatic Carbonates." *J. Electrochem. Soc.*, vol. 146(2), pp. 486-492. 1999.

Smart, M.C., et al. "Life Verification of Large Capacity Yardney Li-ion Cells and Batteries in Support of NASA Missions." Int. J. Energy Res, vol. 34, pp. 116-134. 2010.

Dalavi, S., et al. "Nonflammable Electrolytes for Lithium-Ion Batteries Containing Dimethyl Methlyphosphonate." Electrochem. Soc., vol. 157, A1113-A1120. 2010.

Li, L.F., et al. "A pentafluorophenylboron oxalate additive in non-aqueous electrolytes for lithium batteries." Electrochemistry Communications, vol. 11, pp. 2296-2299. 2009.

Li, M., et al. "Electrochemical Performance of Si/Graphite/Carbon Composite Electrode in Mixed Electrolytes Containing LiBOB and $LiPF_6$" Journal of the Electrochemical Society, vol. 156(4), pp. A294-298. 2009.

Heim, I. "Specialty Additives—Innovative flame retardancy for plastics and rubber." Martinswerk GmbH, ALBEMARLE, Dec. 7, 2006. 70 pgs.

* cited by examiner

Charge-discharge characteristics of experimental lithium-ion cells containing various electrolytes subjected to formation cycling

Fig. 1

| ELECTROLYTE TYPE | CHARGE CAPACITY (Ah) 1ST CYCLE | DISCHARGE CAPACITY (AH) 1ST CYCLE | IRREVERSIBLE CAPACITY (1ST CYCLE) | COULOUMBIC EFFICIENCY (1ST CYCLE) | CHARGE CAPACITY (Ah) 5TH CYCLE | REVERSIBLE CAPACITY (Ah) 5TH CYCLE | CUMULATIVE IRREVERSIBLE CAPACITY (1ST-5TH CYCLE) | COULOUMBIC EFFICIENCY (5TH CYCLE) |
|---|---|---|---|---|---|---|---|---|
| 1.0 M LiPF6 EC+EMC (20:80 v/v %) | 0.4216 | 0.3334 | 0.088 | 79.08 | 0.3341 | 0.3266 | 0.1241 | 97.76 |
| 1.0 M LiPF6 EC+EMC (20:80 v/v %) | 0.46816 | 0.40443 | 0.064 | 86.39 | 0.40126 | 0.39136 | 0.1136 | 97.53 |
| 1.0 M LiPF6 EC+DEC+DMC (1:1:1 v/v %) | 0.47882 | 0.41059 | 0.068 | 85.75 | 0.41169 | 0.39789 | 0.1313 | 96.65 |
| 1.0 M LiPF6 EC+EMC+TFEB (20:60:20 v/v %) | 0.51793 | 0.44202 | 0.076 | 85.34 | 0.43826 | 0.43123 | 0.1140 | 98.40 |
| 1.0 M LiPF6 EC+EMC+TFEB+TPP (20:55:20:5 v/v %) | 0.48152 | 0.41348 | 0.068 | 85.87 | 0.40638 | 0.39901 | 0.1045 | 98.19 |
| 1.0 M LiPF6 EC+EMC+TFEB+TBP (20:55:20:5 v/v %) | 0.48621 | 0.40535 | 0.081 | 83.37 | 0.40872 | 0.39525 | 0.1393 | 96.70 |
| 1.0 M LiPF6 EC+EMC+TFEB+TEP (20:55:20:5 v/v %) | 0.46896 | 0.38857 | 0.080 | 82.86 | 0.39595 | 0.38401 | 0.1340 | 96.98 |
| 1.0 M LiPF6 EC+EMC+TFEB+BTFEMP (20:55:20:5 v/v %) | 0.48073 | 0.39720 | 0.084 | 82.62 | 0.39859 | 0.38546 | 0.1476 | 96.71 |

Fig. 2

Summary of the Discharge Capacity at Low Temperature for MCMB-LiNiCoO$_2$ containing Electrolytes with Flame Retardant Additives

| ELECTROLYTE TYPE | | 1.00 M LiPF6 EC+EMC+TFEB (20:60:20 v/v %) | | 1.0 M LiPF6 EC+EMC+TFEB+TPhPh (20:55:20:5 v/v %) | | 1.0 M LiPF6 EC+EMC+TFEB+TBuPh (20:55:20:5 v/v %) | | 1.0 M LiPF6 EC+EMC+TFEB+TEtPh (20:55:20:5 v/v %) | | 1.0 M LiPF6 EC+EMC+TFEB+TFMPo (20:55:20:5 v/v %) | |
|---|---|---|---|---|---|---|---|---|---|---|---|
| TEMP. (°C) | DISCHARGE CURRENT (mA) | CAPACITY (Ah) | PERCENT (%) | CAPACITY (Ah) | PERCENT (%) | CAPACITY (Ah) | PERCENT (%) | CAPACITY (Ah) | PERCENT (%) | CAPACITY (Ah) | PERCENT (%) |
| 23° | 25 | 0.4312 | 100.00 | 0.3990 | 100.00 | 0.3953 | 100.00 | 0.3840 | 100.00 | 0.3855 | 100.00 |
| 0° | 25 | * | * | 0.3012 | 75.50 | 0.2898 | 73.32 | 0.2553 | 66.48 | 0.2867 | 74.37 |
| -20° | 25 | 0.3718 | 86.22 | 0.2583 | 64.73 | 0.2708 | 68.51 | 0.2218 | 57.75 | 0.2469 | 64.05 |
| | 50 | 0.3528 | 81.81 | 0.2290 | 57.38 | 0.0416 | 10.51 | 0.1681 | 43.77 | 0.1810 | 46.95 |
| | 100 | * | * | 0.1244 | 31.19 | 0.1141 | 28.87 | 0.0625 | 16.28 | 0.0532 | 13.80 |
| -30° | 25 | * | * | 0.1432 | 35.88 | 0.2022 | 51.15 | 0.0626 | 16.31 | 0.1461 | 37.90 |
| -40° | 25 | 0.3166 | 73.42 | 0.0789 | 19.76 | 0.0879 | 22.25 | 0.2023 | 52.67 | 0.0894 | 23.20 |
| | 50 | 0.2631 | 61.01 | 0.0366 | 9.17 | 0.0416 | 10.51 | 0.0472 | 12.30 | 0.0389 | 10.09 |
| | 100 | * | * | 0.0245 | 6.13 | 0.0288 | 7.30 | 0.0305 | 7.94 | 0.0259 | 6.73 |
| -50° | 25 | 0.2024 | 46.94 | 0.0253 | 6.34 | 0.0301 | 7.61 | 0.0281 | 7.31 | 0.0271 | 7.03 |
| | 50 | 0.0324 | 7.51 | 0.0004 | 0.09 | 0.0201 | 5.09 | 0.0208 | 5.42 | 0.0195 | 5.05 |
| -60° | 5 | 0.2723 | 63.14 | 0.0660 | 16.54 | 0.1206 | 30.52 | 0.0590 | 15.35 | 0.0518 | 13.43 |
| | 10 | 0.1918 | 44.48 | 0.0008 | 0.19 | 0.0074 | 1.87 | 0.0051 | 1.34 | 0.0042 | 1.10 |
| | 25 | 0.0209 | 4.85 | 0.0004 | 0.09 | 0.0063 | 1.60 | 0.0099 | 2.58 | 0.0079 | 2.05 |

Discharge capacity at -20°C (expressed as percent of room temperature capacity) of MCMB-$LiNiCoO_2$ cells containing electrolytes with Flame Retardant Additives

Cycle life performance of MCMB-$LiNiCoO_2$ cell containing electrolytes with Flame Retardant Additives

TRIPHENYL PHOSPHATE

TRIBUTYL PHOSPHATE

TRIETHYL PHOSPHATE

BIS (2,2,2-TRIFLUOROETHYL)
METHYL PHOSPHONATE

TRIS (2,2,2-TRIFLUOROETHYL) PHOSPHATE

TRIS (2,2,2-TRIFLUOROETHYL) PHOSPHITE

TRIPHENYLPHOSPHITE

DIETHYL PHENYLPHOSPHONATE

DIETHYL ETHYLPHOSPHONATE

Fig. 6

Charge-discharge characteristics of experimental MCMB-$LiNiCoO_2$ cells containing electrolytes with Flame Retardant Additives subjected to formation cycling

| ELECTROLYTE TYPE | CHARGE CAPACITY (Ah) 1ST CYCLE | DISCHARGE CAPACITY (Ah) 1ST CYCLE | IRREVERSIBLE CAPACITY (1ST CYCLE) | COULOUMBIC EFFICIENCY (1ST CYCLE) | CHARGE CAPACITY (Ah) 5TH CYCLE | REVERSIBLE CAPACITY (Ah) 5TH CYCLE | CUMULATIVE IRREVERSIBLE CAPACITY (1ST-5TH CYCLE) | COULOUMBIC EFFICIENCY (5TH CYCLE) |
|---|---|---|---|---|---|---|---|---|
| 1.0 M LiPF6 EC+EMC+TFPa (20:75:5 v/v %) | 0.5267 | 0.3944 | 0.1323 | 74.88 | 0.4312 | 0.3870 | 0.3419 | 89.76 |
| 1.0 M LiPF6 EC+EMC+TFPi (20:75:5 v/v %) | 0.4949 | 0.4195 | 0.0754 | 84.76 | 0.4224 | 0.4097 | 0.1353 | 96.99 |
| 1.0 M LiPF6 EC+EMC+TPPi (20:75:5 v/v %) | 0.4726 | 0.3982 | 0.0744 | 84.26 | 0.4130 | 0.4022 | 0.1283 | 97.37 |
| 1.0 M LiPF6 EC+EMC+DEP (20:75:5 v/v %) | 0.4713 | 0.4151 | 0.0563 | 88.06 | 0.4001 | 0.3987 | 0.0703 | 99.65 |
| 1.0 M LiPF6 EC+EMC+DPP (20:75:5 v/v %) | 0.4632 | 0.3960 | 0.0672 | 85.49 | 0.3924 | 0.3862 | 0.1027 | 98.40 |

Fifth discharge of formation cycling for cells containing Flame Retardant Additives. Discharge at 25 mA at room temperature.

Fig. 8

Summary of the discharge capacity at low temperature of a number of MCMB-$LiNiCoO_2$ cells containing electrolytes with Flame Retardant Additives.

| ELECTROLYTE TYPE | | FLAME RETARDANT ADDITIVES: 1.0 M LiPF6 EC+EMC+TFPa (20:75:5 v/v %) #2 | | 1.0 M LiPF6 EC+EMC+TFPi (20:75:5 v/v %) | | 1.0 M LiPF6 EC+EMC+TPPi (20:75:5 v/v %) | | 1.0 M LiPF6 EC+EMC+DEP (20:75:5 v/v %) | | 1.0 M LiPF6 EC+EMC+DPP (20:75:5 v/v %) | |
|---|---|---|---|---|---|---|---|---|---|---|---|
| TEMP. (°C) | DISCHARGE CURRENT (mA) | CAPACITY (Ah) | PERCENT (%) | CAPACITY (Ah) | PERCENT (%) | CAPACITY (Ah) | PERCENT (%) | CAPACITY (Ah) | PERCENT (%) | CAPACITY (Ah) | PERCENT (%) |
| 23° | 25 | 0.3918 | 100.00 | 0.3991 | 100.00 | 0.4007 | 100.00 | 0.3770 | 100.00 | 0.3756 | 100.00 |
| 0° | 25 | 0.3617 | 92.31 | 0.3656 | 91.62 | 0.3477 | 86.78 | 0.3450 | 91.52 | 0.3466 | 92.30 |
| -20° | 25 | 0.3295 | 84.10 | 0.3449 | 86.42 | 0.3016 | 75.28 | 0.3298 | 87.50 | 0.3249 | 86.52 |
| | 50 | 0.3152 | 80.45 | 0.3301 | 82.71 | 0.2785 | 69.51 | 0.3164 | 83.94 | 0.3114 | 82.92 |
| | 100 | 0.2891 | 73.78 | 0.2998 | 75.11 | 0.2398 | 59.84 | 0.2949 | 78.23 | 0.2878 | 76.63 |
| -30° | 25 | 0.2980 | 76.06 | 0.3166 | 79.32 | 0.2617 | 65.31 | 0.3071 | 81.47 | 0.2998 | 79.83 |
| -40° | 25 | 0.2846 | 72.65 | 0.2908 | 72.87 | 0.2276 | 56.81 | 0.2916 | 77.34 | 0.2753 | 73.29 |
| | 50 | 0.1873 | 47.80 | 0.2083 | 52.21 | 0.1220 | 30.44 | 0.2250 | 59.68 | 0.1986 | 52.88 |
| | 100 | 0.0385 | 9.83 | 0.0647 | 16.21 | 0.0268 | 6.69 | 0.0920 | 24.41 | 0.0682 | 18.15 |
| -50° | 25 | 0.0649 | 16.56 | 0.1080 | 27.06 | 0.0450 | 11.23 | 0.1465 | 38.86 | 0.0926 | 24.66 |
| | 50 | 0.0098 | 2.51 | 0.0165 | 4.13 | 0.0091 | 2.27 | 0.0200 | 5.29 | 0.0139 | 3.70 |
| -60° | 5 | 0.0922 | 23.52 | 0.1919 | 48.10 | 0.0481 | 12.02 | 0.2153 | 57.12 | 0.1602 | 42.66 |
| | 10 | 0.0076 | 1.94 | 0.0170 | 4.25 | 0.0073 | 1.81 | 0.0543 | 14.40 | 0.0122 | 3.26 |

Discharge capacity at -20°C (expressed as percent of room temperature capacity) of MCMB-LiNiCoO$_2$ cells containing electrolytes with Flame Retardant Additives

Discharge capacity at -40°C (expressed as percent of room temperature capacity) of MCMB-LiNiCoO$_2$ cells containing electrolytes with Flame Retardant Additives

Cycle life performance of MCMB-LiNiCo$O_2$ cells containing electrolytes with Flame Retardant Additives

Fig. 12

Formation Characteristics of Electrolytes with Flame Retardant Additives and Fluoroester

| ELECTROLYTE TYPE | CHARGE CAPACITY (Ah) 1ST CYCLE | DISCHARGE CAPACITY (Ah) 1ST CYCLE | IRREVERSIBLE CAPACITY (1ST CYCLE) | COULOUMBIC EFFICIENCY (1ST CYCLE) | CHARGE CAPACITY (Ah) 5TH CYCLE | REVERSIBLE CAPACITY (Ah) 5TH CYCLE | CUMULATIVE IRREVERSIBLE CAPACITY (1ST-5TH CYCLE) | COULOUMBIC EFFICIENCY (5TH CYCLE) |
|---|---|---|---|---|---|---|---|---|
| 1.0 M LiPF6 EC+EMC+TFEB (20:60:20 v/v %) | 0.5179312 | 0.44202 | 0.07591 | 85.34 | 0.4382585 | 0.4312333 | 0.11402 | 98.40 |
| 1.0 M LiPF6 EC+EMC+TFEB+TPhPh (20:55:20:5 v/v %) | 0.4815 | 0.4134756 | 0.0680 | 85.87 | 0.4063783 | 0.3990103 | 0.1045 | 98.19 |
| 1.0 M LiPF6 EC+EMC+TFEB+TBuPh (20:55:20:5 v/v %) | 0.4862076 | 0.4053501 | 0.08086 | 83.37 | 0.4087209 | 0.3952519 | 0.1393 | 96.70 |
| 1.0 M LiPF6 EC+EMC+TFEB+TEtPh (20:55:20:5 v/v %) | 0.4689576 | 0.388573 | 0.08038 | 82.86 | 0.3959548 | 0.3840084 | 0.1340 | 96.98 |
| 1.0 M LiPF6 EC+EMC+TFEB+TFMPo (20:55:20:5 v/v %) | 0.4807283 | 0.3971957 | 0.08353 | 82.62 | 0.3985919 | 0.38546 | 0.1476 | 96.71 |

Cycle Life of Electrolytes with Flame Retardant Additives and Fluoroester

Fig. 14

Electrochemical Impedance Spectroscopy (EIS) Measurements for Cathodes in Contact with Electrolytes with Flame Retardant Additives and Fluoroesters

| ELECTROLYTE TYPE | | | 1.0 M LiPF6 EC+EMC+TFEB (20:60:20 v/v %) | | 1.0 M LiPF6 EC+EMC+TFEB+TPhPh (20:55:20:5 v/v %) | | 1.0 M LiPF6 EC+EMC+TFEB+TBuPh (20:55:20:5 v/v %) | | 1.0 M LIiPF6 EC+EMC+TFEB+TEtPh (20:55:20:5 v/v %) | | 1.0 M LiPF6 EC+EMC+TFEB+TFMPo (20:55:20:5 v/v %) | |
|---|---|---|---|---|---|---|---|---|---|---|---|---|
| TEMP. (°C) | | IMPEDANCE (Ohms) | EQUIVALENT CIRCUIT | IMPEDANCE (Ohms) | EQUIVALENT CIRCUIT | IMPEDANCE (Ohms) | EQUIVALENT CIRCUIT | IMPEDANCE (Ohms) | EQUIVALENT CIRCUIT | IMPEDANCE (Ohms) | EQUIVALENT CIRCUIT | IMPEDANCE (Ohms) |
| ROOM TEMP | CATHODE | Rs | R(CR)(CR) | 0.1473 | R(CR)(C(Rw)) | 0.2101 | R(CR)(C(Rw)) | 0.2206 | R(CR)(C(Rw)) | 0.2806 | R(CR)(C(Rw)) | 0.1907 |
| | | Rf | | 0.2054 | | 0.09887 | | 0.1303 | | 0.1447 | | 0.08046 |
| | | Rct | | 0.03208 | | 0.0381 | | 0.02144 | | 0.01459 | | 0.01671 |
| 0° | CATHODE | Rs | R(CR)(CR) | 0.1578 | R(CR)(C(Rw)) | 0.2125 | R(CR)(C(Rw)) | 0.2355 | R(CR)(C(Rw)) | 0.279 | R(CR)(CR) | 0.2203 |
| | | Rf | | 0.3627 | | 0.1013 | | 0.165 | | 0.1586 | | 0.1576 |
| | | Rct | | 0.304 | | 0.1634 | | 0.3078 | | 0.2648 | | 0.3891 |
| -20° | CATHODE | Rf | R(CR)(CR) | 0.2451 | R(CR)(C(Rw)) | 0.3942 | R(CR)(C(Rw)) | 0.3382 | R(CR)(C(Rw)) | 0.3214 | R(CR)(CR) | 0.3197 |
| | | Rs | | 0.3963 | | 0.2356 | | 0.1518 | | 0.1211 | | 0.1695 |
| | | Rct | | 1.822 | | 1.563 | | 1.903 | | 1.28 | | 2.424 |
| -30° | CATHODE | Rs | R(CR)(C(Rw)) | 0.3186 | R(CR)(C(Rw)) | 0.4833 | R(CR)(C(Rw)) | 0.5902 | R(CR)(C(Rw)) | 0.4213 | R(CR)(C(Rw)) | 0.4192 |
| | | Rf | | 0.1531 | | 0.20188 | | 0.2529 | | 0.2839 | | 0.2116 |
| | | Rct | | 0.2992 | | 6 | | 12.05 | | 9.176 | | 8.037 |
| -40° | CATHODE | Rs | R(CR)(C(Rw)) | 0.4405 | R(CR)(CR) | 0.9883 | R(CR)(CR) | 0.7944 | R(CR)(C(Rw)) | 0.6059 | R(CR)(CR) | 1.013 |
| | | Rf | | 0.3273 | | 1.693 | | 0.512 | | 0.1361 | | 1.189 |
| | | Rct | | 0.4389 | | 22.81 | | 33.64 | | .05846? | | 26.27 |
| -50° | CATHODE | Rs | R(CR)(C(Rw)) | 0.9402 | R(CR)(CR) | 2.008 | R(CR)(CR) | 1.697 | R(CR)(CR) | 1.372 | R(CR)(CR) | 1.793 |
| | | Rf | | 0.3305 | | 3.831 | | 2.652 | | 2.798 | | 3.673 |
| | | Rct | | 0.4702 | | 124.8 | | 88.56 | | 105.3 | | 54.38 |

Fig. 15

Electrochemical Impedance Spectroscopy (EIS) Measurements for Anodes in Contact with Electrolytes with Flame Retardant Additives and Fluoroesters

| ELECTROLYTE TYPE | | | 1.0 M LiPF6 EC+EMC+TFEB (20:60:20 v/v %) | | 1.0 M LiPF6 EC+EMC+TFEB+TPhPh (20:55:20:5 v/v %) | | 1.0 M LiPF6 EC+EMC+TFEB+TBuPh (20:55:20:5 v/v %) | | 1.0 M LiPF6 EC+EMC+TFEB+TEtPh (20:55:20:5 v/v %) | | 1.0 M LiPF6 EC+EMC+TFEB+TFMPo (20:55:20:5 v/v %) | |
|---|---|---|---|---|---|---|---|---|---|---|---|---|
| TEMPERATURE (°C) | | IMPEDANCE (Ohms) | EQUIVALENT CIRCUIT | IMPEDANCE (Ohms) | EQUIVALENT CIRCUIT | IMPEDANCE (Ohms) | EQUIVALENT CIRCUIT | IMPEDANCE (Ohms) | EQUIVALENT CIRCUIT | IMPEDANCE (Ohms) | EQUIVALENT CIRCUIT | IMPEDANCE (Ohms) |
| ROOM TEMP | ANODE | Rs | R(CR)(CR) | 0.1555 | R(CR)(C(Rw)) | 0.2118 | R(CR)(C(Rw)) | 0.2019 | R(CR)(C(Rw)) | 0.2512 | R(CR)(C(Rw)) | 0.195 |
| | | Rf | | 0.06419 | | 0.03664 | | 0.05478 | | 0.0578 | | 0.06138 |
| | | Rct | | 0.03474 | | 0.04416 | | 0.0361 | | 0.03349 | | 0.02916 |
| 0° | ANODE | Rs | R(CR)(C(Rw)) | 0.2189 | R(CR)(C(Rw)) | 0.3149 | R(CR)(C(Rw)) | 0.2855 | R(CR)(C(Rw)) | 0.347 | R(CR)(C(Rw)) | 0.2805 |
| | | Rf | | 0.08007 | | 0.2834 | | 0.1968 | | 0.182 | | 0.1383 |
| | | Rct | | 0.0753 | | 0.3895 | | 0.206 | | 0.2486 | | 0.1503 |
| -20° | ANODE | Rf | R(CR)(C(Rw)) | 0.2977 | R(CR)(CR) | 0.4223 | R(CR)(CR) | 0.4403 | R(CR)(C(Rw)) | 0.4298 | R(CR)(CR) | 0.4526 |
| | | Rs | | 0.1165 | | 0.3084 | | 0.5059 | | 0.275 | | 0.4733 |
| | | Rct | | 0.6088 | | 1.156 | | 1.586 | | 0.4817 | | 1.263 |
| -30° | ANODE | Rs | R(CR)(C(Rw)) | 0.4721 | R(CR)(CR) | 0.8177 | R(CR)(CR) | 0.646 | R(CR)(C(Rw)) | 0.5978 | R(CR)(C(Rw)) | 0.5932 |
| | | Rf | | 0.1441 | | 1.4210 | | 0.8261 | | 0.2991 | | 0.2923 |
| | | Rct | | 1.422 | | 8.6490 | | 5.773 | | 1.5 | | 1.69 |
| -40° | ANODE | Rs | R(CR)(C(Rw)) | 0.6271 | R(CR)(CR) | 1.2 | R(CR)(CR) | 0.8956 | R(CR)(C(Rw)) | 0.799 | R(CR)(C(Rw)) | 0.9303 |
| | | Rf | | 0.2882 | | 1.023 | | 1.033 | | 0.5051 | | 0.5388 |
| | | Rct | | 5.303 | | 12.58 | | 10.54 | | 4.157 | | 4.558 |
| -50° | ANODE | Rs | R(CR)(C(Rw)) | 1.389 | R(CR)(CR) | 2.987 | R(CR)(CR) | 2.17 | R(CR)(CR) | 1.702 | R(CR)(CR) | 2.239 |
| | | Rf | | 0.8344 | | 4.858 | | 2.83 | | 1.869 | | 2.009 |
| | | Rct | | 22.96 | | 68.04 | | 53.77 | | 41.19 | | 40.87 |

Tafel Polarization Measurements Performed on MCMB Anodes in contact with Electrolytes with Flame Retardant Additives and Fluoroesters

Data Obtained from MCMB-$LiNi_{0.8}Co_{0.2}O_2$ Cells containing Lithium Reference Electrodes ANODE POTENTIAL (mV vs Li+/Li)

Tafel Polarization Measurements Performed on $LiNiCoO_2$ Cathodes in contact with Electrolytes with Flame Retardant Additives and Fluoroesters Data Obtained from MCMB-$LiNiCoO_2$ Cells equipped with Lithium Reference Electrodes CATHODE POTENTIAL (V vs Li+/Li)

Fig. 18

DC Micro-Polarization Measurements for the Cathode of Cells containing Flame Retardant Additives and Fluoroester Electrolytes

| | LINEAR POLARIZATION VALUE OF CATHODE | | | | | | |
|---|---|---|---|---|---|---|---|
| ELECTROLYTE COMPOSITION | 23°C | 0°C | -10°C | -20°C | -30°C | -40°C | -50°C |
| 1.0M LiPF6 in EC:EMC:TFEB (20:60:20 v/v%) (Baseline) | 0.62 | 0.87 | * | 2.91 | 10.00 | 139.86 | 195.65 |
| 1.0M LiPF6 in EC:EMC:TFEB:TPhPh (20:55:20:5 v/v%) | 0.44 | 0.78 | 1.71 | 3.41 | 9.78 | 50.51 | 143.29 |
| 1.0M LiPF6 in EC:EMC:TFEB:TBuPh (20:55:20:5 v/v%) | 0.39 | 0.97 | 1.86 | 2.48 | 11.40 | 41.67 | 236.32 |
| 1.0M LiPF6 in EC:EMC:TFEB:TEtPh (20:55:20:5 v/v%) | 0.64 | 1.07 | 1.61 | 2.46 | 11.86 | 36.63 | 224.59 |
| 1.0M LiPF6 in EC:EMC:TFEB:TFMPo (20:55:20:5 v/v%) | 0.33 | 0.87 | 1.75 | 2.66 | 7.87 | 45.46 | 231.14 |

Fig. 19

DC Micro-Polarization Measurements for the Anode of Cells containing Flame Retardant Additives and Fluoroester Electrolytes

| | LINEAR POLARIZATION VALUE OF ANODE | | | | | | |
|---|---|---|---|---|---|---|---|
| ELECTROLYTE COMPOSITION | 23°C | 0°C | -10°C | -20°C | -30°C | -40°C | -50°C |
| 1.0M LiPF6 in EC:EMC:TFEB (20:60:20 v/v%) (Baseline) | 0.35 | 0.72 | * | 2.17 | 7.39 | 17.53 | 55.56 |
| 1.0M LiPF6 in EC:EMC:TFEB:TPhPh (20:55:20:5 v/v%) | 0.63 | 1.48 | 3.76 | 2.71 | 16.64 | 24.42 | 159.66 |
| 1.0M LiPF6 in EC:EMC:TFEB:TBuPh (20:55:20:5 v/v%) | 0.45 | 1.51 | 3.84 | 3.52 | 12.47 | 29.87 | 128.21 |
| 1.0M LiPF6 in EC:EMC:TFEB:TEtPh (20:55:20:5 v/v%) | 0.54 | 1.39 | 2.32 | 3.77 | 11.28 | 29.32 | 93.14 |
| 1.0M LiPF6 in EC:EMC:TFEB:TFMPo (20:55:20:5 v/v%) | 0.56 | 1.40 | 2.26 | 3.56 | 9.67 | 20.52 | 87.88 |

SEI Enhancing Agent

VINYLENE CARBONATE

Fig. 21

Formation Characteristics of Electrolytes with Flame Retardant Additives and SEI Enhancing Agent

| ELECTROLYTE TYPE | CHARGE CAPACITY (Ah) 1ST CYCLE | DISCHARGE CAPACITY (Ah) 1ST CYCLE | IRREVERSIBLE CAPACITY (1ST CYCLE) | COULOUMBIC EFFICIENCY (1ST CYCLE) | CHARGE CAPACITY (Ah) 5TH CYCLE | REVERSIBLE CAPACITY (Ah) 5TH CYCLE | CUMULATIVE IRREVERSIBLE CAPACITY (1ST-5TH CYCLE) | COULOUMBIC EFFICIENCY (5TH CYCLE) |
|---|---|---|---|---|---|---|---|---|
| 1.0 M LiPF6 EC+EMC (20:80 v/v %) | 0.4537 | 0.3846 | 0.0691 | 84.7700 | 0.3886 | 0.3781 | 0.1220 | 97.2862 |
| 1.0 M LiPF6 EC+EMC (20:80 v/v %) w/ 1.5% VC | 0.4696 | 0.3967 | 0.0729 | 84.4786 | 0.4001 | 0.3903 | 0.1116 | 97.5450 |
| 1.0 M LiPF6 EC+EMC+TPhPh (20:75:5 v/v %) | 0.4705 | 0.4071 | 0.0635 | 86.5096 | 0.4011 | 0.3974 | 0.0748 | 99.0606 |
| 1.0 M LiPF6 EC+EMC+TPhPh (20:75:5 v/v %) w/ 1.5% VC | 0.4649 | 0.3698 | 0.0951 | 79.5530 | 0.3828 | 0.3774 | 0.1355 | 98.5969 |
| 1.0 M LiPF6 EC+EMC+TFEB (20:60:20 v/v %) | 0.0518 | 0.4420 | 0.0760 | 85.3400 | 0.4383 | 0.4312 | 0.1140 | 98.4000 |

Fig. 22

Evaluation of Low Temperature Performance of Cells containing Flame Retardant Additive and SEI additive

| | | BASELINE | | ELECTROLYTES WITH ADDITIVES | | | | | |
|---|---|---|---|---|---|---|---|---|---|
| ELECTROLYTE TYPE | | 1.0 M LiPF6 EC+EMC (20:80 v/v %) | | 1.00 M LiPF6 EC+EMC (20:80 v/v %) w/ 1.5% VC | | 1.00 M LiPF6 EC+EMC+TPhPh (20:75:5 v/v %) | | 1.00 M LiPF6 EC+EMC+TPhPh (20:75:5 v/v %) w/ 1.5% VC | |
| TEMPERATURE (°C) | DISCHARGE CURRENT (mA) | CAPACITY (Ah) | PERCENT (%) | CAPACITY (Ah) | PERCENT (%) | CAPACITY (Ah) | PERCENT (%) | CAPACITY (Ah) | PERCENT (%) |
| 23° | 25 | 0.3781 | 100.00 | 0.3903 | 100.00 | 0.3974 | 100.00 | 0.3774 | 100.00 |
| 0° | 25 | 0.3288 | 86.95 | 0.3382 | 86.66 | 0.3517 | 88.50 | 0.3388 | 89.76 |
| -20° | 25 | 0.3105 | 82.11 | 0.3173 | 81.29 | 0.3284 | 82.64 | 0.3204 | 84.88 |
| | 50 | 0.2842 | 75.16 | 0.2935 | 75.19 | 0.3044 | 76.61 | 0.2973 | 78.77 |
| | 100 | 0.2374 | 62.78 | 0.2499 | 64.03 | 0.2651 | 66.72 | 0.2536 | 67.19 |
| | 150 | 0.2063 | 54.57 | 0.2063 | 52.87 | 0.1922 | 48.36 | 0.1823 | 48.31 |
| -30° | 25 | 0.2748 | 72.69 | 0.2920 | 74.83 | 0.3020 | 76.00 | 0.2907 | 77.02 |
| -40° | 25 | 0.2640 | 69.83 | 0.2665 | 68.29 | 0.2661 | 66.98 | 0.2565 | 67.96 |
| | 50 | 0.1697 | 44.89 | 0.1664 | 42.63 | 0.1130 | 28.44 | 0.1265 | 33.52 |
| | 100 | 0.0157 | 4.15 | 0.0389 | 9.97 | 0.0303 | 7.64 | 0.0281 | 7.45 |
| | 150 | 0.0001 | 0.02 | 0.0056 | 1.44 | 0.0145 | 3.65 | 0.0011 | 0.30 |
| -50° | 25 | 0.1291 | 34.16 | 0.1317 | 33.75 | 0.0817 | 20.56 | 0.0891 | 23.61 |
| | 50 | 0.0222 | 5.87 | 0.0234 | 5.99 | 0.0257 | 6.47 | 0.0151 | 4.01 |
| -60° | 5 | 0.2043 | 54.04 | 0.2026 | 51.90 | 0.1537 | 38.67 | 0.1619 | 42.88 |
| | 10 | 0.1106 | 29.26 | 0.0631 | 16.16 | 0.0387 | 9.74 | 0.0443 | 11.73 |
| | 25 | 0.0064 | 1.70 | 0.0031 | 0.80 | 0.0032 | 0.81 | 0.0026 | 0.69 |

Fig. 23

Electrochemical Impedance Spectroscopy (EIS) Measurements for the Cathodes of Cells containing Electrolytes with Flame Retardant Additives/VC

| ELECTROLYTE TYPE | | | 1.0 M LiPF6 EC+EMC (20:80 v/v %) | | 1.0 M LiPF6 EC+EMC (20:80 v/v %) w/1.5% VC | | 1.0 M LiPF6 EC+EMC+TPhPh (20:75:5 v/v %) | | 1.0 M LiPF6 EC+EMC+TPhPh (20:75:5 v/v %) w/1.5% VC | |
|---|---|---|---|---|---|---|---|---|---|---|
| TEMPERATURE (°C) | | IMPEDANCE (Ohms) | EQUIVALENT CIRCUIT | IMPEDANCE (Ohms) | EQUIVALENT CIRCUIT | IMPEDANCE (Ohms) | EQUIVALENT CIRCUIT | IMPEDANCE (Ohms) | EQUIVALENT CIRCUIT | IMPEDANCE (Ohms) |
| Room Temp | Cathode | $R_s$ | R(CR)(C(RW)) | 0.5918 | R(CR)(C(RW)) | 0.2345 | R(CR)(C(RW)) | 0.1623 | R(CR)(C(RW)) | 0.2579 |
| | | $R_f$ | | 0.2423 | | 0.202 | | 0.2702 | | 0.006863 |
| | | $R_{ct}$ | | 0.03378 | | 0.01247 | | 0.03598 | | 0.07206 |
| 0° | Cathode | $R_s$ | R(CR)(C(RW)) | 0.1833 | R(CR)(C(RW)) | 0.213 | R(CR)(C(RW)) | 0.1739 | R(CR)(C(RW)) | 0.3777 |
| | | $R_f$ | | 2.919 | | 1.771 | | 1.515 | | 2.326 |
| | | $R_{ct}$ | | 0.6802 | | 0.3864 | | 0.4928 | | 0.4761 |
| -20° | Cathode | $R_s$ | R(CR)(CR) | 0.3142 | R(CR)(C(RW)) | 0.2658 | R(CR)(CR) | 0.2278 | R(CR)(CR) | 0.5368 |
| | | $R_f$ | | 0.2908 | | 0.2079 | | 0.3055 | | 0.1043 |
| | | $R_{ct}$ | | 1.753 | | 0.8338 | | 1.233 | | 0.7084 |
| -40° | Cathode | $R_s$ | R(CR)(CR) | 0.4437 | R(CR)(CR) | 0.4515 | R(CR)(CR) | 0.5991 | R(CR)(CR) | 0.6277 |
| | | $R_f$ | | 5.019 | | 1.768 | | 1.192 | | 2.722 |
| | | $R_{ct}$ | | 35.86 | | 62.83 | | 74.72 | | 16.25 |
| -60° | Cathode | $R_s$ | R(CR)(CR) | 2.016 | R(CR)(CR) | 2.571 | *** | *** | R(CR)(CR) | 3.299 |
| | | $R_f$ | | 6.242 | | 1.07 | | | | 1.449 |
| | | $R_{ct}$ | | 17.03 | | 29.9 | | | | 48.27 |

Fig. 24

Electrochemical Impedance Spectroscopy (EIS) Measurements for the Anodes of Cells containing Electrolytes with Flame Retardant Additives/VC

| ELECTROLYTE TYPE | | | 1.0 M LiPF6 EC+EMC (20:80 v/v %) | | 1.0 M LiPF6 EC+EMC (20:80 v/v %) w/1.5% VC | | 1.0 M LiPF6 EC+EMC+TPhPh (20:75:5 v/v %) | | 1.0 M LiPF6 EC+EMC+TPhPh (20:75:5 v/v %) w/ 1.5% VC | |
|---|---|---|---|---|---|---|---|---|---|---|
| TEMPERATURE (°C) | | IMPEDANCE (Ohms) | EQUIVALENT CIRCUIT | IMPEDANCE (Ohms) | EQUIVALENT CIRCUIT | IMPEDANCE (Ohms) | EQUIVALENT CIRCUIT | IMPEDANCE (Ohms) | EQUIVALENT CIRCUIT | IMPEDANCE (Ohms) |
| Room Temp | Anode | $R_s$ | R(CR)(C(RW)) | 0.4303 | R(CR)(C(RW)) | 0.2753 | R(CR)(C(RW)) | 0.1906 | R(CR)(CR) | 0.7406 |
| | | $R_f$ | | 0.02344 | | 0.07171 | | 0.01922 | | 0.1332 |
| | | $R_{ct}$ | | 0.03534 | | 0.03001 | | 0.04464 | | 0.06951 |
| 0° | Anode | $R_s$ | R(CR)(C(RW)) | 0.386 | R(CR)(C(RW)) | 0.3676 | R(CR)(CR) | 0.2653 | R(CR)(C(RW)) | 0.3754 |
| | | $R_f$ | | 0.03427 | | 0.2808 | | 0.2306 | | 0.4767 |
| | | $R_{ct}$ | | 0.03546 | | 0.4105 | | 0.182 | | 0.271 |
| -20° | Anode | $R_s$ | R(CR)(C(RW)) | 0.3669 | R(CR)(C(RW)) | 0.4122 | R(CR)(C(RW)) | 0.3251 | R(CR)(CR) | 0.5133 |
| | | $R_f$ | | 0.3294 | | 0.36 | | 0.3087 | | 0.3748 |
| | | $R_{ct}$ | | 0.9189 | | 1.701 | | 0.7985 | | 2.199 |
| -40° | Anode | $R_s$ | R(CR)(C(RW)) | 0.6563 | R(CR)(C(RW)) | 0.6576 | R(CR)(C(RW)) | 0.7849 | R(CR)(CR) | 1.012 |
| | | $R_f$ | | 0.5904 | | 1.241 | | 1.499 | | 2.502 |
| | | $R_{ct}$ | | 1.461 | | 5.764 | | 3.171 | | 31.9 |
| -60° | Anode | $R_s$ | R(CR)(CR) | 3.812 | R(CR)(CR) | 3.671 | R(CR)(CR) | 5.838 | R(CR)(CR) | 4.734 |
| | | $R_f$ | | 5.11 | | 8.337 | | 12.66 | | 9.91 |
| | | $R_{ct}$ | | 126.9 | | 264.9 | | 176.2 | | 265.1 |

Fig. 25

Linear Polarization Measurements for the Anodes of cells containing Electrolytes with Flame Retardant Additives/VC

| | LINEAR POLARIZATION VALUE OF ANODE | | | | | | | |
|---|---|---|---|---|---|---|---|---|
| ELECTROLYTE COMPOSITION | 23°C | 0°C | -10°C | -20°C | -30°C | -40°C | -50°C | -60°C |
| 1.0M LiPF6 in EC:EMC (20:80 v/v%) (Baseline) | 0.64 | 0.83 | 1.63 | 2.85 | 9.04 | 22.95 | 95.00 | 106.61 |
| 1.0M LiPF6 in EC:EMC (20:80 v/v%) w/ 1.5% VC | 0.62 | 1.94 | 4.40 | 5.09 | * | 59.75 | 287.88 | 1067.42 |
| 1.0M LiPF6 in EC:EMC:TPhPh (20:75:5 v/v%) | 0.46 | 1.09 | 2.94 | 2.53 | 14.98 | 33.69 | 144.16 | 536.723 |
| 1.0M LiPF6 in EC:EMC:TPhPh (20:75:5 v/v%) w/ 1.5% VC | 1.22 | 1.89 | 4.87 | 4.59 | 23.00 | 64.94 | 323.13 | 1055.56 |

Fig. 26

Linear Polarization Measurements for the Cathodes of cells containing Electrolytes with Flame Retardant Additives/VC

| | LINEAR POLARIZATION VALUE OF CATHODE | | | | | | | |
|---|---|---|---|---|---|---|---|---|
| ELECTROLYTE COMPOSITION | 23°C | 0°C | -10°C | -20°C | -30°C | -40°C | -50°C | -60°C |
| 1.0M LiPF6 in EC:EMC (20:80 v/v%) (Baseline) | 0.85 | 4.03 | 7.09 | 2.49 | 27.38 | 68.84 | 162.50 | 472.64 |
| 1.0M LiPF6 in EC:EMC (20:80 v/v%) w/ 1.5% VC | 0.45 | 2.28 | 3.17 | 1.55 | 15.20 | 51.91 | 395.83 | 215.42 |
| 1.0M LiPF6 in EC:EMC:TPhPh (20:75:5 v/v%) | 0.62 | 2.32 | 3.32 | 1.71 | 12.26 | 44.32 | 111.08 | 154.76 |
| 1.0M LiPF6 in EC:EMC:TPhPh (20:75:5 v/v%) w/ 1.5% VC | 0.43 | 3.39 | 4.38 | 1.55 | 18.34 | 49.48 | 291.41 | 494.78 |

Fig. 27 Formation of characteristics of experimental MCMB-$LiNiCoO_2$ cells containing electrolytes with Flame Retardant Additives subjected to formation cycling

| ELECTROLYTE TYPE | CHARGE CAPACITY (Ah) 1ST CYCLE | DISCHARGE CAPACITY (AH) 1ST CYCLE | IRREVERSIBLE CAPACITY (1ST CYCLE) | COULOUMBIC EFFICIENCY (1ST CYCLE) | CHARGE CAPACITY (Ah) 5TH CYCLE | REVERSIBLE CAPACITY (Ah) 5TH CYCLE | CUMULATIVE IRREVERSIBLE CAPACITY (1ST-5TH CYCLE) | COULOUMBIC EFFICIENCY (5TH CYCLE) |
|---|---|---|---|---|---|---|---|---|
| 1.0 M LiPF6 EC+DEC+DMC(1:1:1 v/v %) | 0.4980 | 0.4160 | 0.082 | 83.52 | 0.4119 | 0.4022 | 0.1264 | 97.64 |
| 1.0 M LiPF6 EC+EMC (20:80 v/v %) | 0.4504 | 0.3768 | 0.074 | 83.64 | 0.3799 | 0.3676 | 0.1356 | 96.75 |
| 1.0 M LiPF6 EC+EMC+TPP (20:70:10 v/v %) | 0.4705 | 0.3978 | 0.073 | 84.55 | 0.3969 | 0.3819 | 0.1449 | 96.20 |
| 1.0 M LiPF6 EC+EMC+DTFEC+TPP (20:50:20:10 v/v %) | 0.4929 | 0.4234 | 0.070 | 85.89 | 0.4248 | 0.4148 | 0.1157 | 97.64 |
| 1.0 M LiPF6 EC+EMC+DTFEC+TPP (20:30:40:10 v/v %) | 0.4904 | 0.4124 | 0.078 | 84.09 | 0.4272 | 0.4035 | 0.1958 | 94.45 |
| 1.0 M LiPF6 FEC+EMC+TFEMC+TPP (20:50:20:10 v/v %) | 0.4391 | 0.3687 | 0.070 | 83.97 | 0.3698 | 0.3646 | 0.0967 | 98.60 |
| 1.0 M LiPF6 FEC+EMC+TPP (20:70:10 v/v %) | 0.4784 | 0.4095 | 0.069 | 85.59 | 0.4127 | 0.4063 | 0.1015 | 98.45 |
| 1.0 M LiPF6 EC+EMC+TFEMC+TPP (20:50:20:10 v/v %) | 0.4494 | 0.3753 | 0.074 | 83.51 | 0.3655 | 0.3596 | 0.1192 | 98.40 |
| 1.0 M LiPF6 FEC+EMC+TFEMC+TPP (20:50:20:10 v/v %)+1.5%VC | 0.4574 | 0.3868 | 0.071 | 84.55 | 0.3941 | 0.3867 | 0.1036 | 98.13 |

Fig. 28

Summary of the discharge capacity at low temperature of a number of MCMB-$LiNiCoO_2$ cells containing electrolytes with Flame Retardant Additives

| ELECTROLYTE TYPE | | 1.0 M $LiPF_6$ EC+EMC (20:80 v/v %) | | 1.0 M $LiPF_6$ EC+EMC+TPP (20:70:10 v/v %) | | 1.0 M $LiPF_6$ EC+EMC+DTFEC+TPP (20:50:20:10 v/v %) | | 1.0 M $LiPF_6$ EC+EMC+DTFEC+TPP (20:30:40:10 v/v %) | |
|---|---|---|---|---|---|---|---|---|---|
| TEMP. (°C) | CURRENT (mA) | CAPACITY (Ah) | PERCENT (%) | CAPACITY (Ah) | PERCENT (%) | CAPACITY (Ah) | PERCENT (%) | CAPACITY (Ah) | PERCENT (%) |
| 23° | 25 mA | 0.3676 | 100.00 | 0.3819 | 100.00 | 0.4148 | 100.00 | 0.4035 | 100.00 |
| 0° | 25 mA | 0.3568 | 97.07 | 0.3688 | 96.58 | 0.3952 | 95.28 | 0.3763 | 93.26 |
| | 50 mA | 0.3375 | 91.83 | 0.3534 | 92.55 | 0.3695 | 89.09 | 0.3465 | 85.87 |
| | 100 mA | 0.3207 | 87.23 | 0.3356 | 87.90 | 0.3380 | 81.49 | 0.2057 | 50.98 |
| | 150 mA | 0.3086 | 83.95 | 0.3101 | 81.19 | 0.2485 | 59.90 | 0.0656 | 16.25 |
| -20° | 25 mA | 0.3056 | 83.15 | 0.3208 | 84.00 | 0.3202 | 77.20 | 0.2364 | 58.60 |

Discharge performance at 0°C (expressed as percent of room temperature capacity) of a ~ 400mAh MCMB-LiNiCoO$_2$ cell containing 1.0 M LiPF$_6$ in EC+EMC+TPP (20:70:10 v/v%). The cell was charged at 23°C prior to discharge.

Fig. 30 Discharge performance at 0°C (expressed as percent of room temperature capacity) of a MCMB-$LiNiCoO_2$ cell containing 1.0 M $LiPF_6$ in EC+EMC+DTFEC+TPP (20:50:20:10 v/v%). The cell was charged at 23°C prior to discharge.

Tafel Polarization Measurements of $LiNiCoO_2$ Electrodes from MCMB-$LiNiCoO_2$ Cells containing Electrolytes with 10% TPP and with and without the addition of DTFEC

Tafel Polarization Measurements of MCMB Electrodes from MCMB-LiNiCoO$_2$ Cells containing Electrolytes with 10% TPP and with and without the addition of DTFEC

Fig. 33

Summary of the discharge capacity at low temperature of a number of MCMB-$LiNiCoO_2$ cells containing electrolytes with 10% TPP and TFEMC and/or FEC

| ELECTROLYTE TYPE | | 1.0 M $LiPF_6$ EC+DEC+DMC (1:1:1 v/v %) | | 1.0 M $LiPF_6$ FEC+EMC+TFEMC+TPPa (20:50:20:10 v/v %) | | 1.0 M $LiPF_6$ FEC+EMC+TPP (20:70:10 v/v %) | | 1.0 M $LiPF_6$ EC+EMC+TFEMC+TPP (20:30:40:10 v/v %) | | 1.0 M $LiPF_6$ FEC+EMC+TFEMC+TPPa (20:50:20:10 v/v %) +1.5%VC | |
|---|---|---|---|---|---|---|---|---|---|---|---|
| TEMP. (°C) | CURRENT (mA) | CAPACITY (Ah) | PERCENT (%) | CAPACITY (Ah) | PERCENT (%) | CAPACITY (Ah) | PERCENT (%) | CAPACITY (Ah) | PERCENT (%) | CAPACITY (Ah) | PERCENT (%) |
| 23° | 25 mA | 0.4022 | 100.00 | 0.3646 | 100.00 | 0.4063 | 100.00 | 0.3596 | 100.00 | 0.3867 | 100.00 |
| 0° | 25 mA | 0.3633 | 90.31 | 0.3497 | 95.92 | 0.3805 | 93.63 | 0.3410 | 94.81 | 0.3621 | 93.64 |
| | 50 mA | 0.3609 | 89.73 | 0.3409 | 93.48 | 0.3731 | 91.82 | 0.3362 | 93.47 | 0.3591 | 92.88 |

Fig. 35

Summary of the formation characteristics of a number of Li-$Li(Li_{0.17}Ni_{0.25}Mn_{0.58})O_2$ cells containing various electrolytes with TPP and TPPi flame retardant additives

| ELECTROLYTE TYPE | ANODE TYPE | CATHODE WEIGHT (g) | CHARGE CAPACITY (mAh) 1ST CYCLE | DISCHARGE CAPACITY (mAh) 1ST CYCLE | DISCHARGE CAPACITY (mAh/g) 1ST CYCLE | IRREVERSIBLE CAPACITY 1ST CYCLE | COULOUMBIC EFFICIENCY 1ST CYCLE | CHARGE CAPACITY (mAh) 5TH CYCLE | REVERSIBLE CAPACITY (mAh) 5TH CYCLE | REVERSIBLE CAPACITY (mAh/g) 5TH CYCLE | CUMULATIVE IRREVERSIBLE CAPACITY (1ST-5TH CYCLE) (mAh) | CUMULATIVE IRREVERSIBLE CAPACITY (1ST-5TH CYCLE) (mAh/g) | COULOUMBIC EFFICIENCY 1ST CYCLE |
|---|---|---|---|---|---|---|---|---|---|---|---|---|---|
| 1.0 M LiPF6 EC+EMC (20:80 v/v%) | LITHIUM METAL | 0.0175 | 5.3022 | 4.2184 | 241.05 | 1.084 | 79.56 | 4.2422 | 4.1153 | 235.16 | 1.6211 | 92.63 | 97.01 |
| 1.0 M LiPF6 EC+EMC (20:80 v/v%) | LITHIUM METAL | 0.0166 | 5.0498 | 4.0088 | 241.49 | 1.041 | 79.39 | 4.0104 | 3.8866 | 234.13 | 1.5555 | 93.70 | 96.91 |
| 1.0 M LiPF6 EC−EMC+TPP (20:75:5 v/v%) | LITHIUM METAL | 0.0122 | 3.5549 | 2.9879 | 244.91 | 0.567 | 84.05 | 2.8756 | 2.8377 | 232.60 | 0.6519 | 53.43 | 98.68 |
| 1.0 M LiPF6 EC−EMC+TPP (20:75:5 v/v%) | LITHIUM METAL | 0.0141 | 4.1911 | 3.3283 | 236.05 | 0.863 | 79.41 | 3.3776 | 3.1484 | 223.29 | 1.7485 | 124.01 | 93.21 |
| 1.0 M LiPF6 EC−EMC+TPP (20:75:5 v/v%) +1.5% VC | LITHIUM METAL | 0.0130 | 4.4004 | 2.9701 | 228.47 | 1.430 | 67.50 | 3.4184 | 2.7415 | 210.88 | 4.3334 | 333.34 | 80.20 |
| 1.0 M LiPF6 EC−EMC+TPP (20:75:5 v/v%) +1.5% VC | LITHIUM METAL | 0.0182 | 5.9747 | 4.2199 | 231.86 | 1.755 | 70.63 | 4.6908 | 3.8683 | 212.54 | 5.6966 | 313.00 | 82.47 |
| 1.0 M LiPF6 EC+EMC+TPPi (20:75:5 v/v%) | LITHIUM METAL | 0.0154 | 4.7756 | 1.9885 | 129.12 | 2.787 | 41.54 | 2.6031 | 1.9362 | 125.73 | 6.7913 | 440.99 | 74.38 |
| 1.0 M LiPF6 EC+EMC+TPPi (20:75:5 v/v%) | LITHIUM METAL | 0.0115 | 2.93880 | 1.28800 | 112.00 | 1.651 | 43.83 | 1.7488 | 1.3933 | 121.16 | 4.3401 | 377.40 | 79.67 |
| 1.0 M LiPF6 EC−EMC+TPP (20:70:10 v/v%) | LITHIUM METAL | 0.0113 | 3.3552 | 2.6198 | 232.25 | 0.735 | 78.08 | 2.301 | 2.4717 | 219.12 | 1.9715 | 174.78 | 87.34 |
| 1.0 M LiPF6 EC−EMC+TPP (20:70:10 v/v%) | LITHIUM METAL | 0.0121 | 3.5093 | 2.8579 | 236.58 | 0.651 | 81.44 | 2.9397 | 2.6911 | 222.77 | 1.4162 | 117.24 | 91.54 |
| 1.0 M $LiPF_6$ EC+EMC+DTFEC+TPP (20:50:20:10 v/v%) | LITHIUM METAL | 0.0107 | 03.1482 | 2.5084 | 233.99 | 0.640 | 79.68 | 2.6608 | 2.3205 | 216.46 | 1.8025 | 168.14 | 87.21 |
| 1.0 M $LiPF_6$ EC+EMC+DTFEC+TPP (20:50:20:10 v/v%) | LITHIUM METAL | 0.0111 | 3.3069 | 2.6087 | 234.60 | 0.698 | 78.89 | 2.8064 | 2.4042 | 216.21 | 2.1158 | 190.27 | 85.67 |

Fig. 36

| | | | LW473<br>1.0 M LiPF6 in EC+EMC+TPP+VC (19.7:73.9:4.9:1.5 v/v %) | | | | LW474<br>1.0 M LiPF6 in EC+EMC+TPP+VC (19.7:73.9:4.9:1.5 v/v %) | | | |
|---|---|---|---|---|---|---|---|---|---|---|
| TEMP (°C) | RATE | CURRENT (A) | CAPACITY (Ah) | WATT-HOURS (Wh) | ENERGY (Wh/Kg) | % OF ROOM TEMP | CAPACITY (Ah) | WATT-HOURS (Wh) | ENERGY (Wh/Kg) | % OF ROOM TEMP |
| 20°C (Initial) | C/5 | 1.800 | 6.9080 | 25.073 | 103.95 | 100 | 6.8947 | 25.03 | 104.06 | 100 |
| 20° | C | 7.000 | 6.2737 | 22.020 | 91.30 | 90.82 | 6.3852 | 22.667 | 94.25 | 92.61 |
| | C/2 | 3.500 | 6.5372 | 23.322 | 96.69 | 94.63 | 6.5249 | 23.295 | 96.86 | 94.64 |
| | C/5 | 1.400 | 6.9152 | 24.877 | 103.14 | 100.10 | 6.9055 | 24.856 | 103.35 | 100.16 |
| | C/10 | 0.700 | 7.1899 | 25.884 | 107.31 | 104.08 | 7.1895 | 25.892 | 107.66 | 104.28 |
| | C/20 | 0.350 | 7.3629 | 26.527 | 109.98 | 106.58 | 7.3678 | 26.551 | 110.40 | 106.86 |
| | C/50 | 0.140 | 7.4035 | 26.660 | 110.53 | 107.17 | 7.4345 | 26.770 | 111.31 | 107.83 |
| 10° | C | 7.000 | 5.8089 | 20.206 | 83.77 | 84.09 | 5.9083 | 20.860 | 86.73 | 85.69 |
| | C/2 | 3.500 | 6.0681 | 21.605 | 89.57 | 87.84 | 6.0524 | 21.572 | 89.70 | 87.78 |
| | C/5 | 1.400 | 6.4461 | 23.241 | 96.35 | 93.31 | 6.4372 | 23.223 | 96.56 | 93.37 |
| | C/10 | 0.700 | 6.7325 | 24.343 | 100.92 | 97.46 | 6.7299 | 24.342 | 101.21 | 97.61 |
| | C/20 | 0.350 | 7.0210 | 25.370 | 105.18 | 101.64 | 7.0269 | 25.396 | 105.60 | 101.92 |
| | C/50 | 0.140 | 7.2964 | 26.292 | 109.01 | 105.62 | 7.3254 | 26.397 | 109.76 | 106.25 |
| 0° | C | 7.000 | 5.4378 | 18.526 | 76.81 | 78.72 | 5.5533 | 19.271 | 80.13 | 80.54 |
| | C/2 | 3.500 | 5.6957 | 20.009 | 82.96 | 82.45 | 5.6758 | 19.953 | 82.96 | 82.32 |
| | C/5 | 1.400 | 6.0224 | 21.626 | 89.66 | 87.18 | 6.0129 | 21.603 | 89.82 | 87.21 |
| | C/10 | 0.700 | 6.2889 | 22.750 | 94.32 | 91.04 | 6.2847 | 22.742 | 94.56 | 91.15 |
| | C/20 | 0.350 | 6.5637 | 23.808 | 98.70 | 95.02 | 6.5725 | 23.844 | 99.15 | 95.33 |
| | C/50 | 0.140 | 6.9334 | 25.076 | 103.96 | 100.37 | 6.9652 | 25.192 | 104.75 | 101.02 |
| -10° | C | 7.000 | 5.0073 | 16.430 | 68.12 | 72.49 | 5.1258 | 17.227 | 71.63 | 74.34 |
| | C/2 | 3.500 | 5.2855 | 18.081 | 74.96 | 76.51 | 5.2613 | 17.998 | 74.83 | 76.31 |
| | C/5 | 1.400 | 5.5653 | 19.750 | 81.88 | 80.56 | 5.5501 | 19.701 | 81.92 | 80.50 |
| | C/10 | 0.700 | 5.8634 | 21.075 | 87.37 | 84.88 | 5.8591 | 21.065 | 87.59 | 84.98 |
| | C/20 | 0.350 | 6.1313 | 22.205 | 92.06 | 88.76 | 6.1315 | 22.211 | 92.35 | 88.93 |
| | C/50 | 0.140 | 6.4670 | 23.493 | 97.40 | 93.62 | 6.4913 | 23.584 | 98.06 | 94.15 |
| -20° | C | 7.000 | 4.7786 | 14.257 | 59.11 | 69.18 | 4.6554 | 14.844 | 61.72 | 67.52 |
| | C/2 | 3.500 | 4.8704 | 15.881 | 65.84 | 70.50 | 4.8393 | 15.753 | 65.60 | 70.19 |
| | C/5 | 1.400 | 5.1634 | 17.657 | 73.20 | 74.75 | 5.1371 | 17.551 | 72.98 | 74.51 |
| | C/10 | 0.700 | 5.4255 | 19.056 | 79.00 | 78.54 | 5.4142 | 19.011 | 79.05 | 78.53 |
| | C/20 | 0.350 | 5.6926 | 20.362 | 84.42 | 82.41 | 5.6887 | 20.346 | 84.60 | 82.51 |
| | C/50 | 0.140 | 6.0245 | 21.813 | 90.44 | 87.21 | 6.0432 | 21.881 | 90.98 | 87.65 |
| -30° | C | 7.000 | 4.5880 | 11.984 | 49.68 | 66.42 | 4.0878 | 11.885 | 49.42 | 59.29 |
| | C/2 | 3.500 | 4.3046 | 13.065 | 54.17 | 62.31 | 4.2251 | 12.736 | 52.96 | 61.28 |
| | C/5 | 1.400 | 4.6824 | 15.065 | 62.46 | 67.78 | 4.6663 | 14.964 | 62.22 | 67.68 |
| | C/10 | 0.700 | 4.9371 | 16.516 | 68.47 | 71.47 | 4.9252 | 16.461 | 68.44 | 71.44 |
| | C/20 | 0.350 | 5.2225 | 18.038 | 74.78 | 75.60 | 5.2133 | 17.993 | 74.82 | 75.61 |
| | C/50 | 0.140 | 5.5779 | 19.813 | 82.14 | 80.75 | 5.5942 | 19.873 | 82.63 | 81.14 |
| -40° | C | 7.000 | 0.5644 | 1.396 | 5.79 | 8.17 | 3.8324 | 9.297 | 38.66 | 55.59 |
| | C/2 | 3.500 | 3.6000 | 9.754 | 40.44 | 52.11 | 3.5997 | 9.757 | 40.57 | 52.21 |
| | C/5 | 1.400 | 4.1115 | 12.038 | 49.91 | 59.52 | 4.0825 | 11.905 | 49.50 | 59.21 |
| | C/10 | 0.700 | 4.3587 | 13.415 | 55.62 | 63.10 | 4.3394 | 13.319 | 55.38 | 62.94 |
| | C/20 | 0.350 | 4.6906 | 15.109 | 62.64 | 67.90 | 4.6809 | 15.054 | 62.59 | 67.89 |
| | C/50 | 0.140 | 5.0578 | 17.150 | 71.10 | 73.22 | 5.0783 | 17.203 | 71.53 | 73.66 |
| | C/100 | 0.070 | 5.2632 | 18.422 | 76.37 | 76.19 | 5.3032 | 18.547 | 77.12 | 76.92 |
| -50° | C/2 | 3.500 | 1.5415 | 3.486 | 14.45 | 22.32 | 1.5253 | 3.502 | 14.56 | 22.12 |
| | C/5 | 1.400 | 2.8741 | 7.328 | 30.38 | 41.61 | 2.8355 | 7.199 | 29.93 | 41.13 |
| | C/10 | 0.700 | 3.4388 | 9.195 | 38.12 | 49.78 | 3.4039 | 9.063 | 37.68 | 49.37 |
| | C/20 | 0.350 | 3.9363 | 11.204 | 46.45 | 56.98 | 3.8984 | 11.056 | 45.97 | 56.54 |
| | C/50 | 0.140 | 4.4235 | 13.677 | 56.70 | 64.03 | 4.4448 | 13.719 | 57.04 | 64.47 |
| | C/100 | 0.070 | 4.6809 | 15.292 | 63.40 | 67.76 | 4.7114 | 15.361 | 63.87 | 68.33 |
| -60° | C/2 | 3.500 | 0.0004 | 0.001 | 0.00 | 0.01 | 0.0004 | 0.001 | 0.00 | 0.01 |
| | C/5 | 1.400 | 0.6521 | 1.378 | 5.71 | 9.44 | 0.6537 | 1.376 | 5.72 | 9.48 |
| | C/10 | 0.700 | 1.1357 | 2.563 | 10.63 | 16.44 | 1.0732 | 2.420 | 10.06 | 15.57 |
| | C/20 | 0.350 | 2.1648 | 5.090 | 21.10 | 31.34 | 2.1100 | 4.948 | 20.57 | 30.60 |
| | C/50 | 0.140 | 3.4634 | 9.048 | 37.51 | 50.14 | 3.4477 | 8.977 | 37.33 | 50.01 |

Discharge rate performance at 20°C of a 7 Ah Li-ion cell containing 1.0M $LiPF_6$ in EC+EMC+TPP+VC (19.7/73.9/4.9/1.5 v/v%)

100% Depth of discharge (DOD) cycling of 7 Ah Li-ion cells containing a Flame Retardant Additive containing electrolyte [1.0M LiPF6 in EC+EMC+TPP+VC (19.7/73.9/4.9 v/v %)] and the baseline electrolyte [1.0M LiPF6 in EC+DMC+DEC (1:1:1 v/v %)]

FORMATION CHARACTERISTICS OF EXPERIMENTAL MPG-111/Toda (LiNiMnCoO2) COIN CELLS CONTAINING ELECTROLYTES WITH FLAME RETARDANT ADDITIVES

Fig. 40

| CELL NAME | ELECTROLYTE | CATHODE ACTIVE MASS | % FRA | mAh/g OF 5TH CYCLE |
|---|---|---|---|---|
| TD 01 | 1.00 M LiPF6 FEC+EC+EMC+TPP (20:20:45:15 v/v %) | 0.0154 | 15 | 8.82 |
| TD 02 | 1.00 M LiPF6 FEC+EC+EMC+TPP (20:20:45:15 v/v %) | 0.0110 | 15 | 5.94 |
| TD 05 | 1.00 M LiPF6 EC+DEC+DMC (1:1:1 vol %) (BASELINE) | 0.0142 | 0 | 239.58 |
| TD 06 | 1.00 M LiPF6 EC+DEC+DMC (1:1:1 vol %) (BASELINE) | 0.0126 | 0 | 236.04 |
| TD 07 | 0.95 M LiPF6 +0.05M LiBOB EC+DMC+DMMP (30:55:15 wt %) (YARDNEY/URI) | 0.0141 | 15 | 118.75 |
| TD 08 | 0.95 M LiPF6 +0.05M LiBOB EC+DMC+DMMP (30:55:15 wt %) (YARDNEY/URI) | 0.0128 | 15 | 143.73 |
| TD 09 | 1.00 M LiPF6 EC+EMC+TPP (20:75:5 v/v %) + 1.5% VC (JPL GEN #1) | 0.0139 | 5 | 17.30 |
| TD 10 | 1.00 M LiPF6 EC+EMC+TPP (20:75:5 v/v %) + 1.5% VC (JPL GEN #1) | 0.0130 | 5 | 17.37 |
| TD 11 | 1.00 M LiPF6 EC+EMC+TPP (20:70:10 v/v %) + 1.5% VC | 0.0135 | 10 | 7.78 |
| TD 12 | 1.00 M LiPF6 EC+EMC+TPP (20:70:10 v/v %) + 1.5% VC | 0.0130 | 10 | 19.07 |
| TD 13 | 1.00 M LiPF6 FEC+EMC+TPP (20:70:10 v/v %) | 0.0133 | 10 | 11.13 |
| TD 14 | 1.00 M LiPF6 FEC+EMC+TPP (20:70:10 v/v %) | 0.0130 | 10 | 6.07 |
| TD 15 | 1.00 M LiPF6 FEC+EMC+TPP (20:70:10 v/v %) + 1.5% VC | 0.0132 | 10 | 5.09 |
| TD 16 | 1.00 M LiPF6 FEC+EMC+TPP (20:70:10 v/v %) + 1.5% VC | 0.0131 | 10 | 14.24 |
| TD 17 | 1.00 M LiPF6 FEC+EMC+TPP (20:65:15 v/v %) + 1.5% VC | 0.0118 | 15 | 7.04 |
| TD 18 | 1.00 M LiPF6 FEC+EMC+TPP (20:65:15 v/v %) + 1.5% VC | 0.0112 | 15 | 7.14 |
| TD 19 | 1.00 M LiPF6 EC+EMC+TPP (20:70:10 v/v %) | 0.0138 | 10 | 13.90 |

Fig. 41

FORMATION CHARACTERISTICS OF EXPERIMENTAL MPG-111/Toda (LiNiMnCoO2) COIN CELLS CONTAINING ELECTROLYTES WITH FLAME RETARDANT ADDITIVES

| CELL NAME | ELECTROLYTE | CATHODE ACTIVE MASS | % FRA | mAh/g OF 5TH CYCLE |
|---|---|---|---|---|
| TD 03 | 1.00 M LiPF6 EC+EMC+TPP (20:70:10 v/v %) + 0.05M LiBOB | 0.0142 | 10 | 96.23 |
| TD 04 | 1.00 M LiPF6 EC+EMC+TPP (20:70:10 v/v %) + 0.05M LiBOB | 0.0111 | 10 | 46.62 |
| TD 21 | 1.00 M LiPF6 EC+EMC+TPP (20:70:10 v/v %) + 0.05M LiBOB + 1.5% VC | 0.0126 | 10 | 235.65 |
| TD 22 | 1.00 M LiPF6 EC+EMC+TPP (20:70:10 v/v %) + 0.05M LiBOB + 1.5% VC | 0.0119 | 10 | 103.16 |
| TD 23 | 1.00 M LiPF6 EC+EMC+TPP (20:70:10 v/v %) + 0.10M LiBOB | 0.0163 | 10 | 49.62 |
| TD 24 | 1.00 M LiPF6 EC+EMC+TPP (20:70:10 v/v %) + 0.10M LiBOB | 0.0136 | 10 | 212.77 |
| TD 25 | 1.00 M LiPF6 EC+EMC+TPP (20:70:10 v/v %) + 0.15M LiBOB | 0.0162 | 10 | 229.74 |
| TD 26 | 1.00 M LiPF6 EC+EMC+TPP (20:70:10 v/v %) + 0.15M LiBOB | 0.0139 | 10 | 211.47 |
| TD 27 | 1.00 M LiPF6 FEC+EMC+TPP (20:70:10 v/v %) + 0.10M LiBOB | 0.0161 | 10 | 89.17 |
| TD 28 | 1.00 M LiPF6 FEC+EMC+TPP (20:70:10 v/v %) + 0.10M LiBOB | 0.0142 | 10 | 66.96 |
| TD 29 | 1.00 M LiPF6 EC+EMC+TPP (20:75:5 v/v %) + 0.10M LiBOB | 0.0154 | 5 | 236.10 |
| TD 30 | 1.00 M LiPF6 EC+EMC+TPP (20:75:5 v/v %) + 0.10M LiBOB | 0.0142 | 5 | 231.24 |
| TD 31 | 1.00 M LiPF6 EC+EMC+TPP (20:70:10 v/v %) + 0.05M LiBOB | 0.0148 | 10 | 231.51 |
| TD 32 | 1.00 M LiPF6 EC+EMC+TPP (20:70:10 v/v %) + 0.05M LiBOB | 0.0146 | 10 | 217.29 |

DISCHARGE CAPACITY (mAh/g) DELIVERED ON THE 5TH FORMATION CYCLE OF MPG-111/Toda (LiNiMnCoO2) COIN CELLS CONTAINING ELECTROLYTES WITH FLAME RETARDANT ADDITIVES

Fig. 43

FORMATION CHARACTERISTICS OF EXPERIMENTAL MPG-111/Toda (LiNiMnCoO2) COIN CELLS CONTAINING ELECTROLYTES WITH FLAME RETARDANT ADDITIVES

| CELL NAME | ELECTROLYTE | CATHODE ACTIVE MASS | % FRA | mAh/g of 5th CYCLE |
|---|---|---|---|---|
| TD 33 | 1.00 M LiPF6 EC+EMC+TPP (20:70:10 v/v %) + 0.05M LiBOB | 0.0156 | 10 | 186.21 |
| TD 34 | 1.00 M LiPF6 EC+EMC+TPP (20:70:10 v/v %) + 0.05M LiBOB | 0.0154 | 10 | 151.42 |
| TD 35 | 1.00 M LiPF6 EC+EMC+TPP (20:70:10 v/v %) + 0.10M LiBOB | 0.0157 | 10 | 193.57 |
| TD 36 | 1.00 M LiPF6 EC+EMC+TPP (20:70:10 v/v %) + 0.10M LiBOB | 0.0158 | 10 | 188.92 |
| TD 37 | 1.00 M LiPF6 EC+EMC+TPP (20:70:10 v/v %) + 0.15M LiBOB | 0.0166 | 10 | 190.31 |
| TD 38 | 1.00 M LiPF6 EC+EMC+TPP (20:70:10 v/v %) + 0.15M LiBOB | 0.0165 | 10 | 191.04 |
| TD 39 | 1.00 M LiPF6 EC+EMC+TPP (20:70:10 v/v %) + 0.05M LiBOB + 1.5% VC | 0.0174 | 10 | 193.92 |
| TD 40 | 1.00 M LiPF6 EC+EMC+TPP (20:70:10 v/v %) + 0.05M LiBOB + 1.5% VC | 0.0166 | 10 | 190.25 |
| TD 41 | BASELINE ELECTROLYTE (EC+DEC+DMC) | 0.0145 | 10 | 184.17 |
| TD 42 | BASELINE ELECTROLYTE (EC+DEC+DMC) | 0.0164 | 10 | 187.98 |

DISCHARGE CAPACITY (mAh/g) DELIVERED ON THE 5TH FORMATION CYCLE OF MPG-111/Toda (LiNiMnCoO2) COIN CELLS CONTAINING ELECTROLYTES WITH FLAME RETARDANT ADDITIVES

Fig. 45

DISCHARGE RATE CHARACTERISTICS OF EXPERIMENTAL MPG-111/Toda (LiNiMnCo02) COIN CELLS CONTAINING ELECTROLYTES WITH FLAME RETARDANT ADDITIVES - CELL TD33, CELL TD34, CELL TD35, CELL TD36

| | 1.00 M LiPF6 EC+EMC+TPP (20:70:10 v/v %) + 0.05M LiBOB | | | | | | 1.00 M LiPF6 EC+EMC+TPP (20:70:10 v/v %) + 0.10M LiBOB | | | | | |
|---|---|---|---|---|---|---|---|---|---|---|---|---|
| | CELL TD33 | | | CELL TD34 | | | CELL TD35 | | | CELL TD36 | | |
| DISCHARGE RATE | Ah | mAh/g | % of C/20 Capacity (mAh/g) | Ah | mAh/g | % of C/20 Capacity (mAh/g) | Ah | mAh/g | % of C/20 Capacity (mAh/g) | Ah | mAh/g | % of C/20 Capacity (mAh/g) |
| C/20 | 0.002889 | 185.19 | 100 | 0.002232 | 144.92 | 100 | 0.002973 | 189.36 | 100 | 0.002966 | 187.73 | 100 |
| C/10 | 0.002668 | 171.05 | 92.36 | 0.001759 | 114.21 | 78.81 | 0.002725 | 173.59 | 91.67 | 0.002744 | 173.66 | 92.51 |
| C/5 | 0.002327 | 149.18 | 80.55 | 0.001238 | 80.39 | 55.47 | 0.00219 | 139.47 | 73.66 | 0.002370 | 149.98 | 79.89 |
| C/2 | 0.001806 | 115.74 | 62.50 | 0.00018 | 11.70 | 8.07 | 0.002021 | 128.69 | 67.96 | 0.001797 | 113.70 | 60.57 |

Fig. 46

DISCHARGE RATE CHARACTERISTICS OF EXPERIMENTAL MPG-111/Toda (LiNiMnCo02) COIN CELLS CONTAINING ELECTROLYTES WITH FLAME RETARDANT ADDITIVES - CELL TD37, CELL TD38, CELL TD39, CELL TD40

| | 1.00 M LiPF6 EC+EMC+TPP (20:70:10 v/v %) + 0.15M LiBOB | | | | | | 1.00 M LiPF6 EC+EMC+TPP (20:70:10 v/v %) + 0.05M LiBOB + 1.5% VC | | | | | |
|---|---|---|---|---|---|---|---|---|---|---|---|---|
| | CELL TD37 | | | CELL TD38 | | | CELL TD39 | | | CELL TD40 | | |
| DISCHARGE RATE | Ah | mAh/g | % of C/20 Capacity (mAh/g) | Ah | mAh/g | % of C/20 Capacity (mAh/g) | Ah | mAh/g | % of C/20 Capacity (mAh/g) | Ah | mAh/g | % of C/20 Capacity (mAh/g) |
| C/20 | 0.003099 | 186.67 | 100 | 0.003127 | 189.53 | 100 | 0.003279 | 188.44 | 100 | 0.003123 | 188.13 | 100 |
| C/10 | 0.002860 | 172.28 | 92.29 | 0.002847 | 172.53 | 91.03 | 0.002937 | 168.81 | 89.58 | 0.002777 | 167.26 | 88.90 |
| C/5 | 0.002563 | 154.39 | 82.71 | 0.002467 | 149.52 | 78.89 | 0.002442 | 140.36 | 74.49 | 0.002355 | 141.84 | 75.40 |
| C/2 | 0.002032 | 122.43 | 65.59 | 0.001977 | 119.84 | 63.23 | 0.001731 | 99.45 | 52.78 | 0.00149 | 89.78 | 47.72 |

Fig. 47

DISCHARGE RATE CHARACTERISTICS OF EXPERIMENTAL MPG-111/Toda (LiNiMnCo02) COIN CELLS CONTAINING ELECTROLYTES WITH FLAME RETARDANT ADDITIVES - CELL TD41, CELL TD42

| | 1.0 M LiPF6 EC+DEC+DMC (1:1:1 v/v %) | | | | | |
|---|---|---|---|---|---|---|
| | CELL TD41 | | | CELL TD42 | | |
| DISCHARGE RATE | Ah | mAh/g | % of C/20 Capacity (mAh/g) | Ah | mAh/g | % of C/20 Capacity (mAh/g) |
| C/20 | 0.002661 | 183.53 | 100 | 0.003027 | 184.58 | 100 |
| C/10 | 0.001740 | 120.01 | 65.39155 | 0.002812 | 171.43 | 92.8777 |
| C/5 | 0.000637 | 43.95 | 23.94784 | 0.002505 | 152.73 | 82.7459 |
| C/2 | 0.000652 | 44.94 | 24.48895 | 0.001628 | 99.24 | 53.7643 |

Fig. 49

| | |
|---|---|
| Fig.49A | Fig.49B |

Fig. 49A

FORMATION CHARACTERISTICS OF EXPERIMENTAL MPG-111 / LiNiCoAlO2 (NCA) CELLS CONTAINING ELECTROLYTES WITH FLAME RETARDANT ADDITIVES

| ELECTROLYTE TYPE | CHARGE CAPACITY (Ah) 1ST CYCLE | DISCHARGE CAPACITY (Ah) 1ST CYCLE | IRREVERSIBLE CAPACITY (1ST CYCLE) | COULOUMBIC EFFICIENCY (1ST CYCLE) | CHARGE CAPACITY (Ah) 5TH CYCLE | REVERSIBLE CAPACITY (Ah) 5TH CYCLE | CUMULATIVE IRREVERSIBLE CAPACITY (1ST-5TH) CYCLE) |
|---|---|---|---|---|---|---|---|
| 1.0 M LiPF6 EC+EMC+TPP (20:70:10 vol %) | 0.6302 | 0.5499 | 0.080 | 87.25 | 0.5353 | 0.5134 | 0.1450 |
| 1.0 M LiPF6 EC+EMC+TPP (20:65:15 vol %) | 0.6170 | 0.5313 | 0.086 | 86.12 | 0.5182 | 0.4991 | 0.1645 |
| 1.0 M LiPF6 FEC+EMC+TPP (20:70:10 vol %) | 0.6250 | 0.5893 | 0.036 | 94.30 | 0.5194 | 0.5302 | -0.0206 |
| 1.0 M LiPF6 0.15M LiBOB EC+EMC+TPP (20:70:10 vol %) | 0.6341 | 0.5614 | 0.073 | 88.55 | 0.5337 | 0.5253 | 0.1005 |
| 1.0 M LiPF6 FEC+EMC+TPP (20:65:15 vol %) | 0.6663 | 0.5456 | 0.121 | 81.88 | 0.5561 | 0.5415 | 0.2713 |

Fig. 49B

| COULOUMBIC EFFICIENCY (5TH CYCLE) | FORMATION CURRENTS (mA) | FORMATION RATES (C/x) | CATHODE WEIGHT | CATHODE ACTIVE MATERIAL WEIGHT | REVERSIBLE CAPACITY (mAh/g) |
|---|---|---|---|---|---|
| 95.92 | 7.50 | 68.46 | 3.945 | 3.1384 | 163.60 |
| 96.31 | 7.50 | 66.55 | 3.946 | 3.1390 | 159.00 |
| 102.09 | 7.50 | 70.70 | 3.965 | 3.1539 | 168.12 |
| 98.41 | 7.50 | 70.03 | 3.971 | 3.1590 | 166.27 |
| 97.38 | 7.50 | 72.20 | 3.980 | 3.1663 | 171.03 |

Fig. 50

DISCHARGE CHARACTERISTICS OF EXPERIMENTAL MPG-111/ LiNiCoAlO2 (NCA) CELLS CONTAINING ELECTROLYTES WITH FLAME RETARDANT ADDITIVES

| | | | ST13 | | ST14 | | ST15 | | ST16 | | ST17 | |
|---|---|---|---|---|---|---|---|---|---|---|---|---|
| ELECTROLYTE TYPE → | | | 1.00M LiPF6 EC+EMC+TPP (20:70:10 vol %) | | 1.00M LiPF6 EC+EMC+TPP (20:65:15 vol %) | | 1.00M LiPF6 FEC+EMC+TPP (20:70:10 vol %) | | 1.0M LiPF6 + 0.15M LiBOB EC+EMC+TPP (20:70:10 vol %) | | 1.0M LiPF6 FEC+EMC+TPP (20:65:15 vol %) | |
| TEMP. | CURRENT (mA) | RATE | CAPACITY (Ah) | PERCENT (%) | CAPACITY (Ah) | PERCENT (%) | CAPACITY (Ah) | PERCENT (%) | CAPACITY (Ah) | PERCENT (%) | CAPACITY (Ah) | PERCENT (%) |
| 23° C | 7.50 mA | C/65 | 0.5134 | 100.00 | 0.4991 | 100.00 | 0.5302 | 100.00 | 0.5253 | 100.00 | 0.5415 | 100.00 |
| | 25 mA | C/20 | 0.4888 | 95.19 | 0.4783 | 95.83 | 0.4922 | 92.83 | 0.5104 | 97.18 | 0.5203 | 96.08 |
| | 50 mA | C/10 | 0.4589 | 89.37 | 0.4440 | 88.95 | 0.4537 | 85.57 | 0.4881 | 92.93 | 0.4498 | 83.07 |
| | 100 mA | C/5 | 0.4046 | 78.81 | 0.3722 | 74.58 | 0.3881 | 73.20 | 0.4300 | 81.86 | 0.2867 | 52.95 |
| | 150 mA | C/3.3 | 0.3805 | 74.12 | 0.3203 | 64.18 | 0.3643 | 68.70 | 0.4015 | 76.44 | 0.2273 | 41.98 |
| 0° C | 25 mA | C/20 | 0.4060 | 79.08 | 0.3877 | 77.68 | 0.3944 | 74.37 | 0.4308 | 82.02 | 0.3512 | 64.85 |
| | 50 mA | C/10 | 0.4213 | 82.06 | 0.3800 | 76.14 | 0.4123 | 77.76 | 0.4430 | 84.34 | 0.4024 | 74.31 |
| | 100 mA | C/5 | 0.3647 | 71.04 | 0.2428 | 48.65 | 0.3563 | 67.20 | 0.3926 | 74.74 | 0.2101 | 38.79 |
| | 150 mA | C/3.3 | 0.2897 | 56.41 | 0.1132 | 22.69 | 0.3201 | 60.38 | 0.3414 | 65.00 | 0.0823 | 15.20 |
| -20° C | 25 mA | C/20 | 0.3499 | 68.15 | 0.2838 | 56.87 | 0.3294 | 62.13 | 0.3362 | 64.01 | 0.2291 | 42.31 |
| | 50 mA | C/10 | 0.2750 | 53.57 | 0.0975 | 2.00 | 0.2844 | 53.64 | 0.2631 | 50.10 | 0.0752 | 13.88 |
| | 100 mA | C/5 | 0.1027 | 19.99 | 0.0338 | 6.76 | 0.1365 | 25.74 | 0.1233 | 23.48 | 0.0207 | 3.83 |
| | 150 mA | C/3.3 | 0.0551 | 10.73 | 0.0217 | 4.34 | 0.0474 | 8.94 | 0.0687 | 13.08 | 0.0133 | 2.46 |

Fig. 51

FORMATION CHARACTERISTICS OF EXPERIMENTAL MPG-111/Toda (LiNiMnCoO2) COIN CELLS CONTAINING ELECTROLYTES WITH FLAME RETARDANT ADDITIVES

| CELL NAME | ELECTROLYTE | CATHODE ACTIVE MATERIAL MASS (g) | % FRA | mAh/g OF 5TH CYCLE | LiBOB MOLARITY |
|---|---|---|---|---|---|
| TD 63 | 1.00 M LiPF6 EC+EMC+MB+TPP (20:50:20:10 v/v %) + 0.15M LiBOB | 0.0153 | 10 | 188.62 | 0.15 |
| TD 64 | 1.00 M LiPF6 EC+EMC+MB+TPP (20:50:20:10 v/v %) + 0.15M LiBOB | 0.0141 | 10 | 191.05 | 0.15 |
| TD 65 | 1.00 M LiPF6 EC+EMC+MP+TPP (20:50:20:10 v/v %) + 0.15M LiBOB | 0.0138 | 10 | 190.77 | 0.15 |
| TD 66 | 1.00 M LiPF6 EC+EMC+MP+TPP (20:50:20:10 v/v %) + 0.15M LiBOB | 0.0133 | 10 | 190.38 | 0.15 |
| TD 67 | 1.20 M LiPF6 in EC+DEC+DMC (1:1:1 vol %) + 0.10M LiBOB | 0.0171 | 0 | 196.07 | 0.10 |
| TD 68 | 1.20 M LiPF6 in EC+DEC+DMC (1:1:1 vol %) + 0.10M LiBOB | 0.0131 | 0 | 195.69 | 0.10 |

Fig. 52

FORMATION CHARACTERISTICS OF EXPERIMENTAL Li/Si-C COIN CELLS CONTAINING ELECTROLYTES WITH LOW FLAMMABILITY

| CELL NUMBER | 1ST DISCHARGE (LITHIUM INTERCALATION) (mAh) | 1ST CHARGE (LITHIUM INTERCALATION) (mAh) | 2ND DISCHARGE (LITHIUM INTERCALATION) (mAh) | 2ND CHARGE (LITHIUM INTERCALATION) (mAh) | 5TH DISCHARGE (LITHIUM INTERCALATION) (mAh) | 5TH CHARGE (LITHIUM INTERCALATION) (mAh) | CUMULATIVE IRREVERSIBLE CAPACITY LOSS (mAh/g) | 5TH CHARGE (LITHIUM INTERCALATION) (mAh/g) | ELECTROLYTE |
|---|---|---|---|---|---|---|---|---|---|
| GT 11 | 0.4780 | 0.3081 | 2.4561 | 2.2484 | 1.8325 | 1.8895 | 242.159 | 2222.94 | 1.00M LiPF6 IN EC+DEC+DMC (1:1:1 vol %) |
| GT 13 | 0.5260 | 0.2772 | 2.5103 | 2.1722 | 1.8043 | 1.8563 | 488.414 | 1985.35 | 1.00M LiPF6+0.10M LiBOB IN FEC+EMC +TPP (20:70:10 vol %) |
| GT 14 | 0.5260 | 0.2743 | 2.4673 | 2.0767 | 1.7648 | 1.7688 | 713.694 | 1891.76 | 1.00M LiPF6+0.10M LiBOB IN FEC+EMC +TPP (20:70:10 vol %) |
| GT 15 | 0.5260 | 0.2828 | 2.3215 | 1.9439 | 1.6564 | 1.6572 | 692.037 | 1772.41 | 0.50M LiPF6+0.10M LiBOB IN FEC+TFEB +TPP (20:70:10 vol %) |
| GT 16 | 0.5260 | 0.2701 | 2.6297 | 2.2005 | 1.8990 | 1.9189 | 731.175 | 2052.30 | 1.00M LiPF6+0.15M LiBOB IN EC+EMC+TPP (20:70:10 vol %)+5%VC |

CYCLE LIFE PERFORMANCE OF Li/Si-C CELLS
CONTAINING LOW FLAMMABILITY ELECTROLYTES

Fig. 54

| Fig.54A |
| --- |
| Fig.54B |

Fig. 54A

FORMATION CHARACTERISTICS OF EXPERIMENTAL Si-C/Li (NiCoMn)O2 COIN CELLS CONTAINING ELECTROLYTES WITH LOW FLAMMABILITY

| CELL NUMBER | 1ST CHARGE (mAh) | 1ST DISCHARGE (mAh) | 2ND CHARGE (mAh) | 2ND DISCHARGE (mAh) | 5TH CHARGE (mAh) | 5TH DISCHARGE (mAh) | CUMULATIVE IRREVERSIBLE CAPACITY LOSS (%) | 5TH DISCHARGE (LITHIUM INTERCALATION) (mAh/g) | ELECTROLYTE |
| --- | --- | --- | --- | --- | --- | --- | --- | --- | --- |
| GT 33 | 7.25406 | 5.38150 | 5.47585 | 5.40649 | 5.64741 | 5.50117 | 38.213 | 239.27 | 1.00M LiPF6 IN EC+DEC+DMC (1:1:1 vol %) |
| GT 34 | 7.32056 | 5.42738 | 5.51313 | 5.44854 | 5.64373 | 5.54549 | 37.554 | 237.77 | 1.00M LiPF6 IN EC+DEC+DMC (1:1:1 vol %) |
| GT 35 | 7.13459 | 5.29832 | 5.41529 | 5.38823 | 5.51317 | 5.44595 | 36.175 | 235.17 | 1.00M LiPF6+0.15M LiBOB IN EC+EMC +TPP (20:70:10 vol %) |
| GT 36 | 7.45697 | 5.50086 | 5.61126 | 5.57724 | 5.62636 | 5.58262 | 38.976 | 228.00 | 1.00M LiPF6+0.15M LiBOB IN EC+EMC +TPP (20:70:10 vol %) |
| GT 37 | 7.33505 | 5.36848 | 5.45783 | 5.40215 | 5.51062 | 5.51745 | 38.542 | 229.23 | 1.00M LiPF6+0.10M LiBOB IN FEC+EMC +TPP (20:70:10 vol %) |

Fig. 54B

| | | | | | | | | | |
|---|---|---|---|---|---|---|---|---|---|
| GT 38 | 7.37415 | 5.35470 | 5.46803 | 5.42113 | 5.55874 | 5.58851 | 38.084 | 229.80 | 1.00M $LiPF_6$ +0.10M LiBOB IN FEC+EMC +TPP (20:70:10 vol %) |
| GT 40 | 7.45469 | 5.54502 | 5.62334 | 5.57973 | 5.68610 | 5.61854 | 37.417 | 231.83 | 1.00M $LiPF_6$+0.15M LiBOB IN EC+EMC +MB (20:20:60 vol %) |
| GT 41 | 7.36253 | 5.38552 | 5.48852 | 5.44557 | 5.53153 | 5.50008 | 39.280 | 224.63 | 1.00M $LiPF_6$+0.05M LiBOB IN EC+EMC+TPP (20:70:10 vol %)+1.5%VC |
| GT 42 | 7.36032 | 5.45098 | 5.55390 | 5.52799 | 5.62229 | 5.60441 | 36.039 | 232.84 | 1.00M $LiPF_6$+0.05M LiBOB IN EC+EMC+TPP (20:70:10 vol %)+1.5%VC |

LITHIUM-ION ELECTROLYTES WITH IMPROVED SAFETY TOLERANCE TO HIGH VOLTAGE SYSTEMS

CROSS-REFERENCE TO RELATED APPLICATIONS

This application claims priority to U.S. Provisional Patent Application Ser. No. 61/442,428, filed Feb. 14, 2011, which is incorporated herein by reference in its entirety. This application is a continuation-in-part application of U.S. Non-Provisional patent application Ser. No. 12/543,495, filed on Aug. 18, 2009, which is now U.S. Pat. No. 8,795,903 entitled "LITHIUM-ION ELECTROYLYTES CONTAINING FLAME RETARDANT ADDITIVES FOR INCREASED SAFETY CHARACTERISTICS", which issued as U.S. Pat. No. 8,795,903 on Aug. 5, 2014 and is also incorporated herein by reference in its entirety. U.S. patent application Ser. No. 12/543,495, filed on Aug. 18, 2009, claims priority to U.S. Provisional Application No. 61/189,415, filed on Aug. 19, 2008, and U.S. Provisional Application No. 61/201,842, filed on Dec. 16, 2008.

GOVERNMENT RIGHTS

The invention described herein was made in the performance of work under a NASA contract, and is subject to the provisions of Public Law 96-517 (35 USC 202) in which the Contractor has elected to retain title.

BACKGROUND a. Field of the Invention

The invention relates to electrolytes for batteries. In particular, the invention relates to lithium-ion electrolytes for lithium-ion batteries.

b. Background Art

Lithium-ion ("Li-ion") cells typically include a carbon (e.g., coke or graphite) anode intercalated with lithium ions to form $Li_xC$; an electrolyte consisting of a lithium salt dissolved in one or more organic solvents; and a cathode made of an electrochemically active material, typically an insertion compound, such as $LiCoO_2$. During cell discharge, lithium ions pass from the carbon anode, through the electrolyte to the cathode, where the ions are taken up with the simultaneous release of electrical energy. During cell recharge, lithium ions are transferred back to the anode, where they reintercalate into the carbon matrix.

Future NASA missions aimed at exploring Mars, the Moon, and the outer planets require rechargeable batteries that can operate effectively over a wide temperature range (−60° C. (Celsius) to +60° C. (Celsius)) to satisfy the requirements of various applications, including: Landers (lander spacecraft), Rovers (surface rover spacecraft), and Penetraters (surface penetrator spacecraft). Some future applications typically will require high specific energy batteries that can operate at very low temperatures, while still providing adequate performance and stability at higher temperatures. In addition, many of these applications envisioned by the ESRT (Exploration Systems Research and Technology) program will require improved safety, due to their use by humans. Lithium-ion rechargeable batteries have the demonstrated characteristics of high energy density, high voltage, and excellent cycle life. Currently, the state-of-the-art lithium-ion system has been demonstrated to operate over a wide range of temperatures (−40° C. to +40° C.), however, abuse conditions such as being exposed to high temperature, overcharge, and external shorting, can often lead to cell rupture and fire. The nature of the electrolyte can greatly affect the propensity of the cell/battery to catch fire, given the flammability of the organic solvents used within. Therefore, extensive effort has been devoted recently to developing non-flammable electrolytes to reduce the flammability of the cell/battery.

Desired properties for Li-ion electrolytes can include high conductivity over a wide temperature range (e.g., 1 mS (milli-Siemens) $cm^{-1}$ from −60° C. to +60° C.); good electrochemical stability over a wide voltage range (e.g., 0 to 4.5V (volts)) with minimal oxidative degradation of solvents/salts; good chemical stability; good compatibility with a chosen electrode couple, including good SEI (solid electrolyte interface) characteristics on the electrode and facile lithium intercalation/de-intercalation kinetics; good thermal stability; good low temperature performance throughout the life of the cell, including good resilience to high temperature exposure and minimal impedance build-up with cycling and/or storage; and low toxicity. Since the flammability of the electrolyte solution in Li-ion batteries is a major concern, significant research has been devoted to developing electrolyte formulations with increased safety. Known electrolytes used in state-of-the-art Li-ion cells have typically comprised binary mixtures of organic solvents, for example, high proportions of ethylene carbonate, propylene carbonate or dimethyl carbonate, within which is dispersed a lithium salt, such as lithium hexafluorophosphate ($LiPF_6$). Examples may include 1.0 M (molar) $LiPF_6$ in a 50:50 mixture of ethylene carbonate/dimethyl carbonate, or ethylene carbonate/diethyl carbonate. More recently, electrolytes have also been developed which combine more than two solvents and/or have incorporated the use of electrolyte additives to address specific performance goals.

Fluorinated esters have been incorporated into multi-component electrolyte formulations and their performance was demonstrated over a wide temperature range (−60° C. to +60° C.) (see U.S. application Ser. No. 12/419,473 filed Apr. 7, 2009, for "Lithium Ion Electrolytes and Lithium Ion Cells with Good Low Temperature Performance", Smart et al.). The fluorinated ester co-solvents were employed due to their favorable properties and improved safety characteristics, mainly associated with their low flammability associated with their halogenated nature. Since the flammability of the electrolyte solution in Li-ion batteries is a major concern, significant research has been devoted to developing electrolyte formulations with increased safety. To achieve this, a number of approaches have been adopted, including the use of low-flammability solvents and the use of electrolyte additives. Regarding the first approach, the use of halogenated solvents (Smart, et al., "Improved Performance of Lithium-Ion Cells with the use of Fluorinated Carbonate-Based Electrolytes", *Journal of Power Sources,* 119-121, 359-367 (2003)) and ionic liquids (Xu, Kang, "Nonaqueous Liquid Electrolytes for Lithium-Based Rechargeable Batteries", *Chemical Reviews,* 104, 4303-4417 (2004)) have been pursued. With respect to the use of electrolyte additives, the main focus has been upon the use of phosphorus containing additives, including trimethyl phosphate (Wang, et al., "Nonflammable Trimethyl Phosphate Solvent-Containing Electrolytes for Lithium-Ion Batteries, I. Fundamental Properties", *Journal of the Electrochemical Society,* 148(10), A1058-A1065 (2001); Wang, et al., "Nonflammable Trimethyl Phosphate Solvent-Containing Electrolytes for Lithium-Ion Batteries, II. The Use of An Amorphous Carbon Anode", *Journal of the Electrochemical Society,* 148(10), A1066-A1071 (2001)), triethyl phosphate (Xu, et al., "An Attempt to Formulate Nonflammable Lithium Ion Electrolytes with Alkyl Phosphates and Phosphazenes", *Journal of the Electrochemical Society,*

149(5), A622-A626 (2002)), triphenyl phosphate (Doughty, et al., "Effects of Additives on Thermal Stability of Li ion Cells", *Journal of Power Sources,* 146(1-2), 116-120 (2005)), tris(2,2,2-trifluoroethyl)phosphate (Xu, et al., "Nonflammable Electrolytes for Li-Ion Batteries Based on a Fluorinated Phosphate", *Journal of the Electrochemical Society,* 149(8), A1079-A1082 (2002); Xu, et al., "Evaluation of Fluorinated Alkyl Phosphates as Flame Retardants in Electrolytes for Li-Ion Batteries, I. Physical and Electrochemical Properties", *Journal of the Electrochemical Society,* 150(2), A161-A169 (2003)), and bis(2,2,2-trifluoroethyl)methyl phosphonate (TFMPo) (Xu, et al., "Nonflammable Electrolytes for Li-Ion Batteries Based on a Fluorinated Phosphate", *Journal of the Electrochemical Society,* 149(8), A1079-A1082 (2002); Xu, et al., "Evaluation of Fluorinated Alkyl Phosphates as Flame Retardants in Electrolytes for Li-Ion Batteries, I. Physical and Electrochemical Properties", *Journal of the Electrochemical Society,* 150(2), A161-A169 (2003)).

In addition, known improvements have been made to the safety characteristics of Li-ion electrolytes by the addition of flame retardant additives, such as triphenyl phosphate (referred to as TPhPh or TPP or TPPa), tributyl phosphate (referred to as TBP or TBuPh), triethyl phosphate (referred to as TEP or TEtPh), and bis(2,2,2-trifluoroethyl)methyl phosphonate (referred to as BTFEMP or TFMPo) (see NPO-46262, May 8, 2008). A number of electrolytes based upon these approaches have delivered good performance over a wide temperature range, good cycle life characteristics, and improved safety characteristics, namely reduced flammability. Since the flammability of the electrolyte solution in Li-ion batteries is a major concern, significant research has been devoted to developing electrolyte formulations with increased safety. To achieve this, a number of approaches have been adopted, including the use of low-flammability solvents and the use of electrolyte additives. As discussed above, regarding the first approach, the use of halogenated solvents (Smart, et al., "Improved Performance and Safety of Lithium Ion Cells with the Use of Fluorinated Carbonate-Based Electrolytes", *Journal of Power Sources,* 119-12, 359-367 (2003)) and ionic liquids (Xu, Kang, "Nonaqueous Liquid Electrolytes for Lithium-Based Rechargeable Batteries", *Chemical Review,* 104(10), 4303-4417 (2004)) have been pursued. With respect to the use of electrolyte additives, the main focus has been upon the use of phosphorus containing additives, including trimethyl phosphate, triethyl phosphate, triphenyl phosphate, tris(2,2,2-trifluoroethyl)phosphate, and bis(2,2,2-trifluoroethyl)methyl phosphonate (TFMPo) (see all above). In addition, known phosphorus based flame retardant additives have been investigated. Some of these electrolyte additives have been demonstrated to perform well in multi-component Li-ion battery electrolytes. For example, tris(2,2,2-trifluoroethyl)phosphate (see FIG. 5*e*) has been used in electrolyte solutions consisting of 1.0M $LiPF_6$ in EC+EMC (1:1 wt %) in varying concentrations (Xu, et al., "Nonflammable Electrolytes for Li-Ion Batteries Based on a Fluorinated Phosphate", *Journal of the Electrochemical Society,* 149(8), A1079-A1082 (2002); Xu, et al., "Evaluation of Fluorinated Alkyl Phosphates as Flame Retardants in Electrolytes for Li-Ion Batteries", *Journal of the Electrochemical Society,* 150(2), A161-A169 (2003)). Tris(2,2,2-trifluoroethyl)phosphite (see FIG. 5*f*) has been used in concentrations of up to 15% in solutions of 1.0M $LiPF_6$ PC+EC+EMC (3:3:4 wt %) (Zhang, et al., "Tris(2,2,2-trifluoroethyl)Phosphite as a Co-Solvent for Nonflammable Electrolytes in Li-Ion Batteries", *Journal of Power Sources,* 113 (1), 166-172 (2003)), while others have investigated diphenyloctyl phosphate and tris(2,2,2-trifluoroethyl)phosphate in 1.15M $LiPF_6$ in EC+EMC (3:7 vol %) (Nam, et al., "Diphenyloctyl Phosphate and tris(2,2,2-trifluoroethyl)Phosphite as Flame-Retardant Additives for Li-ion Cell Electrolytes at Elevated Temperature", *Journal of Power Sources,* 180 (1), 561-567 (2008)). Triphenylphosphite (see FIG. 5*g*) has been investigated in solutions consisting of 1.0M $LiPF_6$ in EC+DEC+DMC (1:1:1 wt %) using concentrations of 10 wt % FRA (Ma, et al., "A Phosphorous Additive for Lithium-Ion Batteries", *Electrochemical and Solid State Letters,* 11(8), A129-A131 (2008)).

A number of future NASA missions involving the exploration of the Moon and Mars will be "human-rated" and, thus, require high specific energy rechargeable batteries that possess enhanced safety characteristics for such "human-rated" applications. Given that Li-ion technology is the most viable rechargeable energy storage device for near term applications, effort has been devoted to improving the safety characteristics of this system. Li-ion technology has been identified as being the most promising energy storage device for near term applications, and extensive effort has been devoted to developing advanced anode and cathode materials to improve the energy density. With these new electrode chemistries, there is strong desire to develop Li-ion batteries with improved safety characteristics for both aerospace and terrestrial applications, including for automotive applications such as for hybrid electric vehicles (HEVs) and plug-in hybrid electric vehicles (PHEVs).

The current state of art lithium ion battery electrolytes consists of mixtures of organic carbonates with a lithium ion conducting electrolyte salt, such as lithium hexafluorophosphate ($LiPF_6$). The baseline electrolyte that was employed in the work disclosed herein is a formulation that was originally developed for use in the Mars Surveyor Project 2001 Lander, and consists of 1.0M $LiPF_6$ in EC+DEC+DMC (1:1:1 volume %) (Smart, et al., "Electrolytes for Low-Temperature Lithium Batteries Based on Ternary Mixtures of Aliphatic Carbonates", *Journal of the Electrochemical Society,* 146(2), 486-492 (1999); Smart, et al., U.S. Pat. No. 6,492,064, issued Dec. 10, 2002, entitled "Organic Solvents, Electrolytes, and Lithium Ion Cells with Good Low Temperature Performance").

This electrolyte, in conjunction with MCMB anodes and $LiNiCoO_2$ cathodes, has been demonstrated to provide good cycle life characteristics and a wide operating temperature range (i.e., −30° to +40° C.) in large capacity cells manufactured by Yardney Technical Products, and has been used for a number of NASA past and upcoming missions, including 2003 MER Rovers, *Phoenix* Lander, Grail, June and the Mars Science Laboratory (MSL) Rover (Smart, et al., "Life Verification of Large Capacity Yardney Li-ion Cells and Batteries in Support of NASA Missions", *International Journal of Energy Research,* 34, 116-132 (2010)). Although this electrolyte provides good performance characteristics, there is a desire to improve the safety of the system, due to the fact that abuse conditions can often lead to cell rupture and fire. It is well known that the nature of the electrolyte can greatly affect the propensity of the cell/battery to catch fire, given the flammability of the organic solvents used within. Thus, developing advanced electrolytes to reduce the flammability of cells/batteries has been studied.

To improve the safety characteristics by reducing the flammability of the electrolytes, a number of approaches have been adopted, including the use of low flammability solvents and the use of electrolyte additives. With respect to the use of electrolyte additives, the main focus has been upon the use of phosphorus containing additives, including trimethyl phosphate and triethyl phosphate, as discussed above, as well as tris(2,2,2-trifluoroethyl)phosphate (Xu, et al., "Nonflammable Electrolytes for Li-Ion Batteries Based on a Fluorinated Phosphate", *Journal of the Electrochemical Society,* 149(8), A1079-A1082 (2002); Xu, et al., "Evaluation of Fluorinated Alkyl Phosphates as Flame Retardants in Electrolytes for Li-Ion Batteries, I. Physical and Electrochemical Properties", *Journal of the Electrochemical Society,* 150(2), A161-A169 (2003)), bis(2,2,2-trifluoroethyl)methyl phosphonate (TFMPo) (Xu, et al., "Nonflammable Electrolytes for Li-Ion Batteries Based on a Fluorinated Phosphate", *Journal of the Electrochemical Society,* 149(8), A1079-A1082 (2002); Xu, et al., "Evaluation of Fluorinated Alkyl Phosphates as Flame Retardants in Electrolytes for Li-Ion Batteries, I. Physical and Electrochemical Properties", *Journal of the Electrochemical Society,* 150(2), A161-A169 (2003)), tris (2,2,2-trifluoroethyl)phosphite (Zhang, et al., "Tris(2,2,2-trifluoroethyl)Phosphite as a Co-Solvent for Nonflammable Electrolytes in Li-Ion Batteries", *Journal of Power Sources,* 113, 166-172 (2003); Nam, et al., "Diphenyloctyl Phosphate and tris(2,2,2-trifluoroethyl)Phosphite as Flame-Retardant Additives for Li-ion Cell Electrolytes at Elevated Temperature", *Journal of Power Sources,* 180, 561-567 (2008)), triphenylphosphite (Ma, et al., "A Phosphorous Additive for Lithium-Ion Batteries", *Electrochemical and Solid-State Letters,* 11(8), A129-A131 (2008)), diethyl ethyl-phosphonate, and diethyl phenylphosphonate. Some of these electrolyte additives have been demonstrated to perform well in multi-component Li-ion battery electrolytes. For example, tris(2,2,2-trifluoroethyl)phosphate has been used in electrolyte solutions consisting of 1.0M $LiPF_6$ in EC+EMC (1:1 wt %) in varying concentrations (Xu, et al., "Nonflammable Electrolytes for Li-Ion Batteries Based on a Fluorinated Phosphate", *Journal of the Electrochemical Society,* 149(8), A1079-A1082 (2002); Xu, et al., "Evaluation of Fluorinated Alkyl Phosphates as Flame Retardants in Electrolytes for Li-Ion Batteries, I. Physical and Electrochemical Properties", *Journal of the Electrochemical Society,* 150(2), A161-A169 (2003)).

Therefore, extensive effort has been devoted recently to developing non-flammable electrolytes to reduce the flammability of the cells/battery. A number of electrolytes with reduced flammability have been developed and demonstrated to be compatible with carbon based anodes and a range of cathode materials, including $LiNiCoO_2$, $LiNiCoAlO_2$, and $LiMnNiCoO_2$. For example, promising electrolytes have been developed incorporating flame retardant additives and have been displayed to have good performance in a number of systems, including cells with (1) MCMB anodes and $LiNiCoO_2$ cathodes, (2) MPG-111 graphite anodes and $LiNiCoAlO_2$ cathode electrodes, and (3) lithium metal anodes and $(Li_{0.17}Ni_{0.25}Mn_{0.58})O_2$ cathodes. However, these electrolyte formulations did not perform well when utilizing carbonaceous anodes with the high voltage materials, including $(Li_{0.17}Ni_{0.25}Mn_{0.58})O_2$ and $Li_{1.2}Mn_{0.53}Ni_{0.18}Co_{0.1}O_2$ cathodes. Thus, further development was required to improve the compatibility. In addition, although some of the electrolytes identified and previously described perform well when coupled with silicon-based anode materials, there is a desire to obtain further improved electrolytes that result in long life, while still providing enhanced safety.

In support of a NASA funded project, advanced electrolytes that have improved safety characteristics for advanced lithium-ion chemistries for "human-rated" applications were developed. In addition to resulting in improved safety, the electrolytes should provide: (i) good cycle life characteristics, (ii) good rate capability down to 0° C., and (iii) tolerance to high voltages (i.e., up to 5.0V). Although the current state of art lithium ion battery electrolytes perform well with traditional carbon anodes and low voltage cathodes, such as the baseline electrolyte discussed above in paragraph [0010] adopted for the SPS program (namely 1.0M $LiPF_6$ in EC+DEC+DMC (1:1:1 volume %) (Smart, et al., "Electrolytes for Low-Temperature Lithium Batteries Based on Ternary Mixtures of Aliphatic Carbonates", *Journal of the Electrochemical Society,* 146(2), 486-492 (1999); Smart et al., U.S. Pat. No. 6,492,064, issued Dec. 10, 2002, entitled "Organic Solvents, Electrolytes, and Lithium Ion Cells with Good Low Temperature Performance"), there is a desire to improve upon this performance with silicon anodes and high voltage cathodes. Moreover, there is a desire to reduce the flammability of this mixture, since abuse conditions may lead to cell rupture and fire. It is well accepted that the electrolyte type can greatly affect the propensity of the cell/battery to catch fire, given the flammability of the organic solvents used within.

Silicon-based alloy anode materials are especially attractive alternatives to the traditionally used carbon-based anodes, offering nearly three times more specific capacity. However, due to dramatic volume changes during cycling which results in mechanical disintegration, the materials are generally observed to have rapid capacity fading. Some groups have attempted to modify the electrolyte solution used in these systems with the intent of stabilizing the electrode-electrolyte interface, with the prospect of enhanced life. An ionic electrolyte is known that consists of 1.0M lithium bis(trifluoromethylsulfonyl)imide/1-methyl-1-propylpyrrolidinium bis(trifluoro-methylsulfonyl)imide (LiTFSI/MPP-TFSI) which was observed to provide improved cycle life of Si—Cu film electrodes compared to cells with 1.0M $LiPF_6$ in ethylene carbonate (EC)+diethyl carbonate (DEC), being attributed to desirable solid electrolyte interphase (SEI) formation (Nguyen, et al., "Characterization of SEI Layer Formed on High Performance Si—Cu Anode in Ionic Liquid Battery Electrolyte", *Electrochemistry Communications,* 12(11), 1593-1595 (November 2010)).

Researchers have reported that the use of fluoroethylene carbonate results in improved cycle life of Si electrodes, due to the formation of a stable SEI consisting of lithium fluoride and a polyene-compound (Nakai, et al., "Investigation of the Solid Electrolyte Interphase Formed by Fluoroethylene Carbonate on Si Electrodes", *Journal of the Electrochemical Society,* 158(7), A798-A810 (2011)). Specifically, the researchers described an electrolyte consisting of 1.0M $LiPF_6$ in FEC+DEC (1:1 v/v) delivered improved cycle life performance in Li/Si cells compared to 1.0M $LiPF_6$ in EC+DEC (1:1 v/v). A known system consisting of 0.5M LiBOB+0.38M $LiPF_6$ in EC+DMC+EMC (1:1:1 v/v %)+2% VC reported improved cycling life with Si thin-film electrodes when testing with a lithium counter electrode (Li, et al., "Electrochemical Performance of Si/Graphite/Carbon Composite Electrode in Mixed Electrolytes Containing LiBOB and $LiPF_6$", *Journal of the Electrochemical Society,* 156(4), A294-A298 (2009)). Other approaches involving the use of electrolyte additives include: (a) the use of tris(pentafluorphenyl)borane (2-5 wt %) in $LiClO_4$ in EC+DEC (1:1 v/v) electrolytes (Han, et al., "Tris(pentafluorophenyl)borane as an Electrolyte Additive for High Performance Silicon Thin Film Electrodes in Lithium Ion Batteries", *Electrochimica Acta,* 56(24), 8997-9003 (2011)), (b) the use of succinic anhydride (3 wt %) in $LiPF_6$ in EC+DEC (1:1 v/v) electrolytes (Han, et al., "Effect of succinic anhydride as an electrolyte additive on electrochemical characteristics of silicon thin-film electrode", *Journal of Power Sources,* 195(11), 3709-3714 (2010)), (c) the use of vinylene carbonate (1 wt %) in $LiPF_6$ in EC+DMC (1:1 v/v) electrolytes (Chen, et al., "Enhancing electrochemical performance of silicon film anode by vinylene carbonate electrolyte additive", *Electrochemical and Solid State Letters,* 9(11), A512-A515 (2006)). It should be noted that none of these electrolytes were designed to possess low flammability or improved safety. In addition, all of these studies were performed with lithium metal counter electrodes and the performance with high voltage cathodes was not addressed.

Accordingly, there is a need for lithium-ion electrolytes with improved safety tolerance to high voltage systems and a need for lithium-ion electrolytes with the ability to operate with high capacity silicon-based anodes and high voltage cathodes.

SUMMARY

This need for lithium-ion electrolytes with improved safety tolerance to high voltage systems and a need for lithium-ion electrolytes with the ability to operate with high capacity silicon-based anodes and high voltage cathodes is satisfied. In addition to resulting in improved safety, the electrolytes provide: (i) good cycle life characteristics, (ii) good rate capability down to 0° C., and (iii) tolerance to high voltages (i.e., up to 5.0V).

In one embodiment of the invention there is provided an electrolyte for use in a lithium-ion battery comprising an anode and a high voltage cathode. The electrolyte comprises a mixture of a cyclic carbonate selected from the group consisting of ethylene carbonate (EC) and mono-fluoroethylene carbonate (FEC) co-solvent, ethyl methyl carbonate (EMC), a flame retardant additive, a lithium salt, and an electrolyte additive that improves compatibility and performance of the lithium-ion battery with a high voltage cathode. The lithium-ion battery is charged to a voltage in a range of from about 2.0 V (Volts) to about 5.0 V (Volts).

In another embodiment of the invention there is provided an electrolyte for use in a lithium-ion battery comprising an anode and a high voltage cathode. The electrolyte comprises a mixture of ethylene carbonate (EC), ethyl methyl carbonate (EMC), a flame retardant additive, a lithium salt comprising lithium hexafluorophosphate ($LiPF_6$), and an electrolyte additive that improves compatibility and performance of the lithium-ion battery with a high voltage cathode, wherein the electrolyte additive comprises lithium bis(oxalato)borate (LiBOB). The lithium-ion battery is charged to a voltage in a range of from about 2.0 V (Volts) to about 5.0 V (Volts).

In another embodiment of the invention, there is provided an electrolyte for use in a lithium-ion battery comprising a high capacity silicon-based anode and a high voltage cathode. The electrolyte comprises a mixture of ethyl methyl carbonate (EMC), mono-fluoroethylene carbonate (FEC) co-solvent, a flame retardant additive, a lithium salt comprising lithium hexafluorophosphate ($LiPF_6$), and an electrolyte additive that improves compatibility and performance of the lithium-ion battery with a high voltage cathode, wherein the electrolyte additive comprises lithium bis(oxalato)borate (LiBOB). The lithium-ion battery is charged to a voltage in a range of from about 2.0 V (Volts) to about 5.0 V (Volts).

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The invention can be better understood with reference to the following detailed description taken in conjunction with the accompanying drawings which illustrate preferred and exemplary embodiments, but which are not necessarily drawn to scale, wherein:

FIG. 1 is an illustration of a table summary of charge-discharge characteristics of experimental lithium-ion cells containing various electrolytes subjected to formation cycling according to the invention;

FIG. 2 is an illustration of a table summary of discharge capacity at low temperature for MCMB-$LiNiCoO_2$ containing electrolytes with flame retardant additives according to the invention;

FIG. 6 is an illustration of a table summary of charge-discharge characteristics of experimental MCMB-$LiNiCoO_2$ cells containing electrolytes with flame retardant additives subjected to formation cycling according to the invention;

FIG. 8 is an illustration of a table summary of discharge capacity at low temperature of a number of MCMB-$LiNiCoO_2$ cells containing electrolytes with flame retardant additives according to the invention;

FIG. 12 is an illustration of a summary table of formation characteristics of electrolytes with flame retardant additives and fluoroesters according to the invention;

FIG. 14 is an illustration of a summary table of results obtained from Electrochemical Impedance Spectroscopy (EIS) measurements for cathodes in contact with electrolytes with flame retardant additives and fluoroesters according to the invention;

FIG. 15 is an illustration of a summary table of results obtained from Electrochemical Impedance Spectroscopy (EIS) measurements for anodes in contact with electrolytes with flame retardant additives and fluoroesters according to the invention;

FIG. 18 is an illustration of a table summary of DC micro-polarization measurements for the cathode of cells containing flame retardant additives and fluoroester electrolytes according to the invention;

FIG. 19 is an illustration of a table summary of DC micro-polarization measurements for the anode of cells containing flame retardant additives and fluoroester electrolytes according to the invention;

FIG. 21 is an illustration of a table summary of formation characteristics of electrolytes with flame retardant additives and SEI enhancing agent according to the invention;

FIG. 22 is an illustration of a table summary of evaluation of low temperature performance of cells containing flame retardant additives and SEI additive according to the invention;

FIG. 23 is an illustration of a table summary of results obtained from Electrochemical Impedance Spectroscopy (EIS) measurements for the cathodes of cells containing flame retardant additives/VC according to the invention;

FIG. 24 is an illustration of a table summary of results obtained from Electrochemical Impedance Spectroscopy (EIS) measurements for the anodes of cells containing flame retardant additives/VC according to the invention;

FIG. 25 is an illustration of a table summary of linear polarization measurements for the anodes of cells containing electrolytes with flame retardant additives/VC according to the invention;

FIG. 26 is an illustration of a table summary of linear polarization measurements for the cathodes of cells containing electrolytes with flame retardant additives/VC according to the invention;

FIG. 27 is an illustration of a table summary of formation characteristics of experimental MCMB-$LiNiCoO_2$ cells containing electrolytes with flame retardant additives subjected to formation cycling according to the invention;

FIG. 28 is an illustration of a table summary of discharge capacity at low temperature of a number of MCMB-$LiNiCoO_2$ cells containing electrolytes with flame retardant additives according to the invention;

FIG. 33 is an illustration of a table summary of discharge capacity at low temperature of a number of MCMB-$LiNiCoO_2$ cells containing electrolytes with 10% TPP and TFEMC and/or FEC according to the invention;

FIG. 35 is an illustration of a table summary of the formation characteristics of a number of Li—Li $(Li_{0.17}Ni_{0.25}Mn_{0.58})O_2$ cells containing various electrolytes with TPP and TPPi flame retardant additives according to the invention;

FIG. 36 is an illustration of a table summary of discharge performance of a 7 Ah Li-ion cell containing 1.0M $LiPF_6$ in EC+EMC+TPP+VC (19.7/73.9/4.9/1.5 v/v %) according to the invention;

FIG. 40 is an illustration of a table summary of formation characteristics of experimental MPG-111/Toda ($LiNiMnCoO_2$) coin cells containing electrolytes with flame retardant additives (cells TD01-TD02, TD05-TD19) according to the invention;

FIG. 41 is an illustration of a table summary of formation characteristics of experimental MPG-111/Toda ($LiNiMnCoO_2$) coin cells containing electrolytes with flame retardant additives (cells TD03-TD04, TD21-TD32), where cells TD03-TD30 were all cycled over a voltage range of 2.0V to 4.80V (with a C/100 taper current cut-off), and cells TD31-TD32 were cycled over a voltage range of 2.0V to 4.60V (with a C/100 taper current cut-off) according to the invention;

FIG. 43 is an illustration of a table summary of formation characteristics of experimental MPG-111/Toda ($LiNiMnCoO_2$) coin cells containing electrolytes with flame retardant additives (cells TD33-TD42), where all cells were cycled over a voltage range of 3.0V to 4.60V (with a C/100 taper current cut-off) according to the invention;

FIG. 45 is an illustration of a table summary of discharge rate characteristics of experimental MPG-111/Toda ($LiNiMnCoO_2$) coin cells containing electrolytes with flame retardant additives (cells TD33-TD36), where all cells cycled over a voltage range of 3.0V to 4.60V (with a C/100 taper current cut-off) according to the invention;

FIG. 46 is an illustration of a table summary of discharge rate characteristics of experimental MPG-111/Toda ($LiNiMnCoO_2$) coin cells containing electrolytes with flame retardant additives (cells TD37-TD40), where all cells cycled over a voltage range of 3.0V to 4.60V (with a C/100 taper current cut-off) according to the invention;

FIG. 47 is an illustration of a table summary of discharge rate characteristics of experimental MPG-111/Toda ($LiNiMnCoO_2$) coin cells containing electrolytes with flame retardant additives (cells TD41-TD42), where all cells cycled over a voltage range of 3.0V to 4.60V (with a C/100 taper current cut-off) according to the invention;

FIGS. 49A-49B are illustrations of table summaries of formation characteristics of experimental MPG-111/$LiNiCoAlO_2$ (NCA) cells containing electrolytes with flame retardant additives, where all cells were cycled over a voltage range of 2.75V to 4.10V (with a C/100 taper current cut-off) according to the invention;

FIG. 50 is an illustration of a table summary of discharge characteristics of experimental MPG-111/$LiNiCoAlO_2$ (NCA) cells containing electrolytes with flame retardant additives according to the invention;

FIG. 51 is an illustration of a table summary of formation characteristics of experimental MPG-111/Toda ($LiNiMnCoO_2$) coin cells containing electrolytes with flame retardant additives (TD63-TD68), where all cells were cycled over a voltage range of 3.0V to 4.60V (with a C/100 taper current cut-off) according to the invention;

FIG. 52 is an illustration of a table summary of formation characteristics of experimental Li/Si—C coin cells containing electrolytes with low flammability according to the invention;

FIGS. 54A-54B are illustrations of table summaries of formation characteristics of experimental Si—C/Li$(NiCoMn)O_2$ coin cells containing electrolytes with low flammability according to the invention;

DETAILED DESCRIPTION

Disclosed embodiments will now be described more fully hereinafter with reference to the accompanying drawings, in which some, but not all disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

The invention discloses various embodiments of Li-ion electrolytes containing flame retardant additives that have delivered good performance over a wide temperature range, good cycle life characteristics, and improved safety characteristics, namely, reduced flammability. In addition, the invention discloses lithium-ion electrochemical cells comprising anodes; cathodes; and embodiments of the electrolyte of the invention interspersed between the anodes and the cathodes.

Figure 39:
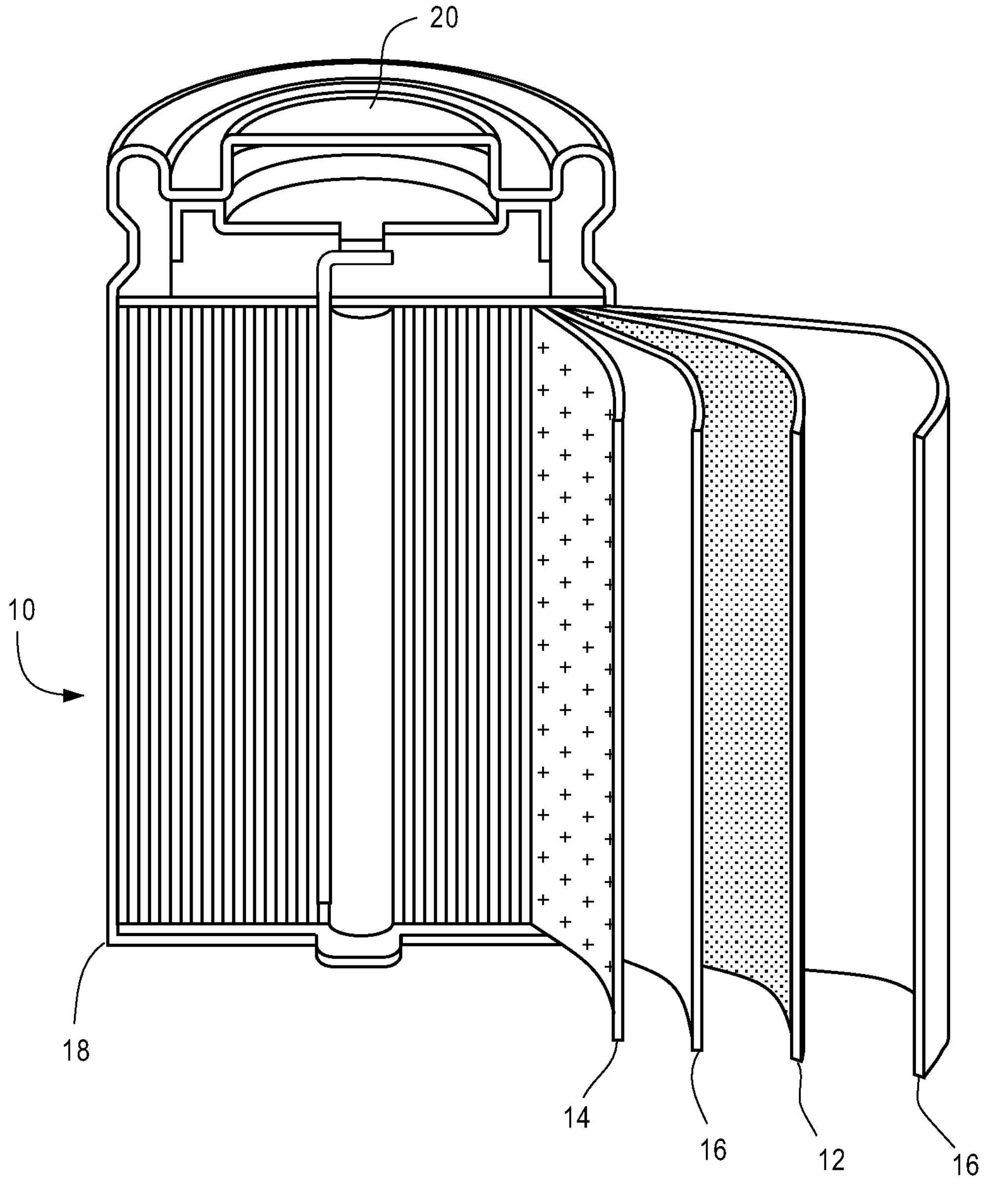
FIG. 39 is an illustration of a partially exploded view of a lithium-ion electrochemical cell constructed according to one embodiment of the invention.

FIG. 39 is an illustration of a partially exploded view of a lithium-ion electrochemical cell 10 or battery constructed according to one embodiment of the invention. The electrolytes and organic solvents described herein may be used in the construction of the improved Li-ion electrochemical cell, characterized by good performance over a wide temperature range, good cycle life characteristics, and improved safety characteristics. The electrochemical cell preferably operates in a temperature range of from about −50 degrees C. (Celsius) to about 60 degrees C. (Celsius). The lithium-ion electrochemical cell 10 comprises an anode 12. The anode 12 may comprise mesocarbon microbeads (MCMB) carbon, lithium titanate ($Li_4Ti_5O_{12}$), carbon graphite, coke based carbon, lithium metal, silicon-based, or another suitable material. Carbon is the preferred anode material for lithium-ion rechargeable cells due to its low potential versus lithium (of the lithiated compound), excellent reversibility for lithium intercalation/de-intercalation reactions, good electronic conductivity, and low cost. Three broad types of carbonaceous anodic materials are known: (a) non-graphitic carbon, e.g., petroleum coke, pitch coke, (b) graphitic carbon, e.g., natural graphite, synthetic graphite, and (c) modified carbon, e.g., mesocarbon microbead carbon material. The lithium-ion electrochemical cell further comprises a cathode 14 such as an insertion-type cathode. The cathode 14 may comprise lithium cobalt oxide ($LiCoO_2$), lithium nickel cobalt oxide ($LiNi_{0.8}Co_{0.2}O_2$), lithium manganese oxide ($LiMn_2O_4$), lithium nickel cobalt aluminum oxide ($LiNiCoAlO_2$), lithium metal phosphate ($LiMPO_4$) where the metal may comprise iron, cobalt, manganese, or another suitable metal, lithium nickel cobalt manganese oxide ($LiNiCoMnO_2$) (including lithium excess layered-layered composite cathodes), high voltage electrodes such as $Li(Li_{0.17}Ni_{0.25}Mn_{0.58})O_2$ and $LiMn_2O_4$ spinel, or another suitable material. Suitable cathode materials include transition metal oxides, such as insertion-type metal oxides. In lithium-ion cells, the cathode functions as a source of lithium for the intercalation/deintercalation reactions at the anode and the cathode. Also, it is preferable that the cathode material in lithium-ion cells have a high voltage versus lithium (>3.0 V) to compensate for voltage losses due to the use of alternate lithium anode materials (having reduced lithium activity) such as lithiated carbon and silicon. Lithiated cobalt oxide is a preferred compound because of its ease of preparation and reversibility. Lithiated nickel oxide, lithiated manganese oxide, and other suitable lithiated metal oxides are good alternatives. The anode 12 may be separated from the cathode 14 by one or more electrolyte-permeable separators 16, with the anode/separator(s)/cathode preferably cylindrically rolled up in "jelly roll" fashion and inserted into a can or case 18, which is sealed or closed by a cap 20. The Li-ion electrochemical cell 10 further comprises an electrolyte, such as one of the electrolytes discussed in detail below, interspersed between the anode and the cathode. Both the anode 12 and the cathode 14 are bathed in the electrolyte which is able to pass through the separator(s), allowing ion movement from one electrode to the other. The electrolyte that may be used in the Li-ion electrochemical cell may comprise one of the below discussed mixtures. Other features, such as one or more gaskets, anode and cathode tabs, safety vents, center pin, and other features known in the art may be included as deemed appropriate, in accordance with known battery design and fabrication. The electrolytes of the invention may be used in the above-described electrochemical cell or battery, and may also be used in such batteries as automotive Li-ion cell batteries, computer laptop Li-ion cell batteries, and can be used for aerospace applications (e.g., astronaut equipment, satellites, planetary rovers, and other suitable applications), and military applications (e.g., communications devices, aircraft batteries, back-up power sources, and other suitable applications).

In one embodiment of the invention, there is provided an electrolyte for use in a lithium-ion battery comprising an anode and a high voltage cathode. The anode may comprise a carbon-based anode, a high capacity silicon-based anode, or another suitable anode. The cathode may comprise a high voltage cathode, a high voltage metal oxide cathode, or another suitable cathode. The electrolyte comprises a mixture of a cyclic carbonate comprising ethylene carbonate (EC) or mono-fluoroethylene carbonate (FEC) co-solvent, ethyl methyl carbonate (EMC), a flame retardant additive, a lithium salt, and an electrolyte additive that improves compatibility and performance of the lithium-ion battery with a high voltage cathode. Preferably, the lithium-ion battery is charged to a voltage in a range of from about 2.0 V (Volts) to about 5.0 V (Volts). More preferably, the lithium-ion battery is charged to a voltage in a range of from about 2.0 V (Volts) to about 4.8 V (Volts). Most preferably, the lithium-ion battery is charged to a voltage in a range of from about 2.5 V (Volts) to about 4.6 V (Volts).

The flame retardant additive may comprise triphenyl phosphate (TPhPh/TPP/TPPa), tributyl phosphate (TBP/TBuPh), triethyl phosphate (TEP/TEtPh), bis(2,2,2-trifluoroethyl)methyl phosphonate (BTFEMP/TFMPo), tris(2,2,2-trifluoroethyl)phosphate, diethyl ethylphosphonate, diethyl phenylphosphonate, mixtures thereof, or another suitable flame retardant additive. Preferably, the flame retardant additive comprises triphenyl phosphate (TPhPh/TPP/TPPa) or "TPP". Preferably, the flame retardant additive comprises from about 5% to about 20% by volume triphenyl phosphate (TPhPh/TPP/TPPa) or "TPP". More preferably, the flame retardant additive comprises from about 5% to about 15% by volume triphenyl phosphate (TPhPh/TPP/TPPa) or "TPP". Most preferably, the flame retardant additive comprises from about 10% to about 15% by volume triphenyl phosphate (TPhPh/TPP/TPPa) or "TPP".

The lithium salt may comprise lithium hexafluorophosphate ($LiPF_6$), lithium tetrafluoroborate ($LiBF_4$), lithium bis(oxalato)borate (LiBOB), lithium hexafluoroarsenate ($LiAsF_6$), lithium perchlorate ($LiClO_4$), lithium trifluoromethanesulfonate ($LiCF_3SO_3$), lithium bistrifluoromethanesulfonate sulfonyl imide ($LiN(SO_2CF_3)_2$), mixtures thereof, or another suitable lithium salt. Preferably, the lithium salt comprises lithium hexafluorophosphate ($LiPF_6$). The electrolyte additive may comprise lithium bis(oxalato) borate (LiBOB), lithium difluoro(oxalato)borate (LiODFB), lithium tetrafluorooxalatophosphate ($LiPF_4(C_2O_4)$), mixtures thereof, or another suitable electrolyte additive. Preferably, the electrolyte additive comprises lithium bis(oxalato) borate (LiBOB). Preferably, the electrolyte additive comprises a molar concentration of lithium bis(oxalato)borate (LiBOB) in a range of from about 0.05M (molar) to about 0.25M (molar). More preferably, the electrolyte additive comprises a molar concentration of lithium bis(oxalato)borate (LiBOB) in a range of from about 0.1M (molar) to about 0.15M (molar).

In one preferred embodiment of the invention, the electrolyte comprises the lithium salt of 1.0M lithium hexafluorophosphate ($LiPF_6$) in 20% by volume ethylene carbonate (EC) plus 65% to 70% by volume ethyl methyl carbonate (EMC) plus 10% to 15% by volume of the flame retardant additive of triphenyl phosphate (TPhPh/TPP/TPPa) plus the electrolyte additive of 0.15M lithium bis(oxalato)borate (LiBOB).

In another embodiment, the electrolyte may further comprise methyl propionate (MP) or methyl butyrate (MB). If the electrolyte comprises methyl propionate (MP) or methyl butyrate (MB), the electrolyte preferably comprises the lithium salt of 1.0M lithium hexafluorophosphate ($LiPF_6$) in 20% by volume ethylene carbonate (EC) plus 45% to 50% by volume ethyl methyl carbonate (EMC) plus 20% by volume of methyl propionate (MP) or methyl butyrate (MB) plus 10% to 15% by volume of the flame retardant additive of triphenyl phosphate (TPhPh/TPP/TPPa) plus the electrolyte additive of 0.15M lithium bis(oxalato)borate (LiBOB).

In another embodiment of the invention, there is provided an electrolyte for use in a lithium-ion battery comprising an anode and a high voltage cathode. Preferably, the anode is a high capacity silicon-based anode. Preferably, the cathode is a high voltage metal oxide cathode. A preferred embodiment with the lithium-ion battery comprising a high capacity silicon-based anode and a high voltage metal oxide cathode may comprise the lithium salt of 1.0M lithium hexafluorophosphate ($LiPF_6$) in 20% by volume mono-fluoroethylene carbonate (FEC) co-solvent plus 65% to 70% by volume ethyl methyl carbonate (EMC) plus 10% to 15% by volume of the flame retardant additive of triphenyl phosphate (TPhPh/TPP/TPPa) plus the electrolyte additive of 0.10M lithium bis(oxalato) borate (LiBOB).

In another embodiment of the invention, the electrolyte may further comprise dimethyl carbonate (DMC) which replaces ethyl methyl carbonate (EMC). If the electrolyte comprises dimethyl carbonate (DMC) in place of ethyl methyl carbonate (EMC), the electrolyte preferably comprises the lithium salt of 1.0M lithium hexafluorophosphate ($LiPF_6$) in 30% by volume mono-fluoroethylene carbonate (FEC) co-solvent plus 30% by volume ethylene carbonate (EC) plus 25% to 30% by volume dimethyl carbonate (DMC) plus 10% to 15% by volume of the flame retardant additive of triphenyl phosphate (TPhPh/TPP/TPPa) plus the electrolyte additive of 0.10M lithium bis(oxalato)borate (LiBOB).

In another embodiment of the invention there is provided an electrolyte for use in a lithium-ion battery comprising an anode and a high voltage cathode. The electrolyte comprises a mixture of ethylene carbonate (EC), ethyl methyl carbonate (EMC), a flame retardant additive, a lithium salt comprising lithium hexafluorophosphate ($LiPF_6$), and an electrolyte additive that improves compatibility and performance of the lithium-ion battery with a high voltage cathode, wherein the electrolyte additive comprises lithium bis(oxalato)borate (LiBOB). Preferably, the lithium-ion battery is charged to a voltage in a range of from about 2.0 V (Volts) to about 5.0 V (Volts). More preferably, the lithium-ion battery is charged to a voltage in a range of from about 2.0 V (Volts) to about 4.8 V (Volts). Most preferably, the lithium-ion battery is charged to a voltage in a range of from about 2.5 V (Volts) to about 4.6 V (Volts). The electrolyte preferably comprises 1.0M lithium hexafluorophosphate ($LiPF_6$) in 20% by volume ethylene carbonate (EC) plus 65% to 70% by volume ethyl methyl carbonate (EMC) plus 10% to 15% by volume of the flame retardant additive of triphenyl phosphate (TPhPh/TPP/TPPa) plus 0.15M lithium bis(oxalato)borate (LiBOB). The electrolyte may further comprise methyl propionate (MP) or methyl butyrate (MB).

In another embodiment of the invention, there is provided an electrolyte for use in a lithium-ion battery comprising a high capacity silicon-based anode and a high voltage cathode. The electrolyte comprises a mixture of ethyl methyl carbonate (EMC), mono-fluoroethylene carbonate (FEC) co-solvent, a flame retardant additive, a lithium salt comprising lithium hexafluorophosphate ($LiPF_6$), and an electrolyte additive that improves compatibility and performance of the lithium-ion battery with a high voltage cathode, wherein the electrolyte additive comprises lithium bis(oxalato)borate (LiBOB). Preferably, the lithium-ion battery is charged to a voltage in a range of from about 2.0 V (Volts) to about 5.0 V (Volts). More preferably, the lithium-ion battery is charged to a voltage in a range of from about 2.0 V (Volts) to about 4.8 V (Volts). Most preferably, the lithium-ion battery is charged to a voltage in a range of from about 2.5 V (Volts) to about 4.6 V (Volts). The electrolyte preferably comprises 1.0M lithium hexafluorophosphate ($LiPF_6$) in 20% by volume mono-fluoroethylene carbonate (FEC) co-solvent plus 65% to 70% by volume ethyl methyl carbonate (EMC) plus 10% to 15% by volume of the flame retardant additive of triphenyl phosphate (TPhPh/TPP/TPPa) plus 0.10M lithium bis(oxalato)borate (LiBOB). The electrolyte may further comprise dimethyl carbonate (DMC) which replaces or in place of ethyl methyl carbonate (EMC).

EXAMPLES AND ELECTROCHEMICAL MEASUREMENTS

Li-Ion Electrolytes Containing FRA and Incorporating Fluorinated Ester Co-Solvents Description.

Experiments were conducted on Li-ion electrolytes containing flame retardant additives (FRA) and incorporating fluorinated ester co-solvents. As part of a continuing effort to develop advanced electrolytes to improve the safety and performance of Li-ion cells, especially over a wide operating temperature range, a number of Li-ion electrolytes that contain flame retardant additive in conjunction with fluorinated ester co-solvents were developed to provide a safe, wide operating temperature range system. The safety characteristics of these electrolytes were further improved by the addition of flame retardant additives, such as triphenyl phosphate (TPP or TPPA or TPhPh), tributyl phosphate (TBP or TBuPh), triethyl phosphate (TEP or TEtPh), and bis(2,2,2-trifluoroethyl)methyl phosphonate (BTFEMP or TFMPo). A number of electrolytes based upon these approaches have delivered good performance over a wide temperature range, good cycle life characteristics, and improved safety characteristics, namely reduced flammability.

The following electrolyte formulations were investigated and demonstrated in experimental MCMB carbon-$LiNi_{0.8}Co_{0.2}O_2$ cells: (1) 1.0 M $LiPF_6$ in EC+EMC+TFEB+TPP (20:55:20:5 v/v %); (2) 1.0 M $LiPF_6$ in EC+EMC+TFEB+TBP (20:55:20:5 v/v %); (3) 1.0 M $LiPF_6$ in EC+EMC+TFEB+TEP (20:55:20:5 v/v %); (4) 1.0 M $LiPF_6$ in EC+EMC+TFEB+BTFEMP (20:55:20:5 v/v %); (5) 1.0 M $LiPF_6$ in EC+EMC+TPP (20:75:5 v/v %); (6) 1.0 M $LiPF_6$ in EC+EMC+TPP (20:75:5 v/v %)+1.5% VC; (7) 1.0 M $LiPF_6$ in EC+EMC (20:80 v/v %)+1.5% VC; and, (8) 1.0 M $LiPF_6$ in EC+EMC (20:80 v/v %) (Baseline).

In general, many of the formulations displayed good performance over a wide temperature range, good cycle life characteristics, and were expected to have improved safety characteristics, namely low flammability. Of the electrolytes studied, 1.0 M $LiPF_6$ EC+EMC+TFEB+TPP (20:55:20:5 v/v %) (where TPP=triphenyl phosphate) was identified as being a promising non-flammable electrolyte, due to reasonable low temperature performance and superior life characteristics. In addition, the electrolyte consisting of 1.0 M $LiPF_6$ EC+EMC+TPP (20:75:5 v/v %)+1.5% VC was demonstrated to have even further improved life characteristics, due to the incorporation of an SEI (solid electrolyte interface) promoter (i.e., VC=vinylene carbonate), which appears to inhibit the decomposition of the TPP.

A number of experimental lithium-ion cells, consisting of MCMB carbon anodes and $LiNi_{0.8}Co_{0.2}O_2$ cathodes, have been fabricated to study the described technology. These cells served to verify and demonstrate the reversibility, low temperature performance, and electrochemical aspects of each electrode as determined from a number of electrochemical characterization techniques. The electrolytes selected for evaluation are listed above (see electrolytes 1-8). FIG. 1 is an illustration of a table summary of charge-discharge characteristics of experimental lithium-ion cells containing various electrolytes subjected to formation cycling according to the invention. As shown in FIG. 1, all cells displayed good reversibility at room temperature and minimal reactivity during the formation cycling. The high coulombic efficiency and comparable irreversible capacity losses were indirectly related to the overall stability of the solutions and the electrode filming characteristics. As further shown in FIG. 1, reasonable reversibility was observed with the cells containing all of the electrolyte variations, when compared after the formation cycling. It should be noted that some variation in capacity was due to different electrode weights, and not electrolyte type, so most comparisons were expressed in terms of percentage of initial capacity under ambient temperatures. Of the additives investigated, the triphenyl phosphate (TPP) displayed the lowest irreversible capacity losses and highest coulombic efficiency, suggesting that it is not electrochemically decomposing and participating in the electrode filming process deleteriously.

Low Temperature Performance.

FIG. 2 is an illustration of a table summary of discharge capacity at low temperature for MCMB-$LiNiCoO_2$ containing electrolytes with flame retardant additives according to the invention. When the cells described were evaluated at low temperatures, as shown in FIG. 2, reasonable low temperature performance was generally observed. This finding was significant since the use of flame retardant additives was anticipated in decreasing the power capability and low temperature performance, due to decreased ionic conductivity of the media and increased electrode film resistance with the possible reactivity of the FRA.

Figure 3:
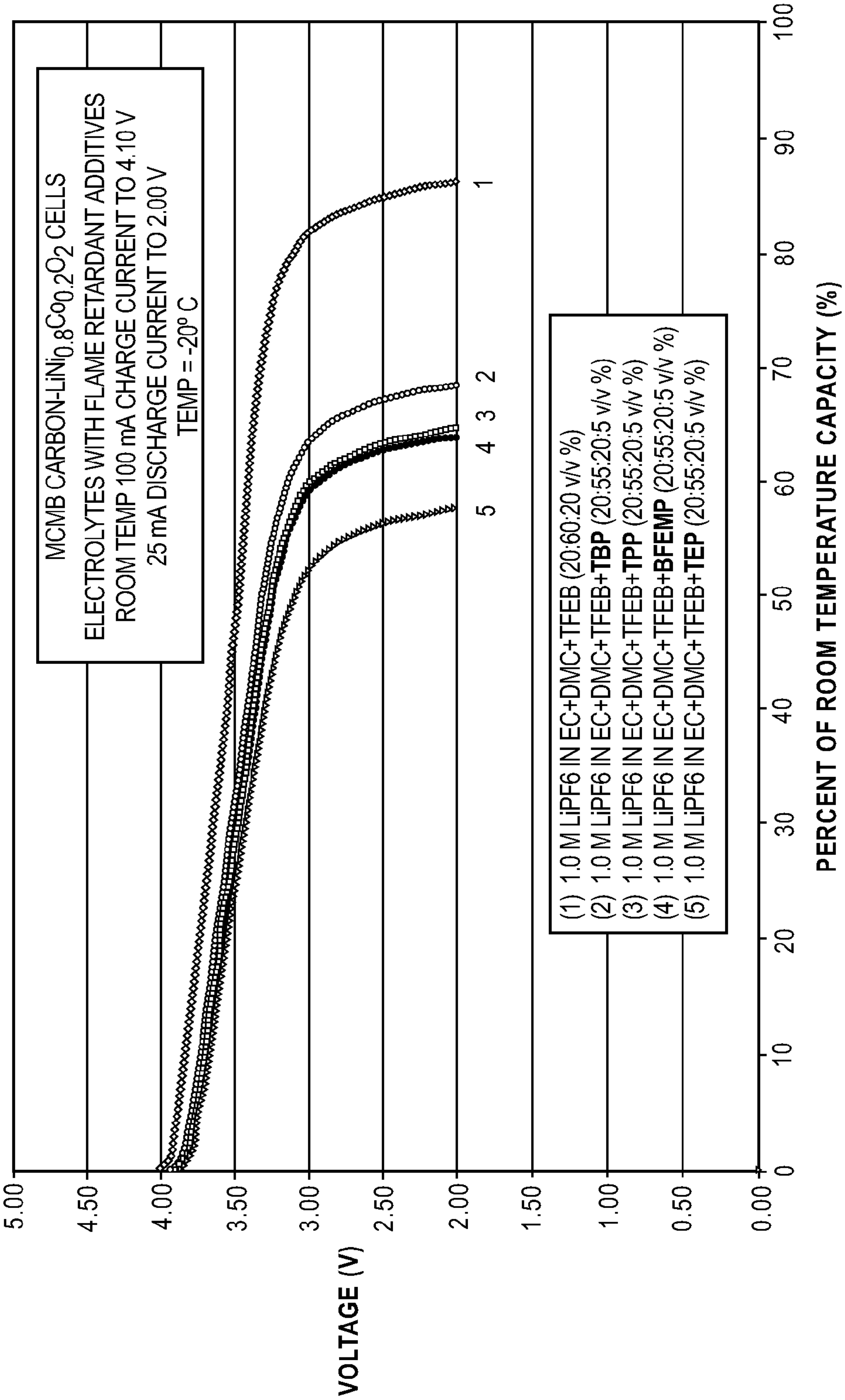
FIG. 3 is an illustration of a graph showing discharge capacity at −20° C. (expressed as percent of room temperature capacity) of MCMB-$LiNiCoO_2$ cells containing electrolytes with flame retardant additives according to the invention.

As expected, the low temperature performance was somewhat compromised upon the addition of the flame retardant additives, especially at temperatures below −20° C. (Celsius). Of the FRA-containing electrolytes the formulation containing tributyl phosphate delivered the best performance at low temperature, with over 68% of the room temperature capacity being delivered at −20° C. using a ~C/16 (approximate full capacity over 16 hour discharge rate), as illustrated in FIG. 3. FIG. 3 is an illustration of a graph showing discharge capacity at −20° C. (expressed as percent of room temperature capacity) of MCMB-$LiNiCoO_2$ cells containing electrolytes with flame retardant additives according to the invention. The x-axis shows percent of room temperature capacity (%) and the y-axis shows voltage (V).

Cycle Life Performance.

Figure 4:
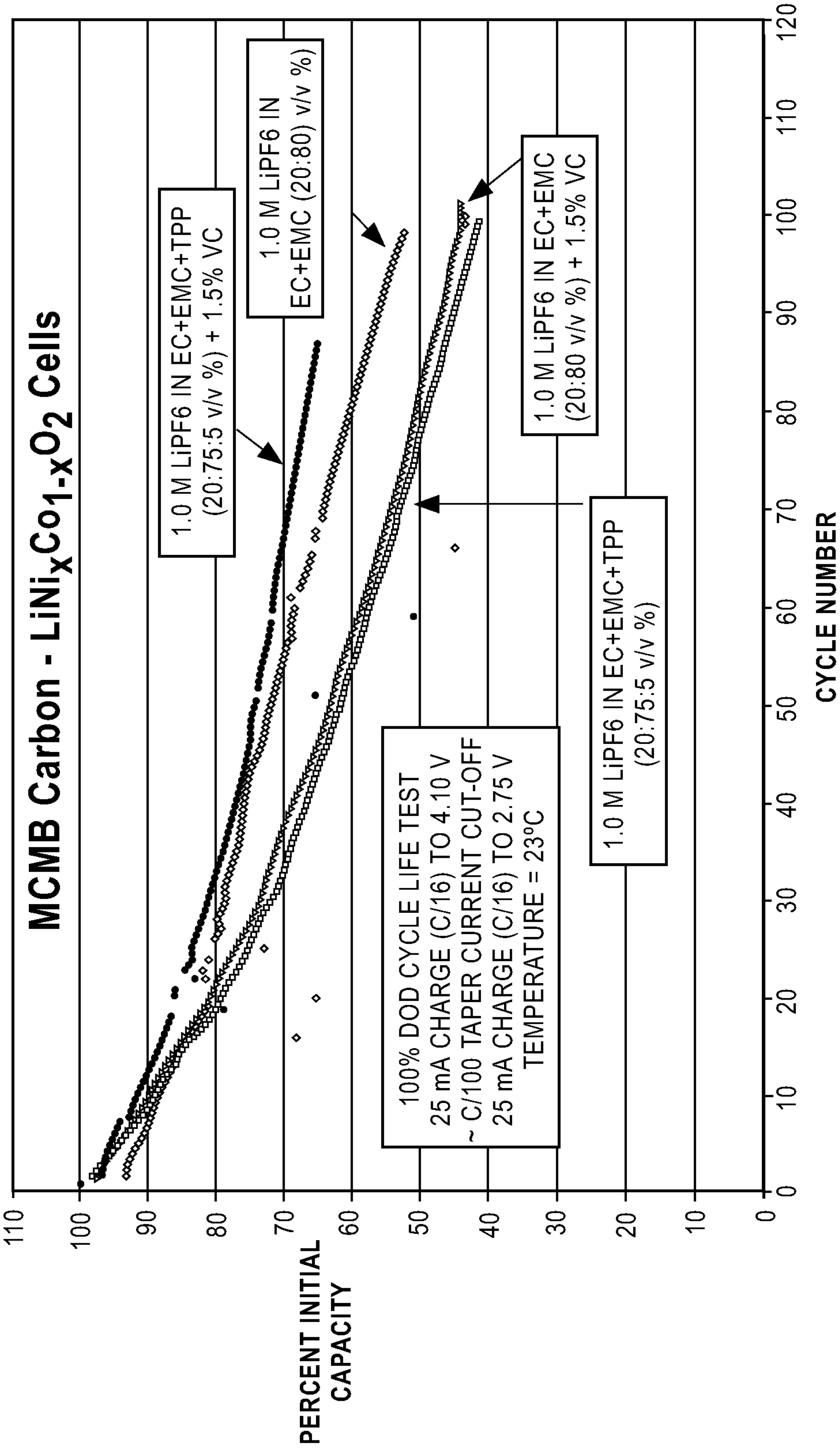
FIG. 4 is an illustration of a graph showing cycle life performance of MCMB-$LiNiCoO_2$ cell containing electrolytes with flame retardant additives according to the invention.

As mentioned previously, the general expectation was that the cycle life performance would be compromised with the addition of FRAs due to the possible reactivity with the electrode interfaces leading to impedance build-up and capacity loss. To mitigate this, incorporation of a "film forming" additive to the electrolyte to prevent excessive reactivity of the FRA, especially at the anode, was investigated. FIG. 4 is an illustration of a graph showing cycle life performance of MCMB-$LiNiCoO_2$ cell containing electrolytes with flame retardant additives according to the invention. The x-axis shows cycle number and the y-axis shows percent initial capacity. As illustrated in FIG. 4, when vinylene carbonate (VC), a well-known SEI "film forming" additive, was added to an electrolyte containing an FRA additive (e.g, triphenyl phosphate), much improved cycle life performance was obtained. It is anticipated that this approach can be extended to other FRA-containing electrolytes which have different solvent blends, salt types, and/or which employed other SEI film forming agents. It should also be noted that the cycle life performance is anticipated to be much better in aerospace quality lithium-ion cells, due to the fact that the data reflects experimental cells which are a flooded design, and not hermetically sealed.

Figure 13:
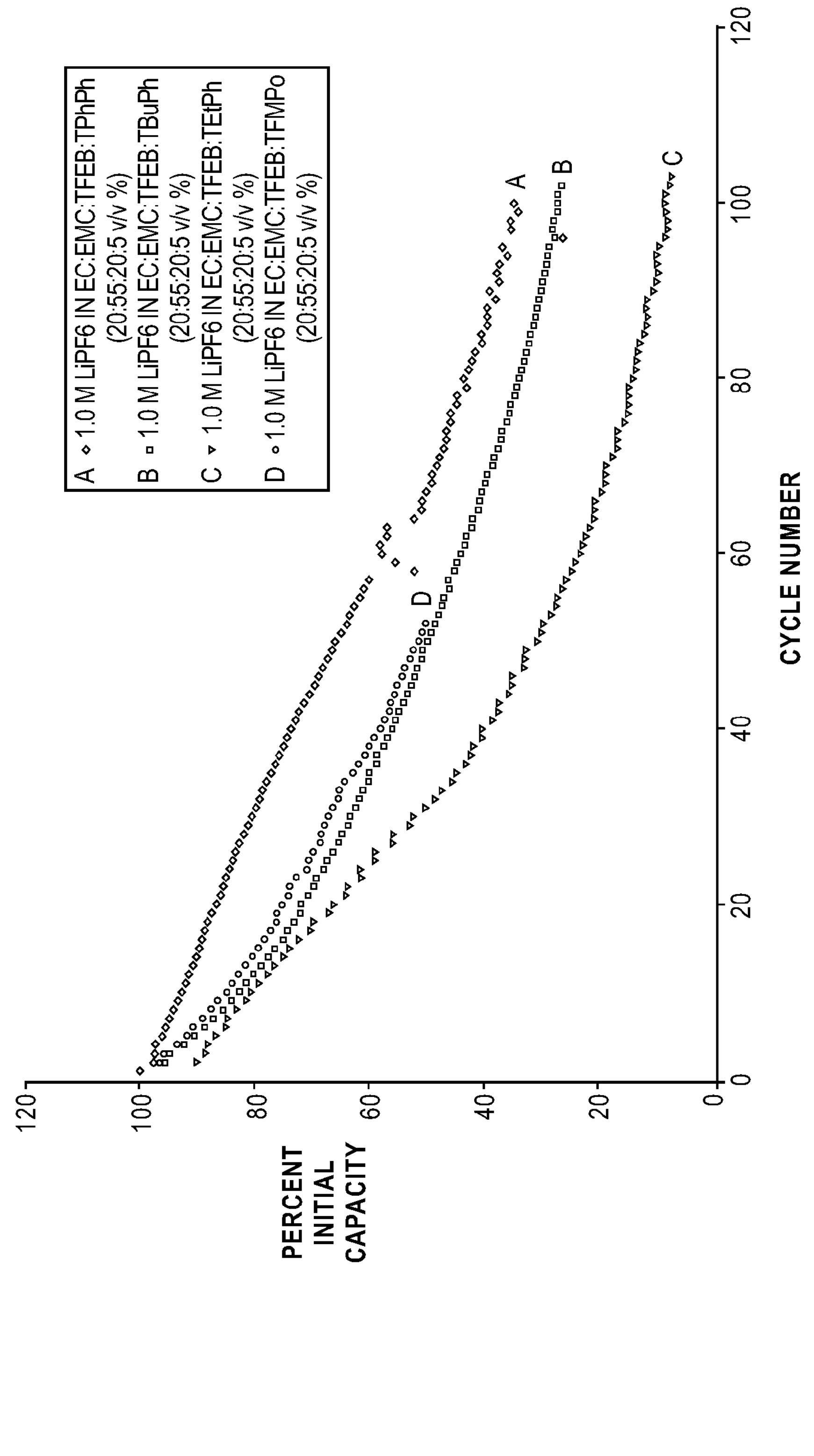
FIG. 13 is an illustration of a graph showing cycle life of electrolytes with flame retardant additives and fluoroesters according to the invention.
Figure 16:
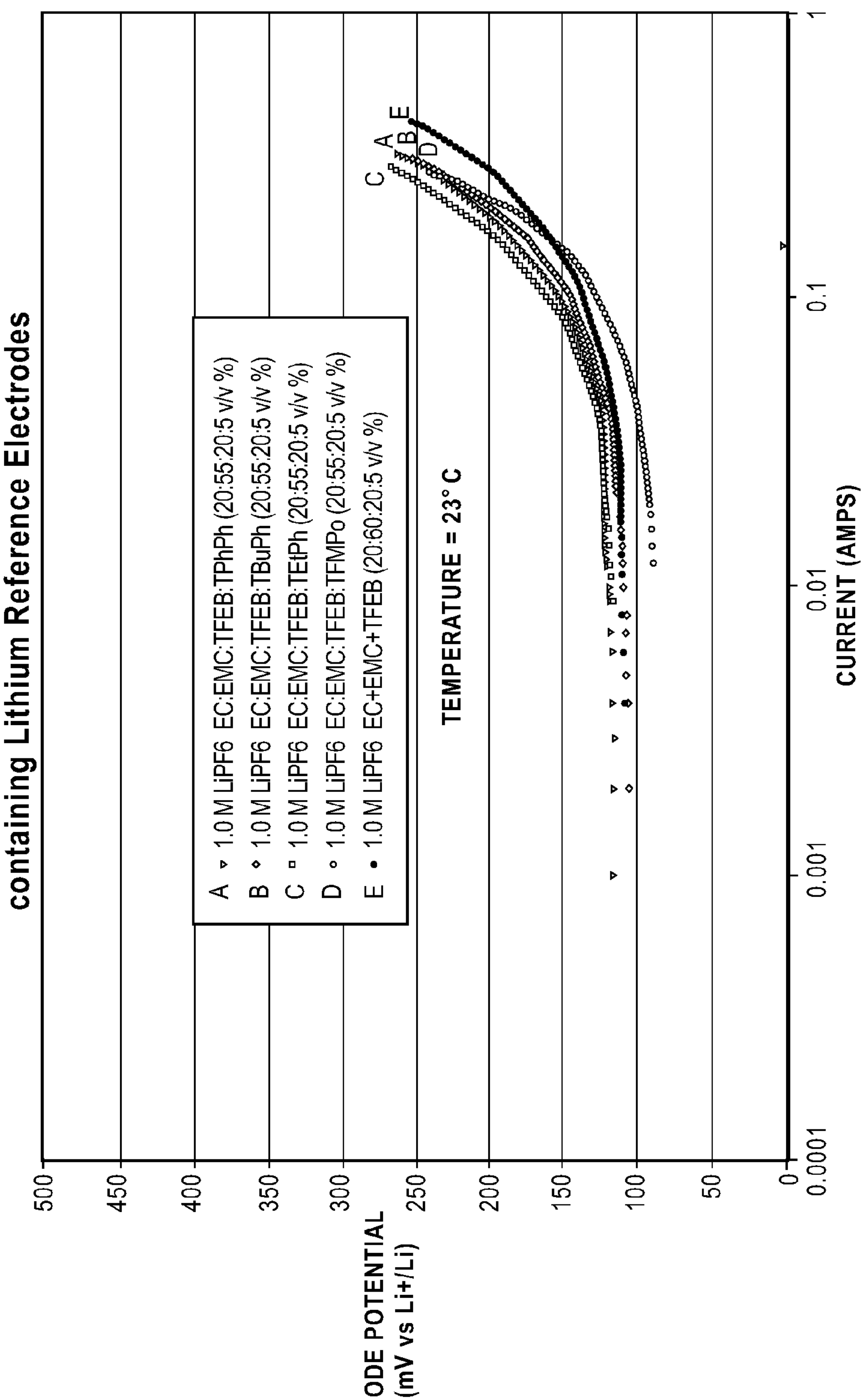
FIG. 16 is an illustration of a graph showing the Tafel polarization measurements performed on MCMB anodes in contact with electrolytes with flame retardant additives and fluoroesters and data was obtained from MCMB-$LiNi_{0.8}Co_{0.2}O_2$ cells containing lithium reference electrodes according to the invention.
Figure 17:
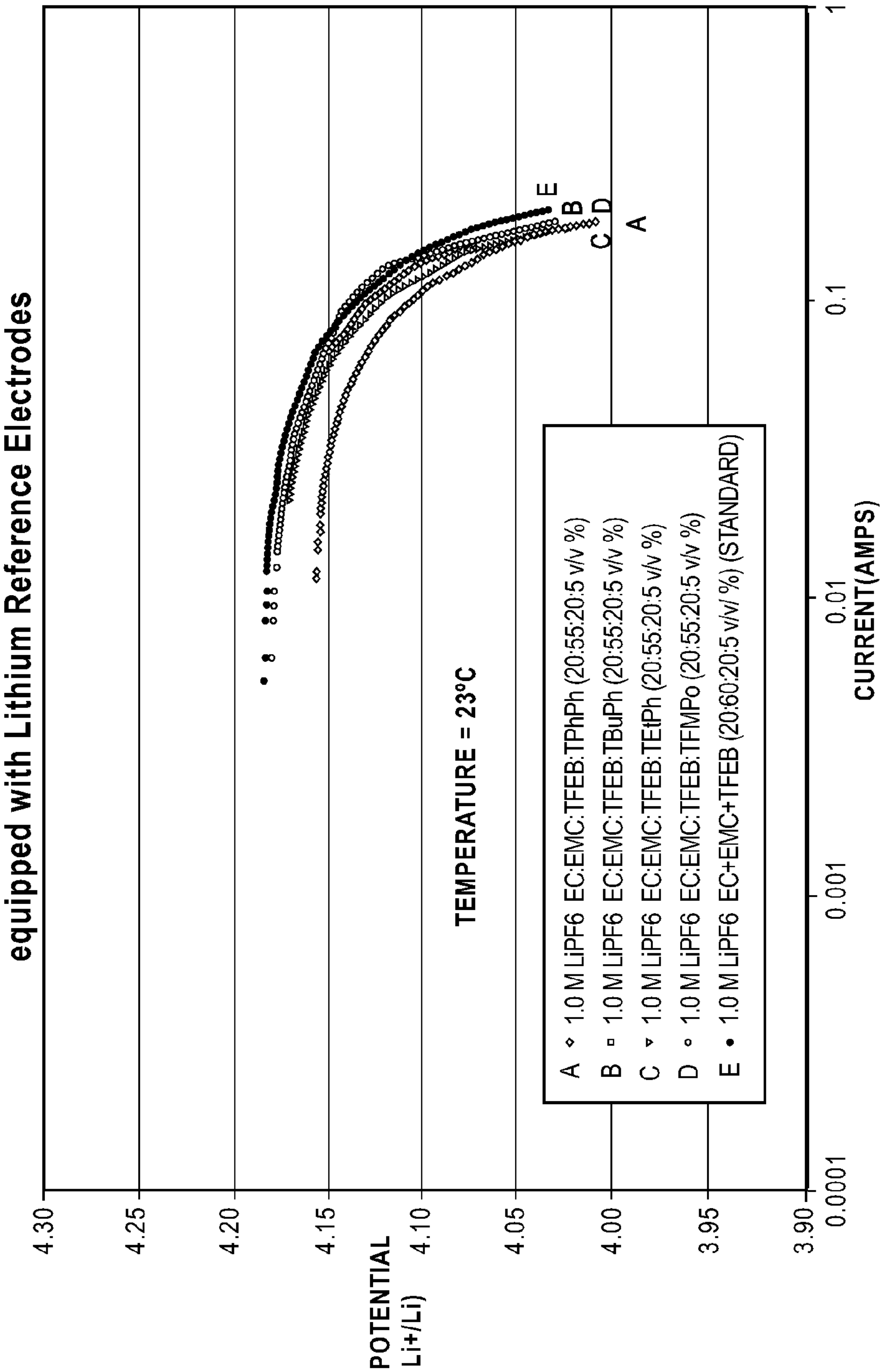
FIG. 17 is an illustration of a graph showing the Tafel polarization measurements performed on $LiNiCoO_2$ cathodes in contact with electrolytes with flame retardant additives and fluoroesters and data was obtained from MCMB-$LiNiCoO_2$ cells equipped with lithium reference electrodes according to the invention.

FIG. 12 is an illustration of a summary table of formation characteristics of electrolytes with flame retardant additives and fluoroester according to the invention. Addition of flame retardant additives did not significantly increase irreversible capacity loss or reduce coulombic efficiency of the cells during the formation cycles. FIG. 13 is an illustration of a graph showing cycle life of electrolytes with flame retardant additives and fluoroester according to the invention. The x-axis shows cycle number and the y-axis shows percent initial capacity. As shown in FIG. 13, phenyl branches improved cyclability of FRA electrolytes, and short aliphatic branches of the FRA reduced the electrochemical and life cycle stability of the electrolyte. FIG. 14 is an illustration of a summary table of results obtained from Electrochemical Impedance Spectroscopy (EIS) measurements for cathodes in contact with electrolytes with flame retardant additives and fluoroesters according to the invention. As shown in FIG. 14, addition of FRA did not significantly increase the impedance growth at the cathode. FIG. 15 is an illustration of a summary table of the results obtained from Electrochemical Impedance Spectroscopy (EIS) measurements for MCMB anodes in contact with electrolytes with flame retardant additives and fluoroesters according to the invention. As shown in FIG. 15, significant impedance growth at the anode occurred with the addition of the FRA, and the film resistance growth was significantly higher than the baseline. FIG. 16 is an illustration of a graph showing the Tafel polarization measurements performed on MCMB anodes in contact with electrolytes with flame retardant additives and fluoroesters and data was obtained from MCMB-$LiNi_{0.8}Co_{0.2}O_2$ cells containing lithium reference electrodes at a temperature of 23° C. according to the invention. The x-axis shows current (Amps) and the y-axis shows anode potential (mV versus $Li^+/Li$). FIG. 17 is an illustration of a graph showing the Tafel polarization measurements performed on $LiNiCoO_2$ cathodes in contact with electrolytes with flame retardant additives and fluoroesters and data was obtained from MCMB-$LiNiCoO_2$ cells equipped with lithium reference electrodes at a temperature of 23° C. according to the invention. The x-axis shows current (Amps) and the y-axis shows cathode potential (V versus $Li^+/Li$). FIG. 18 is an illustration of a table summary of DC (direct current) micro-polarization measurements for the cathode of cells containing flame retardant additives and fluoroester electrolytes according to the invention. FIG. 19 is an illustration of a table summary of the results obtained from DC micro-polarization measurements for the anode of MCMB-$LiNi_{0.8}Co_{0.2}O_2$ cells containing flame retardant additives and fluoroester electrolytes according to the invention. FIGS. 18-19 further highlight that the deleterious action of the flame retardant additives was resultant from their action at the anode.

Figure 20:
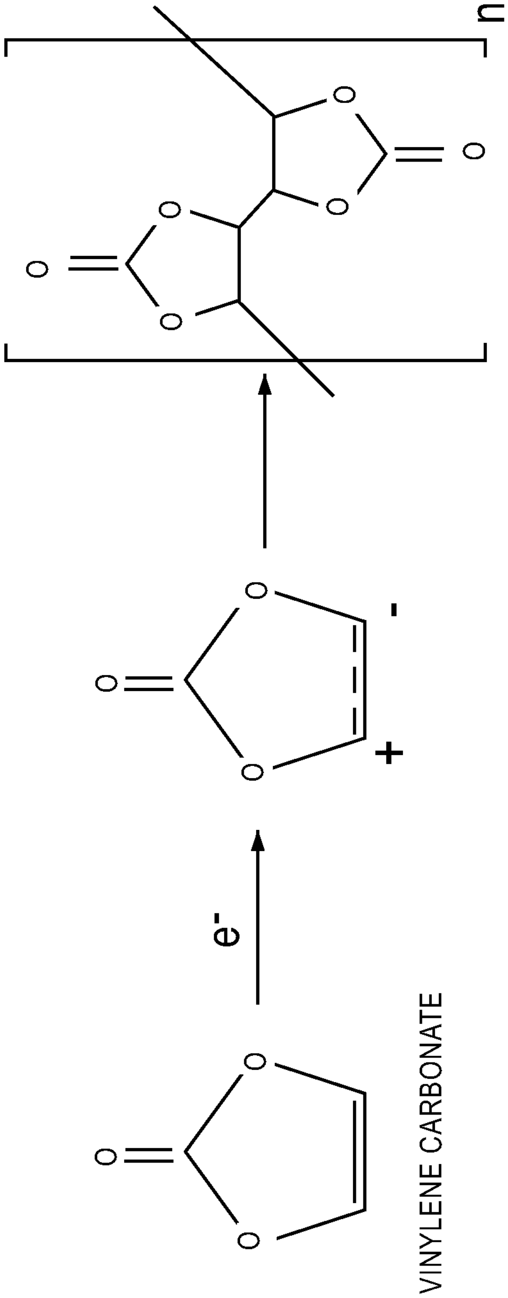
FIG. 20 is an illustration of the chemical structure of SEI (solid electrolyte interface) enhancing agent vinylene carbonate.

FIG. 20 is an illustration of the chemical formation and structure of SEI (solid electrolyte interface) enhancing agent vinylene carbonate. It is generally held that vinylene carbonate undergoes a radical polymerization process at the electrode surface, i.e., especially under reductive conditions at the anode, to produce poly(vinylene carbonate) which imparts beneficial properties to the SEI (i.e., facile transport of lithium ions while offering protection against excessive solvent reduction). SEI enhancing agents can improve the SEI layer by reducing gas generation against extended cycling, reduced capacity loss and SEI stabilization. The mechanism is electrochemically-induced polymerization, and it is terminated by a radical anion reaction with a solvent molecule. The SEI enhancing agent can reduce the decomposition of flame retardant additives. FIG. 21 is an illustration of a table summary of formation characteristics of electrolytes with flame retardant additives and SEI enhancing agent according to the invention. As shown by FIG. 21, the addition of the SEI enhancing additive, vinylene carbonate, increased irreversible capacity loss. However, continued degradation can be minimal after the formation cycling due to the protective nature of vinylene carbonate. FIG. 22 is an illustration of a table summary of evaluation of low temperature performance of cells containing flame retardant additives and SEI additive according to the invention. As shown by FIG. 22, the addition of vinylene carbonate contributed to improved low temperature and increased rate performance. FIG. 23 is an illustration of a table summary of results obtained from Electrochemical Impedance Spectroscopy (EIS) measurements performed on $LiNiCoO_2$ cathodes of MCMB-$LiNiCoO_2$ cells containing electrolytes possessing flame retardant additives/VC according to the invention. As shown by FIG. 23, the impedance growth at the cathode was not significantly influenced by the addition of vinylene carbonate or FRA. FIG. 24 is an illustration of a table summary of results obtained from Electrochemical Impedance Spectroscopy (EIS) measurements performed on MCMB anodes of MCMB-$LiNiCoO_2$ cells containing electrolytes possessing flame retardant additives/VC according to the invention. As shown by FIG. 24, the influence of both FRA and vinylene carbonate was seen at the anode and was exacerbated at low temperatures (i.e., larger film resistance, $R_f$, and larger charge transfer resistance, $R_{ct}$). FIG. 25 is an illustration of a table summary of linear polarization measurements that were performed on MCMB anodes from MCMB-$LiNiCoO_2$ cells containing electrolytes possessing flame retardant additives/VC according to the invention. FIG. 26 is an illustration of a table summary of linear polarization measurements performed on $LiNiCoO_2$ cathodes from MCMB-$LiNiCoO_2$ cells containing electrolytes possessing flame retardant additives/VC according to the invention. As shown by FIGS. 25-26, the polarization resistance of the MCMB anodes increased much more than the cathodes for cells containing FRA.

Summary.

The safety characteristics of Li-ion electrolytes has been further improved by the addition of flame retardant additives (FRA), such as triphenyl phosphate (TPP or TPPa or TPhPh), tributyl phosphate (TBP or TBuPh), triethyl phosphate (TEP or TEtPh), and bis(2,2,2-trifluoroethyl)methyl phosphonate (BTEMP or TFMPo). A number of electrolytes based upon these approaches have delivered good performance over a wide temperature range, good cycle life characteristics, and improved safety characteristics, namely reduced flammability. Of the additives investigated, the triphenyl phosphate displayed the lowest irreversible capacity losses and high coulombic efficiency, suggesting that it displays the least amount of electrochemical decomposition and does not participate in the electrode filming process to a great extent. Of the FRA-containing electrolytes, the formulation containing tributyl phosphate delivered the best performance at low temperature, with over 68% (percent) of the room temperature capacity being delivered at −20° C. using a ~C/16 discharge rate. With respect to cycle life performance, improved life characteristics were observed with the incorporation of film forming additives, which serve to prevent excessive reactivity of the FRA at the electrode interfaces, especially at the carbon anode. Further optimization of these electrolyte formulations was anticipated to yield improved performance. It was also anticipated that much improved performance would be demonstrated once these electrolyte solutions were incorporated into hermetically sealed large capacity, prototype cells, especially if effort is devoted to ensuring that all electrolyte components are highly pure. The fluorinated esters imparted desirable physical characteristics on the base electrolyte solvent system. The structure of the FRA significantly influenced the performance characteristics of the cells. Short aliphatic chained phosphates imparted preferred low temperature characteristics. Larger branches of FRA offered increased electrochemical stability leading to improved cycle life. Deleterious effects of FRA were primarily seen at the anodes, such as the build-up of surface films at the interface which limits the kinetics of lithium intercalation/de-intercalation as determined by Electrochemical Impedance Spectroscopy (EIS) and the DC (direct current) polarization techniques. These findings can lead to the mitigation strategy of incorporating additional electrolyte additives to minimize the continued reaction of the FRA at the interface.

Li-Ion Electrolytes Containing Phosphorus-Based FRA

Description.

Figure 5A:
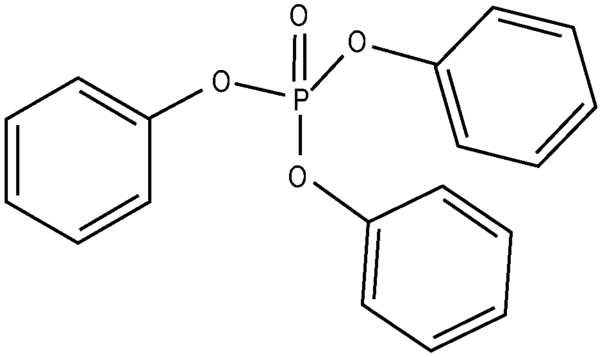
FIG. 5*a* is an illustration of the chemical structure of flame retardant triphenyl phosphate.
Figure 5B:
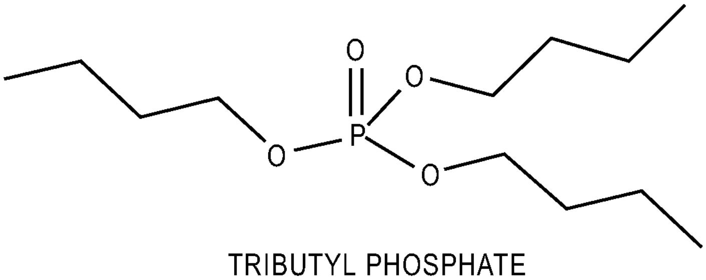
FIG. 5*b* is an illustration of the chemical structure of flame retardant tributyl phosphate.
Figure 5C:
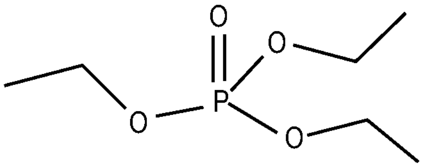
FIG. 5*c* is an illustration of the chemical structure of flame retardant triethyl phosphate.
Figure 5D:
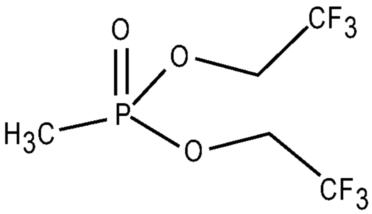
FIG. 5*d* is an illustration of the chemical structure of flame retardant bis(2,2,2-trifluoroethyl)methyl phosphonate.
Figure 5E:
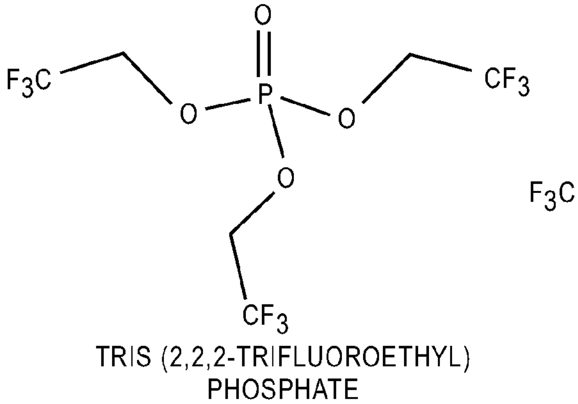
FIG. 5*e* is an illustration of the chemical structure of flame retardant tris(2,2,2-trifluoroethyl)phosphate.
Figure 5F:
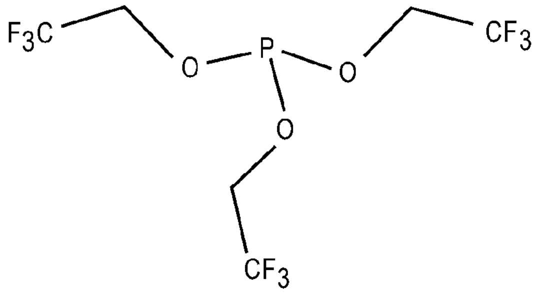
FIG. 5*f* is an illustration of the chemical structure of flame retardant tris(2,2,2-trifluoroethyl)phosphite.
Figure 5G:
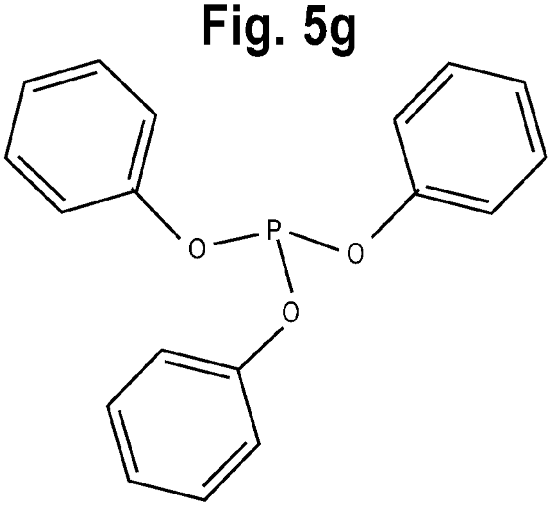
FIG. 5*g* is an illustration of the chemical structure of flame retardant triphenylphosphite.
Figure 5H:
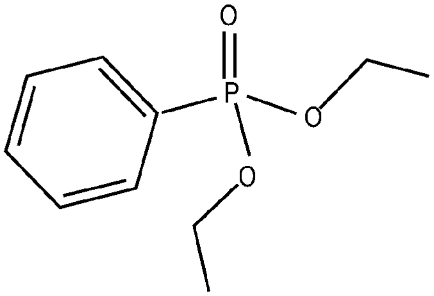
FIG. 5*h* is an illustration of the chemical structure of flame retardant diethyl phenyl phosphonate.
Figure 5I:
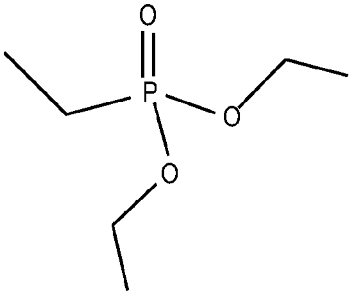
FIG. 5*i* is an illustration of the chemical structure of flame retardant diethyl ethyl phosphonate.

Additional experiments were conducted with Li-ion electrolytes containing more phosphorus-based flame retardant additives. As part of a continuing effort to develop advanced electrolytes to improve the safety and performance of lithium-ion cells, especially over a wide operating temperature range, a number of Li-ion electrolytes that contain flame retardant additives optimized for operation over a wide temperature range were developed. Phosphorus-based flame retardant additives were investigated, including (a) tris(2,2,2-trifluoroethyl)phosphate (see FIG. 5*e* showing the chemical structure), (b) tris(2,2,2-trifluoroethyl)phosphite (see FIG. 5*f* showing the chemical structure), (c) triphenylphosphite (see FIG. 5*g* showing the chemical structure), (d) diethyl ethylphosphonate (see FIG. 5*i* showing the chemical structure), and (e) diethyl phenylphosphonate (see FIG. 5*h* showing the chemical structure). These phosphorus-based flame retardant additives, as shown in FIGS. 5*e*-5*i*, were added to an electrolyte composition intended for wide operating temperature range, namely 1.0M $LiPF_6$ in EC+EMC (20:80 v/v %).

The following electrolyte formulations were investigated and demonstrated in experimental MCMB carbon-$LiNi_{0.8}Co_{0.2}O_2$ cells: (1) 1.0 M $LiPF_6$ in EC+EMC+TFPa (20:75:5 v/v %); (2) 1.0 M $LiPF_6$ in EC+EMC+TFPi (20:75:5 v/v %); (3) 1.0 M $LiPF_6$ in EC+EMC+TPPi (20:75:5 v/v %); (4) 1.0 M $LiPF_6$ in EC+EMC+DEP (20:75:5 v/v %); (5) 1.0 M $LiPF_6$ in EC+EMC+DPP (20:75:5 v/v %); and, (6) 1.0 M $LiPF_6$ in EC+EMC (20:80 v/v %) (Baseline), (where TFPa=tris(2,2,2-trifluoroethyl)phosphate, TFPi=tris(2,2,2-trifluoroethyl)phosphite, TPPi=triphenyl phosphite, DEP=diethyl ethylphosphonate, and DPP=diethyl phenylphosphonate).

In general, many of the formulations investigated in this study displayed good performance over a wide temperature range, good cycle life characteristics, and were expected to have improved safety characteristics, namely low flammability. Of the electrolytes studied, 1.0 M $LiPF_6$ in EC+EMC+DEP (20:75:5 v/v %) and 1.0 M $LiPF_6$ in EC+EMC+DPP (20:75:5 v/v %) displayed the best operation at low temperatures, whereas the electrolyte containing triphenylphosphite displayed the best cycle life performance compared to the baseline solution. It is anticipated that further improvements can be made to the life characteristics with the incorporation of a SEI promoters (such as VC, vinylene carbonate), which will likely inhibit the decomposition of the flame retardant additives, as demonstrated in the previous study.

Description.

A number of experimental lithium-ion cells, consisting of MCMB carbon anodes and $LiNi_{0.8}Co_{0.2}O_2$ cathodes, were fabricated to study the described technology. These cells served to verify and demonstrate the reversibility, low temperature performance, and electrochemical aspects of each electrode as determined from a number of electrochemical characterization techniques. The electrolytes selected for evaluation are listed above (electrolytes 1-6). FIG. 6 is an illustration of a table summary of charge-discharge characteristics of experimental MCMB-$LiNiCoO_2$ cells containing electrolytes with flame retardant additives subjected to formation cycling according to the invention. As shown in FIG. 6, all cells displayed good reversibility at room temperature and minimal reactivity during the formation cycling. The high coulombic efficiency and comparable irreversible capacity losses were indirectly related to the overall stability of the solutions and the electrode filming characteristics.

Figure 7:
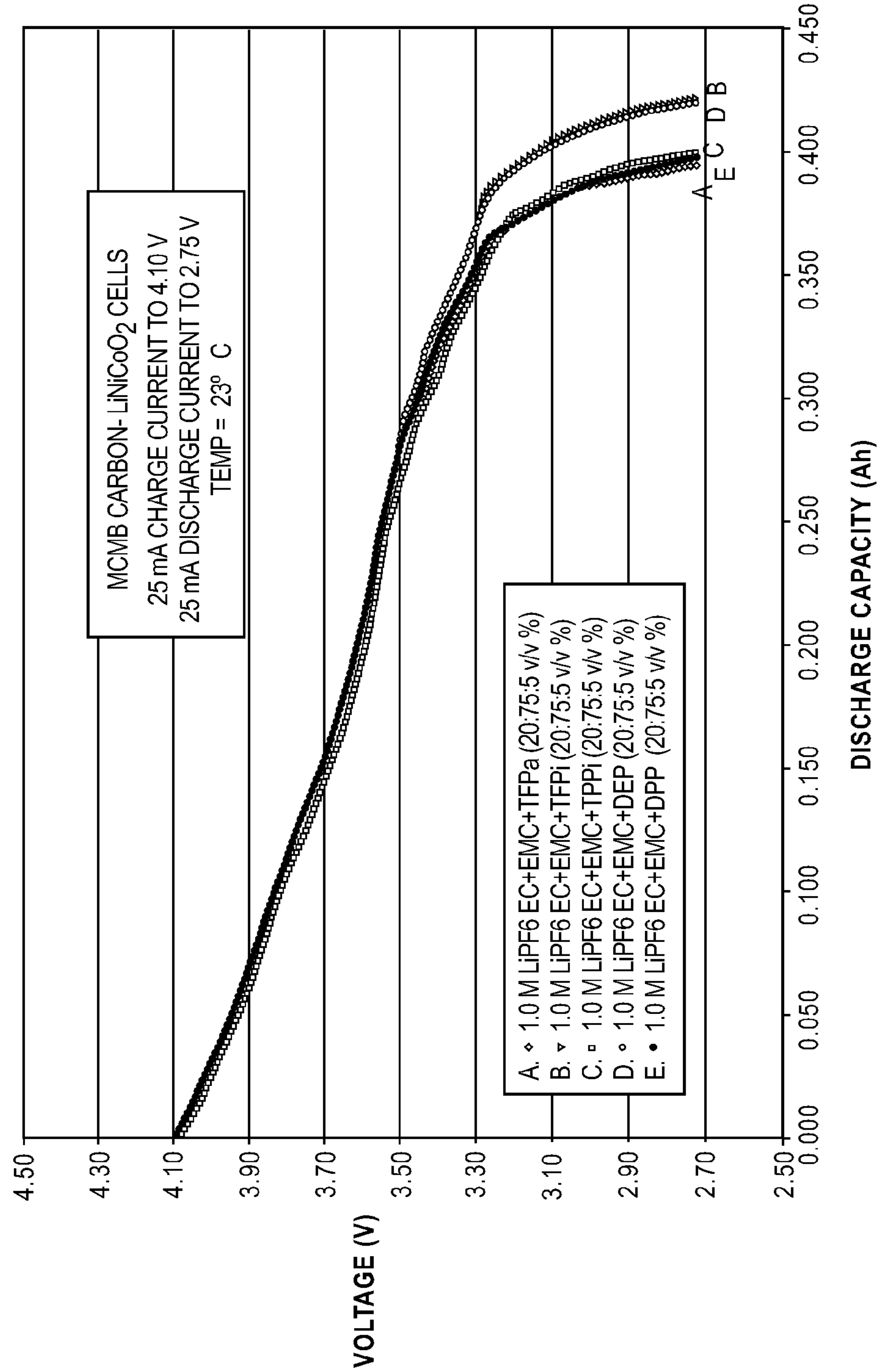
FIG. 7 is an illustration of a graph showing fifth discharge of formation cycling for cells containing flame retardant additives according to the invention.

FIG. 7 is an illustration of a graph showing fifth discharge of formation cycling for cells containing flame retardant additives according to the invention. The x-axis shows discharge capacity in Ah (Ampere hours) and the y-axis shows voltage (V). As shown in FIGS. 6-7, reasonable reversibility was observed with the cells containing all of the electrolyte variations, when compared after the formation cycling. It should be noted that some variation in capacity was due to different electrode weights, and not electrolyte type, so most comparisons were expressed in terms of percentage of initial capacity under ambient temperatures. Of the additives investigated, the electrolytes containing the diethyl ethylphosphonate and diethyl phenylphosphonate displayed the lowest irreversible capacity losses and highest coulombic efficiency, suggesting that it was not electrochemically decomposing and participating in the electrode filming process deleteriously.

Low Temperature Performance.

FIG. 8 is an illustration of a table summary of discharge capacity at low temperature of a number of MCMB-$LiNiCoO_2$ cells containing electrolytes with flame retardant additives according to the invention. When the cells described were evaluated at low temperatures, as shown in FIG. 8, reasonable low temperature performance was generally observed. This finding is significant since the use of flame retardant additives was anticipated in decreasing the power capability and low temperature performance, due to decreased ionic conductivity of the media and increased electrode film resistance with the possible reactivity of the FRA.

Of the additives investigated, the diethyl ethylphosphonate (DEP)-containing electrolyte resulted in cells that displayed the best low temperature performance of the group. Conductivity studies performed on the individual electrolyte solutions lead to the finding that some of the solutions containing FRA actually displayed higher ionic conductivity at lower temperatures compared with the baseline solution which did not contain any flame retardant additive, such as with triethyl phosphate. This finding suggests that the FRA can serve to lower the viscosity of the medium, in addition to imparting flame retardant properties. Thus, the high conductivity of the electrolyte, coupled with potentially minimal decomposition of the additive on the electrode surfaces, can lead to good low temperature performance.

Figure 9:
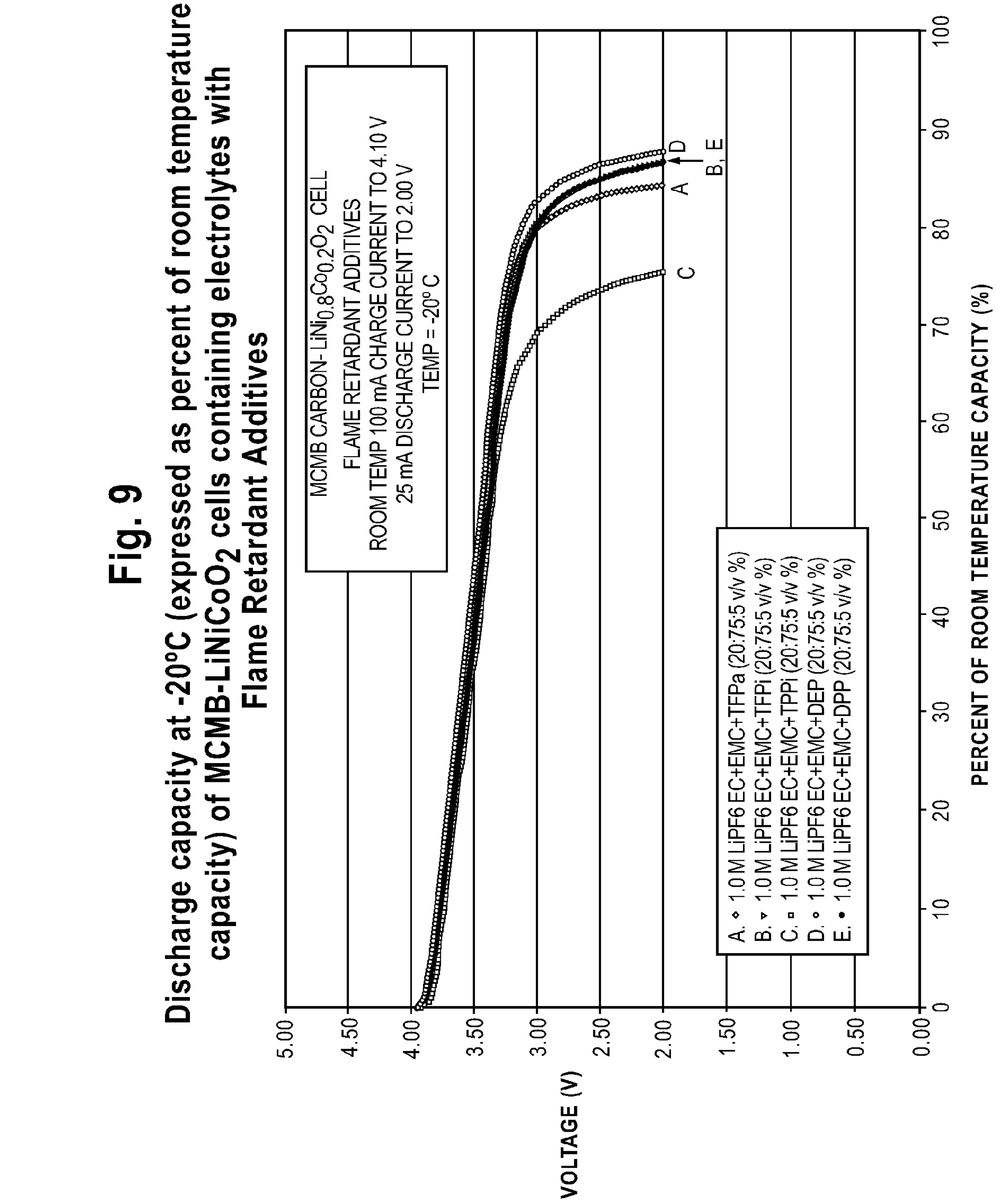
FIG. 9 is an illustration of a graph showing discharge capacity at −20° C. (expressed as percent of room temperature capacity) of MCMB-$LiNiCoO_2$ cells containing electrolytes with flame retardant additives according to the invention.

This is illustrated in FIG. 9, in which the performance of cells containing electrolytes with various FRAs are shown when discharged at −20° C. using a C/16 discharge rate. FIG. 9 is an illustration of a graph showing discharge capacity at −20° C. (expressed as percent of room temperature capacity) of MCMB-$LiNiCoO_2$ cells containing electrolytes with flame retardant additives according to the invention. The x-axis shows percent of room temperature capacity (%) and the y-axis shows voltage (V). Of the FRA-containing electrolytes, the formulation containing diethyl ethylphosphonate delivered the best performance at low temperature, with over 85% of the room temperature capacity being delivered at −20° C.

Figure 10:
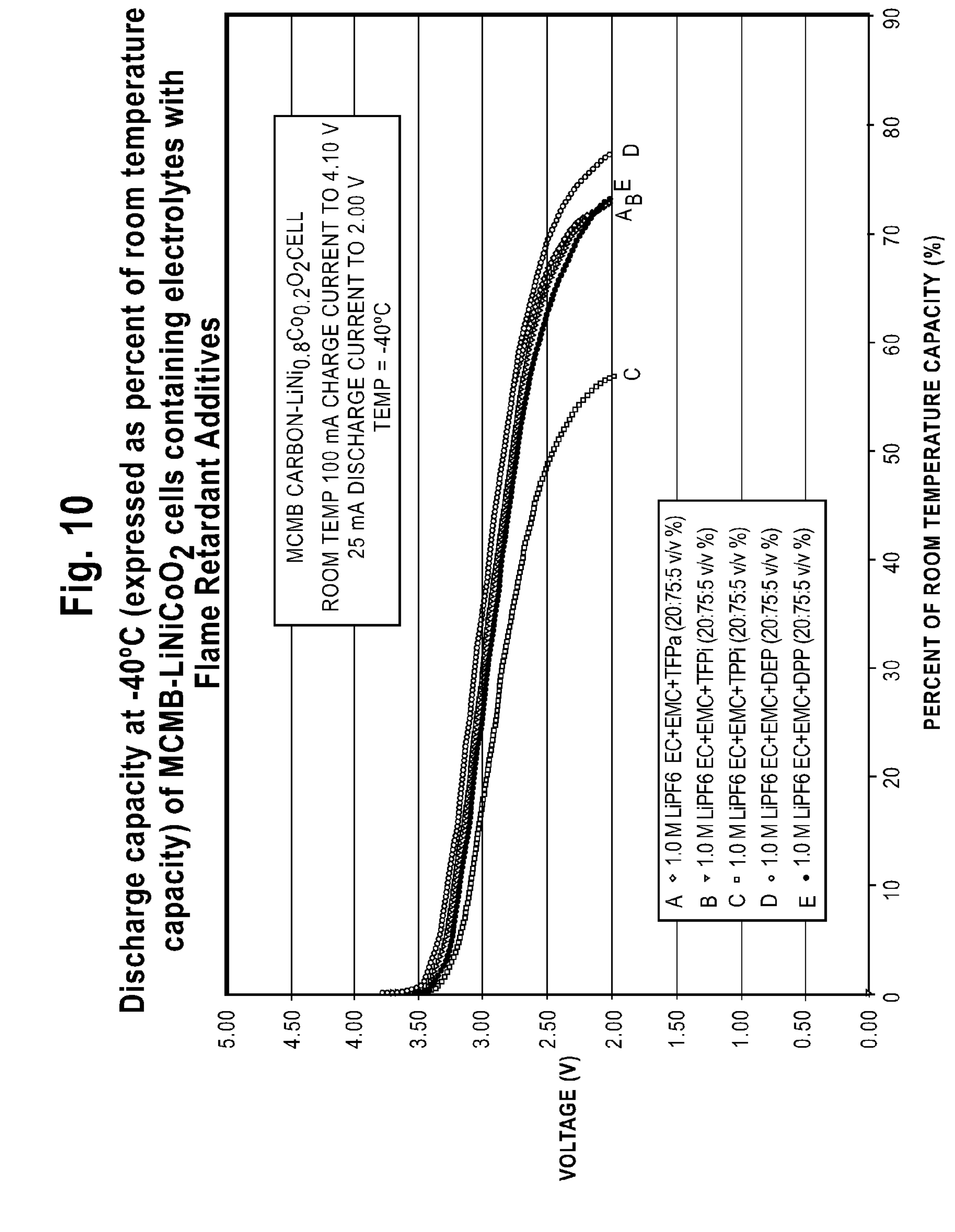
FIG. 10 is an illustration of a graph showing discharge capacity at −40° C. (expressed as percent of room temperature capacity of MCMB-$LiNiCoO_2$ cells containing electrolytes with flame retardant additives according to the invention.

Similar trends and excellent performance was obtained at −40° C., as shown in FIG. 10, in which the cells were discharged using a C/16 discharge rate, following charging at room temperature. FIG. 10 is an illustration of a graph showing discharge capacity at −40° C. (expressed as percent of room temperature capacity) of MCMB-$LiNiCoO_2$ cells containing electrolytes with flame retardant additives according to the invention. The x-axis shows percent of room temperature capacity (%) and the y-axis shows voltage (V). As shown, the cell containing the electrolyte with the DEP additive again displayed the best performance at low temperature.

Cycle Life Performance.

Figure 11:
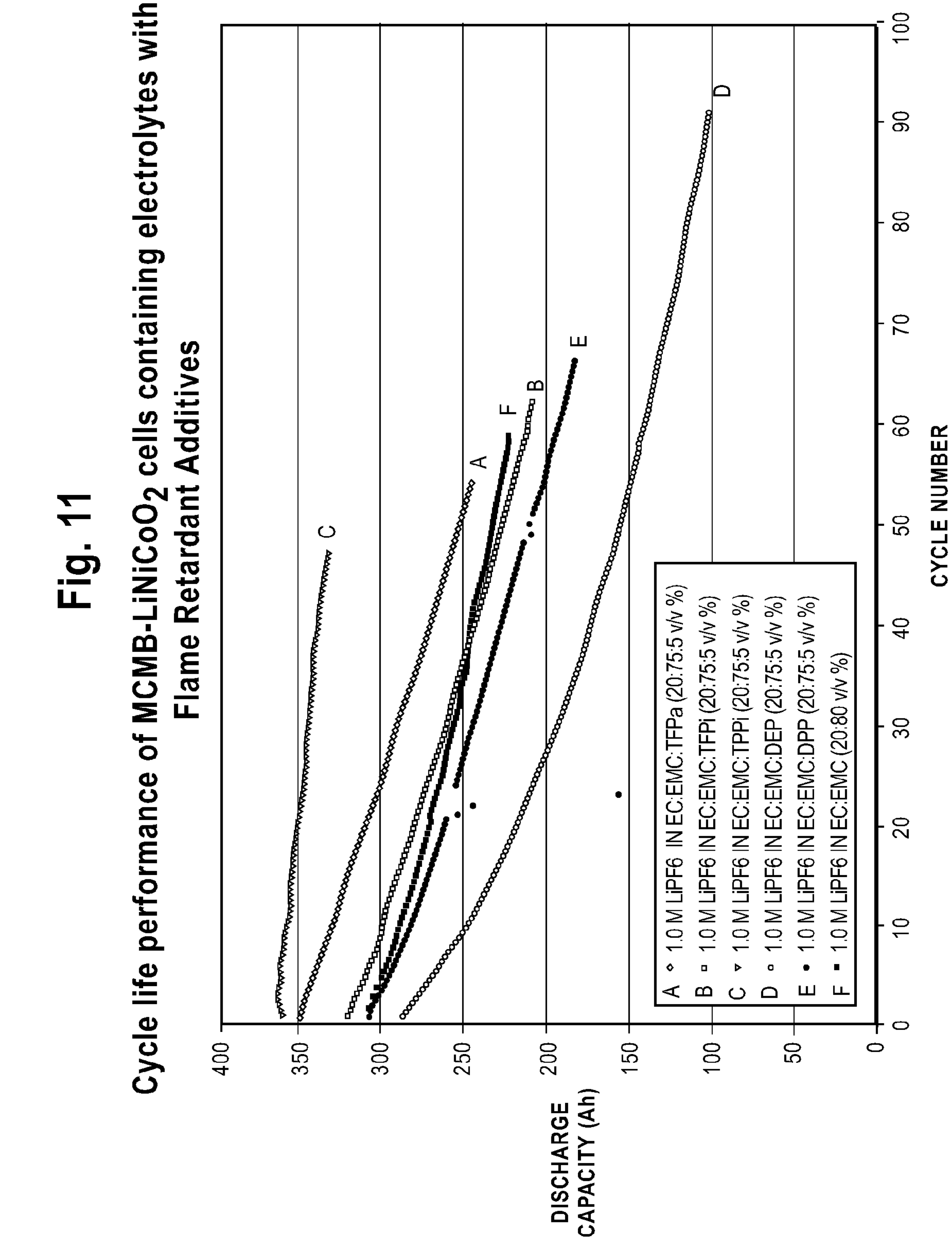
FIG. 11 is an illustration of a graph showing cycle life performance of MCMB-$LiNiCoO_2$ cells containing electrolytes with flame retardant additives according to the invention.

As mentioned previously, the general expectation is that the cycle life performance will be compromised with the addition of FRAs due to the possible reactivity with the electrode interfaces leading to impedance build-up and capacity loss. However, generally good cycle life performance was obtained in experimental cells, as illustrated in FIG. 11, with the cell containing the electrolyte with triphenyl phosphite additive delivering the best performance. FIG. 11 is an illustration of a graph showing cycle life performance of MCMB-$LiNiCoO_2$ cells containing electrolytes with flame retardant additives according to the invention. The x-axis shows cycle number and the y-axis shows discharge capacity in (mAh) (milli-Ampere-hours). To further improve the cycle life characteristics, the addition of SEI "film forming" additives is anticipated to impart enhanced stability to the system. It should also be noted that the cycle life performance is anticipated to be much better in aerospace quality lithium-ion cells, due to the fact that the data reflects experimental cells which are a flooded design, and not hermetically sealed.

Summary.

The safety characteristics of Li-ion electrolytes have been further improved by the addition of flame retardant additives, such as tris(2,2,2-trifluoroethyl)phosphate, (b) tris(2,2,2-trifluoroethyl)phosphite, (c) triphenylphosphite, (d) diethyl ethylphosphonate, and (e) diethyl phenylphosphonate. A number of electrolytes based upon these additives have delivered good performance over a wide temperature range, good cycle life characteristics, and improved safety characteristics, namely reduced flammability. Of the additives investigated, the diethyl ethylphosphonate displayed the lowest irreversible capacity losses and high coulombic efficiency, suggesting that it displayed the least amount of electrochemical decomposition and did not participate in the electrode filming process to a great extent. Of the FRA-containing electrolytes studied, the formulation containing diethyl ethylphosphonate also delivered the best performance at low temperature, with over 85% of the room temperature capacity being delivered at the −20° C. using a C/16 discharge rate. With respect to cycle life performance, the formulation containing the triphenylphosphite electrolyte additive displayed the best performance. Further optimization of these electrolyte formulations is anticipated to yield improved performance. It is also anticipated that much improved performance will be demonstrated once these electrolyte solutions are incorporated into hermetically sealed large capacity, prototype cells, especially if effort is devoted to ensuring that all electrolyte components are highly pure.

Li-Ion Electrolytes Containing Increased Concentrations of FRA

Description.

A number of additional electrolyte formulations containing flame retardant additives were investigated and demonstrated in experimental MCMB carbon-$LiNi_{0.8}Co_{0.2}O_2$ cells. These electrolytes included: (1) formulations which incorporated greater concentrations of the flame retardant additive; (2) the use di-2,2,2-trifluoroethyl carbonate (DTFEC) as a co-solvent; (3) the use of 2,2,2-trifluoroethyl methyl carbonate (TFEMC) as a co-solvent; (4) the use of mono-fluoroethylene carbonate (FEC) as a co-solvent and/or a replacement for ethylene carbonate in the electrolyte mixture; and, (5) the use of vinylene carbonate (VC) as an "SEI promoting" electrolyte additive, to build on the favorable results previously obtained. The use of higher concentrations of the flame retardant additive is known to reduce the flammability of the electrolyte solution, thus, a range was investigated (e.g., 5% to 20% by volume). The desired concentration of the flame retardant additive is the greatest amount tolerable without adversely affecting the performance in terms of reversibility, ability to operate over a wide temperature range, and the discharge rate capability. Fluorinated carbonates, such as mono-fluoroethylene carbonate (FEC), may be used as both a fluorinated ester-based co-solvent, as well as a flame retardant additive.

The electrolytes developed which embodied these approaches included: (1) Approaches based on increased FRA concentrations: (a) 1.0 M $LiPF_6$ in EC+EMC+TPP (20:70:10 v/v %); (b) 1.0 M $LiPF_6$ in EC+EMC+TPPi (20:70:10 v/v %); and (c) 1.0 M $LiPF_6$ in EC+EMC+TPPi (20:80:20 v/v %); (2) Approaches based on the incorporation of di-2,2,2-trifluoroethyl carbonate: (a) 1.0 M $LiPF_6$ in EC+EMC+DTFEC+TPP (20:50:20:10 v/v %); and (b) 1.0 M $LiPF_6$ in EC+EMC+DTFEC+TPP (20:30:40:10 v/v %); (3) Approaches based on the use of 2,2,2-trifluoroethyl methyl carbonate (TFEMC) and (4) mono-fluoroethylene carbonate (FEC): (a) 1.0 M $LiPF_6$ in EC+EMC+TFEMC+TPP (20:50:20:10 v/v %); (b) 1.0 M $LiPF_6$ in FEC+EMC+TFEMC+TPP (20:50:20:10 v/v %); and (c) 1.0 M $LiPF_6$ in FEC+EMC+TPP (20:70:10 v/v %); (5) Approaches based on the use of vinylene carbonate (VC): (a) 1.0 M $LiPF_6$ in EC+EMC+TPPi (20:75:5 v/v %)+1.5% VC; and (b) 1.0 M $LiPF_6$ FEC+EMC+TFEMC+TPP (20:50:20:10 v/v %)+1.5% VC; (where TPP=TPPa=triphenyl phosphate, TPPi=triphenyl phosphite, DTFEC=di-2,2,2-trifluoroethyl carbonate, TFEMC=2,2,2-trifluoroethyl methyl carbonate, FEC=mono-fluoroethylene carbonate, VC=vinylene carbonate, EC=ethylene carbonate, EMC=ethyl methyl carbonate).

A number of experimental lithium-ion cells, consisting of MCMB carbon anodes and $LiNi_{0.8}Co_{0.2}O_2$ cathodes, were fabricated to study the described technology. These cells served to verify and demonstrate the reversibility, low temperature performance, and electrochemical aspects of each electrode as determined from a number of electrochemical characterization techniques. The electrolytes selected for evaluation are listed above (electrolytes 1-5). FIG. 27 is an illustration of a table summary of formation characteristics of experimental MCMB-$LiNiCoO_2$ cells containing electrolytes with flame retardant additives subjected to formation cycling according to the invention. As shown in FIG. 27, in which the formation characteristics are shown for a number of cells containing electrolytes with triphenyl phosphate (TPP) as a flame retardant additive, all cells displayed good reversibility at room temperature and minimal reactivity during the formation cycling. The high coulombic efficiency and comparable irreversible capacity losses were indirectly related to the overall stability of the solutions and the electrode filming characteristics.

For comparison, two baseline electrolytes were investigated which do not contain any flame retardant additive or fluorinated solvents, namely 1.0M $LiPF_6$ in EC+DMC+DEC (1:1:1 v/v %) and 1.0M $LiPF_6$ in EC+EMC (20:80 v/v %). As shown in FIG. 27, notable features are that the FRA-containing electrolytes possess comparable couloumbic efficiency on the first cycle (e.g., above 83%), with 1.0 M $LiPF_6$ in EC+EMC+DTFEC+TPP (20:50:20:10 v/v %) and 1.0 M $LiPF_6$ in FEC+EMC+TPP (20:70:10 v/v %) displaying the highest values of 85.9% and 85.6%, respectively. Also of note is the fact that the FEC and TFEMC-containing carbonate blends displayed the highest coloumbic efficiency by the fifth cycle, all exhibiting over 98% efficiency (compared to ~(approximately) 97% shown by the baseline solutions), indicative of good stability. Furthermore, some of the solutions displayed much lower cumulative irreversible capacities compared to the baseline formulation, especially with the FEC containing electrolyte formulations which all displayed less than 104 mAh in contrast to the baseline solutions which exhibited greater than 126 mAh and 136 mAh, respectively.

Effect of Increased TPP Concentration and Incorporation of DTFEC on the Discharge Performance at Different Temperatures.

Figure 29:
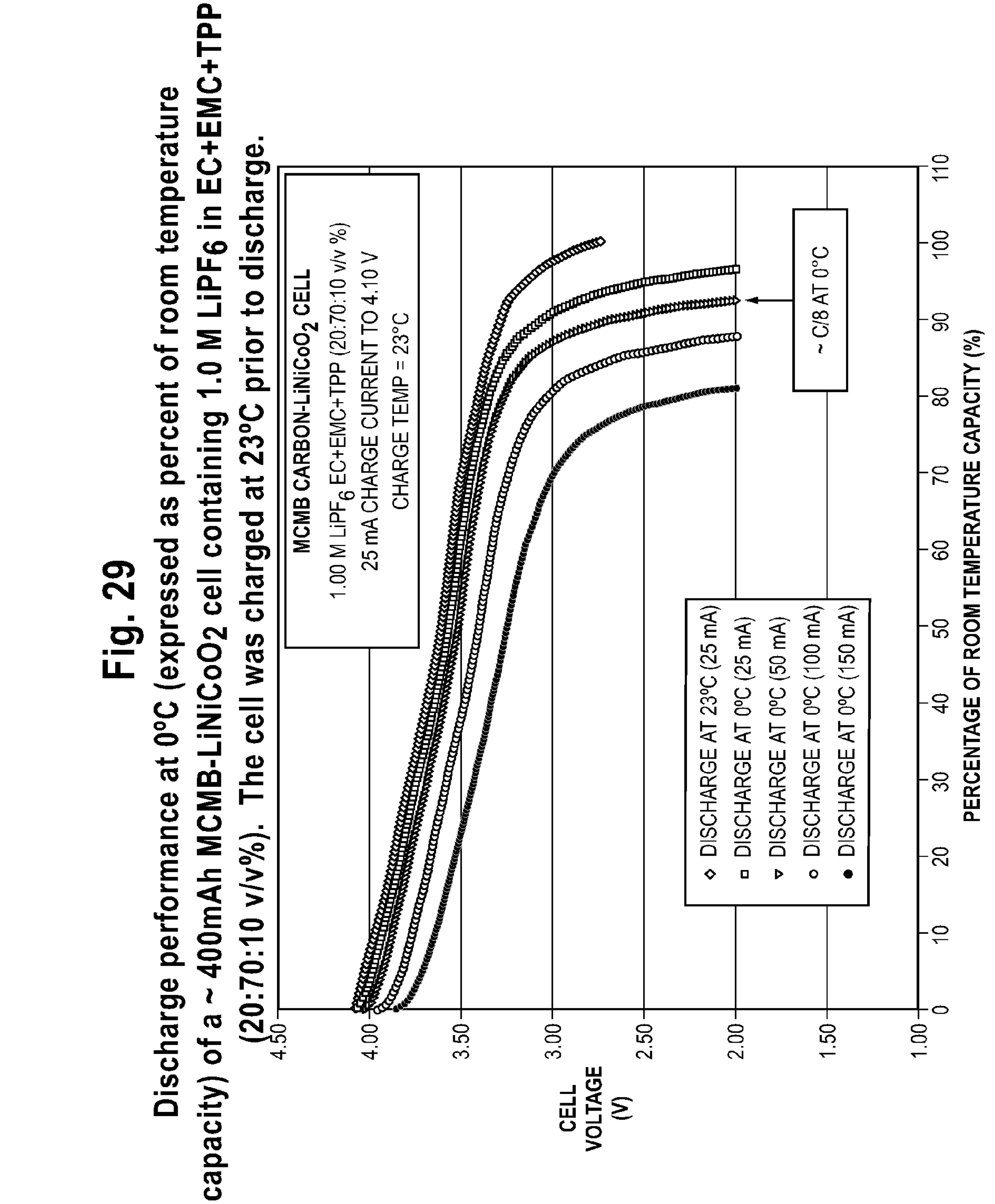
FIG. 29 is an illustration of a graph showing discharge performance at 0° C. (expressed as percent of room temperature capacity) of a ~400 mAh MCMB-$LiNiCoO_2$ cell containing 1.0 M $LiPF_6$ in EC+EMC+TPP (20:70:10 v/v %) according to the invention.
Figure 30:
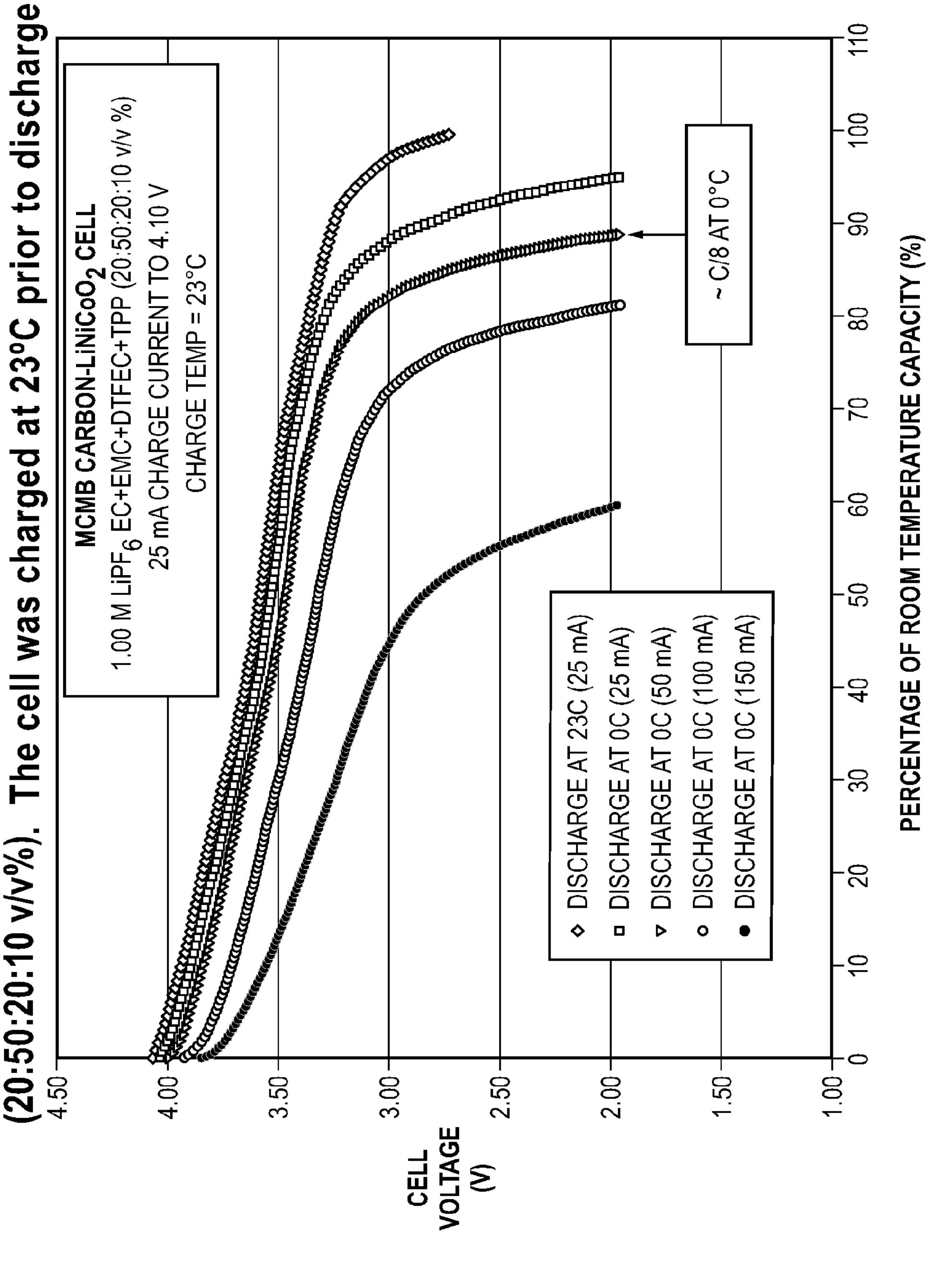
FIG. 30 is an illustration of a graph showing discharge performance at 0° C. (expressed as percent of room temperature capacity) of a MCMB-$LiNiCoO_2$ cell containing 1.0 M $LiPF_6$ in EC+EMC+DTFEC+TPP (20:50:20:10 v/v %) according to the invention.

When the cells containing electrolyte possessing 10% TPP with and without the incorporation of DTFEC described were evaluated at different rates and low temperatures, as shown in FIG. 28, reasonable low temperature performance was generally observed. FIG. 28 is an illustration of a table summary of discharge capacity at low temperature of a number of MCMB-$LiNiCoO_2$ cells containing electrolytes with flame retardant additives according to the invention. This finding was significant since the use of flame retardant additives was anticipated in decreasing the power capability and low temperature performance. As illustrated in FIG. 28, when 10% TPP was added to one of the baseline electrolytes, namely 1.0M $LiPF_6$ in EC+EMC (20:80 v/v %), minimal impact upon the low temperature discharge rate capability was observed, being essentially comparable at 0° C. over a range of discharge rates investigated. The performance of the cell containing 1.0 M $LiPF_6$ in EC+EMC+TPP (20:70:10 v/v %) at 0° C. is displayed in FIG. 29. FIG. 29 is an illustration of a graph showing discharge performance at 0° C. (expressed as percent of room temperature capacity) of a ~400 mAh MCMB-$LiNiCoO_2$ cell containing 1.0 M $LiPF_6$ in EC+EMC+TPP (20:70:10 v/v %) according to the invention. The x-axis shows percentage of room temperature capacity (%) and the y-axis shows cell voltage (V). When the performance of a cell containing an electrolyte possessing both 10% TPP and 20% DTFEC was evaluated under identical conditions, as shown in FIG. 30, somewhat decreased performance was observed, being more dramatic at higher rates and lower temperatures. FIG. 30 is an illustration of a graph showing discharge performance at 0° C. (expressed as percent of room temperature capacity) of a MCMB-$LiNiCoO_2$ cell containing 1.0 M $LiPF_6$ in EC+EMC+DTFEC+TPP (20:50:20:10 v/v %) according to the invention. The x-axis shows percentage of room temperature capacity (%) and the y-axis shows cell voltage (V). Thus, although this system was anticipated to have increased safety in contrast to an electrolyte with only TPP present, it was observed to have diminished performance capability at higher rates. When increased DTFEC was added to the system (e.g., 40% DTFEC by volume), this trend of decreased rate capability at lower temperature was further magnified.

Figure 31:
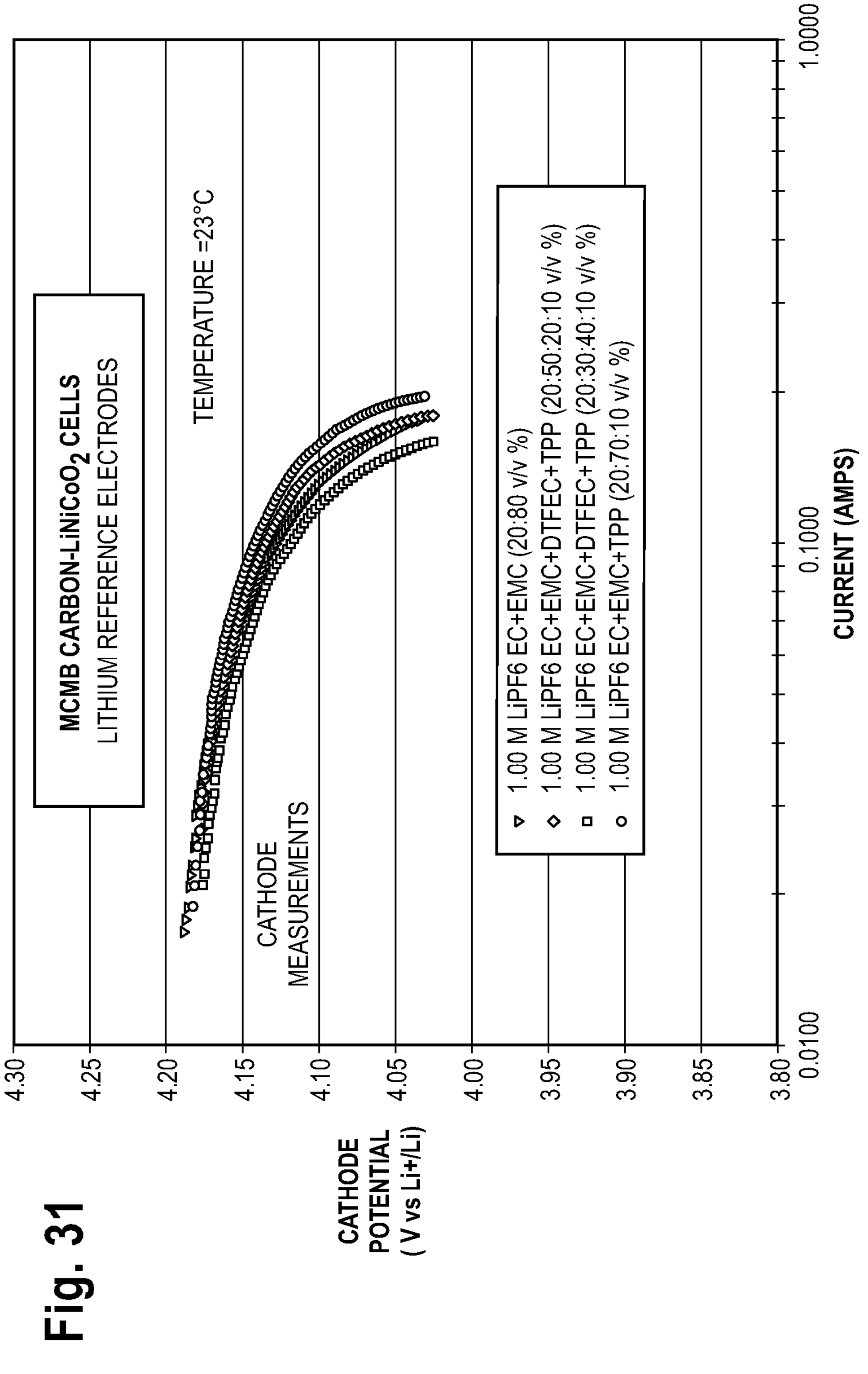
FIG. 31 is an illustration of a graph showing the Tafel polarization measurements of $LiNiCoO_2$ electrodes from MCMB-$LiNiCoO_2$ cells containing electrolytes with 10% TPP and with and without the addition of DTFEC according to the invention.

In order to further elucidate the nature of the performance characteristics of the cells containing the different electrolytes, Tafel polarization measurements were performed on both the anodes and cathodes at different temperature to determine the lithium intercalation/de-intercalation kinetics. The measurements were conducted on the cells while they were in a full SOC (state of charge) (OCV (open circuit voltage)=>4.07V) on each electrode while utilizing a lithium reference electrode. In all of these Tafel plots, there were distinct charge-transfer controlled regimes, where the overpotential increased linearly with log(I). The effect of mass transfer seems to be relatively insignificant, such that kinetic parameters, i.e., exchange current and transfer coefficients, can be derived. FIG. 31 is an illustration of a graph showing the Tafel polarization measurements of $LiNiCoO_2$ electrodes from MCMB-$LiNiCoO_2$ cells containing electrolytes with 10% TPP and with and without the addition of DTFEC according to the invention. The x-axis shows current (Amps) and the y-axis shows cathode potential (V versus $Li^+/Li$). As illustrated in FIG. 31, in which the Tafel polarization measurements have been performed on the $LiNiCoO_2$ cathodes at room temperature, the cell containing the 1.0 M $LiPF_6$ in EC+EMC+TPP (20:70:10 v/v %) electrolyte displayed enhanced lithium kinetics (i.e., higher limiting current densities) compared to the baseline system that does not contain the flame retardant additive. When the cell containing both the 10% TPP and 20% DTFEC was evaluated comparable kinetics to the baseline was observed. In contrast, when 40% DTFEC was added to the electrolyte the resultant limiting current densities of the cathode were noticeably lower.

Figure 32:
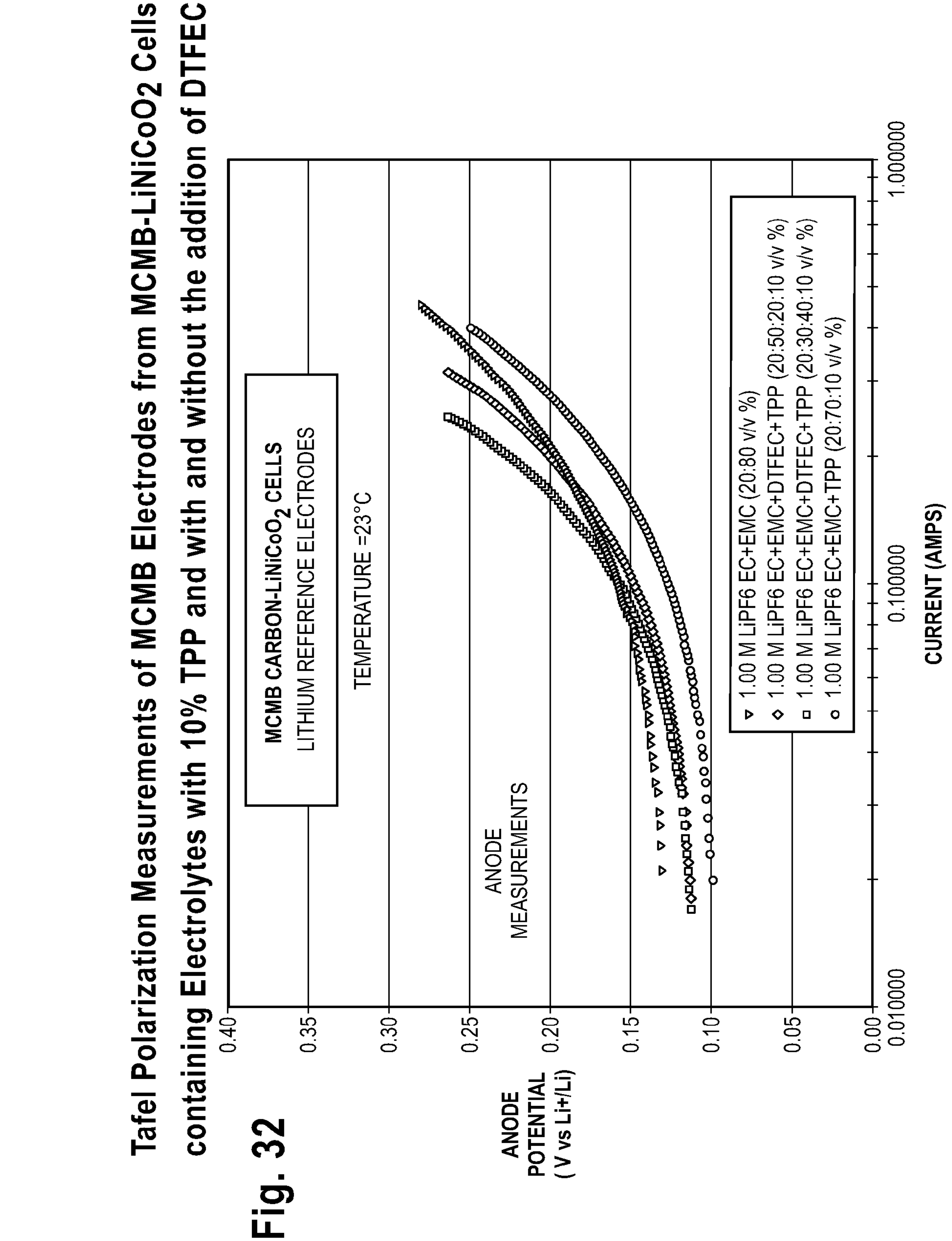
FIG. 32 is an illustration of a graph showing the Tafel polarization measurements of MCMB electrodes from MCMB-$LiNiCoO_2$ cells containing electrolytes with 10% TPP and with and without the addition of DTFEC according to the invention.

FIG. 32 is an illustration of a graph showing the Tafel polarization measurements of MCMB electrodes from MCMB-$LiNiCoO_2$ cells containing electrolytes with 10% TPP and with and without the addition of DTFEC according to the invention. The x-axis shows current (Amps) and the y-axis shows anode potential (V versus $Li^+$/Li). When the Tafel polarization measurements were performed on the MCMB anodes at room temperatures, as shown in FIG. 32, both the incorporation of 10% TPP and DTFEC were observed to decrease the lithium de-intercalation kinetics compared to the baseline composition. These results suggested that these compounds react at the anode interface to produce solid electrolyte interface (SEI) layers that do not allow facile movement of lithium-ions at high rates. To mitigate this behavior "SEI promoting" additives can be added to the electrolyte to further improve the nature of the interface.

Effect of Increased TPP Concentration and Incorporation of TFEMC and FEC on the Discharge Performance at Different Temperatures.

In addition to investigating trifluoroethyl butyrate and di-2,2,2-trifluoroethyl carbonate as co-solvents in multi-component mixtures, other fluorinated carbonates were incorporated into electrolyte formulations with the intent of further lower the flammability of the system, such as 2,2,2-trifluoroethyl methyl carbonate and mono-fluoroethylene carbonate. As mentioned previously, when electrolytes containing these co-solvents and 10% TPP were added to MCMB-$LiNiCoO_2$ cells, good reversibility, high coulombic efficiency and low irreversible capacities were observed. When the cells were evaluated at different rates and different temperatures, good performance was observed being comparable to the baseline formulations, as shown in FIG. 33. FIG. 33 is an illustration of a table summary of discharge capacity at low temperature of a number of MCMB-$LiNiCoO_2$ cells containing electrolytes with 10% TPP and TFEMC and/or FEC according to the invention.

Figure 34:
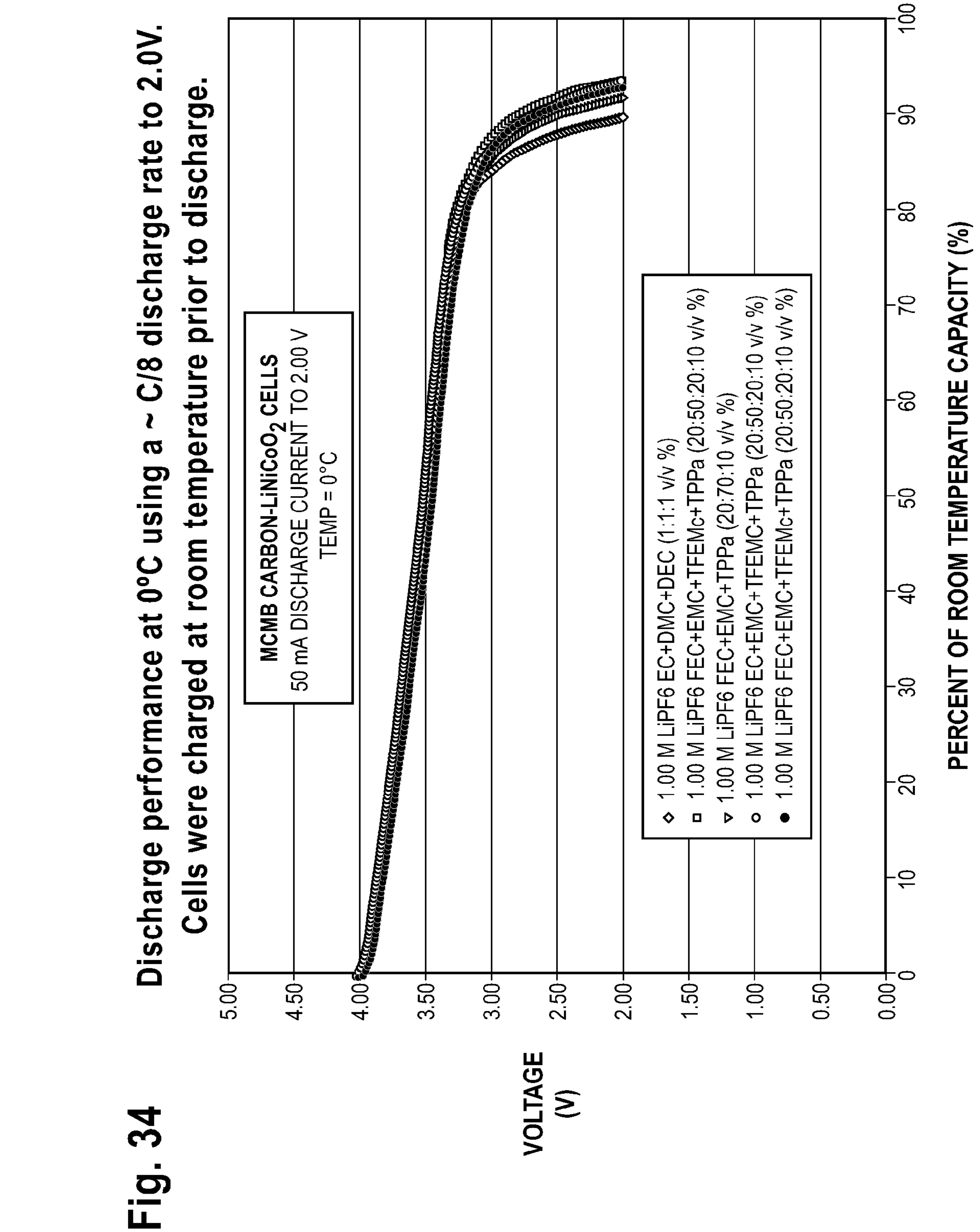
FIG. 34 is an illustration of a graph showing discharge performance at 0° C. using a ~C/8 discharge rate to 2.0 V (volts) according to the invention.

FIG. 34 is an illustration of a graph showing discharge performance at 0° C. using a ~C/8 discharge rate to 2.0 V (volts) according to the invention. The x-axis shows percent of room temperature capacity (%) and the y-axis shows Voltage (V). As illustrated in FIG. 34, good performance was delivered from the cells containing 10% triphenyl phosphate and trifluoroethyl methyl carbonate and/or fluoroethylene carbonate when evaluated at a ~C/8 discharge rate (50 mA) at 0° C. In all cases, the cells were observed to deliver more capacity than the baseline system, with the cell containing the 1.0 M $LiPF_6$ in FEC+EMC+TFEMC+TPP (20:50:20:10 v/v %) electrolyte exhibiting the best performance.

Evaluation of FRA-Containing Electrolyte Formulations in Conjunction with High Voltage, High Capacity Cathode Materials.

In addition to evaluating the electrolytes in MCMB-$LiNiCoO_2$ cells, a number of the formulations were investigated in Li—$Li(Li_{0.17}Ni_{0.25}Mn_{0.58})O_2$ cells to determine their compatibility with high voltage, high capacity cathode materials. These systems are typically charged to a much higher potential (e.g., 4.80V) than the commonly used lithium nickel cobalt oxide materials.

FIG. 35 is an illustration of a table summary of the formation characteristics of a number of Li—$Li(Li_{0.17}Ni_{0.25}Mn_{0.58})O_2$ cells containing various electrolytes with TPP and TPPi flame retardant additives according to the invention. As illustrated in FIG. 35, Li—$Li(Li_{0.17}Ni_{0.25}Mn_{0.58})O_2$ cells containing a "baseline" electrolyte that does not contain any flame retardant additives delivered an average of 234 mAh/g reversible capacity when cycled to 4.80V vs $Li^+$/Li using C/20 charge and discharge rates. When triphenyl phosphate (TPP) was incorporated into the electrolyte formulation very little loss in reversible capacity is observed, with the cells displaying an average of 228 and 221 mAh/g being displayed with 5% TPP and 10% TPP, respectively. Slightly lower reversible capacity was observed with the incorporation of 10% TPP and 20% DTFEC (e.g., 216 mAh/g). In contrast, the use of triphenyl phosphite (TPPi) was accompanied by a sharp decline in the performance, resulting in much lower reversible capacity and an increase in the irreversible capacity. Similar trends in the rate capability at room temperature were observed for the cells.

Demonstration of FRA-Containing Electrolytes in High Capacity Prototype Li-Ion Cells.

To further assess the performance characteristics of candidate electrolyte formulations, a number of high capacity, hermetically sealed Li-ion cells were fabricated with one of the promising electrolyte solutions, namely 1.0M $LiPF_6$ in EC+EMC+TPP+VC (19.7/73.9/4.9/1.5 v/v %). Thus, a number of 7 Ah MCMB-$LiNiCoO_2$ Li-Ion cells were obtained from Yardney Technical Products, Inc. of Pawcatuck, Conn., that incorporated this electrolyte. After the formation process at the vendor, the cells were subjected to conditioning cycling at various temperatures (20° C., 0° C., and −20° C.) to determine the reversible capacity, the specific energy, and the impedance of the cells. After completing the initial characterization testing, a number of performance tests were performed on the cells, including evaluating: (a) the discharge rate performance at various temperatures, (b) the charge rate performance at various temperatures, and (c) determining the cycle life characteristics. FIG. 36 is an illustration of a table summary of discharge performance of a 7 Ah Li-ion cell containing 1.0M $LiPF_6$ in EC+EMC+TPP+VC (19.7/73.9/4.9/1.5 v/v %) according to the invention. As shown in FIG. 36, the discharge rate characterization testing was performed over a wide temperature range (20° to −60° C.) and a wide range of discharge rates (e.g., C/100 to 1.0 C). The cells were charged at room temperature and discharged to 2.0V (the initial measurement at C/5 and 20° C. was performed only down to 2.75V). As illustrated, the cells displayed good rate capability down to very low temperatures, being able to support moderate rates to temperatures as low as −50° C.

Figure 37:
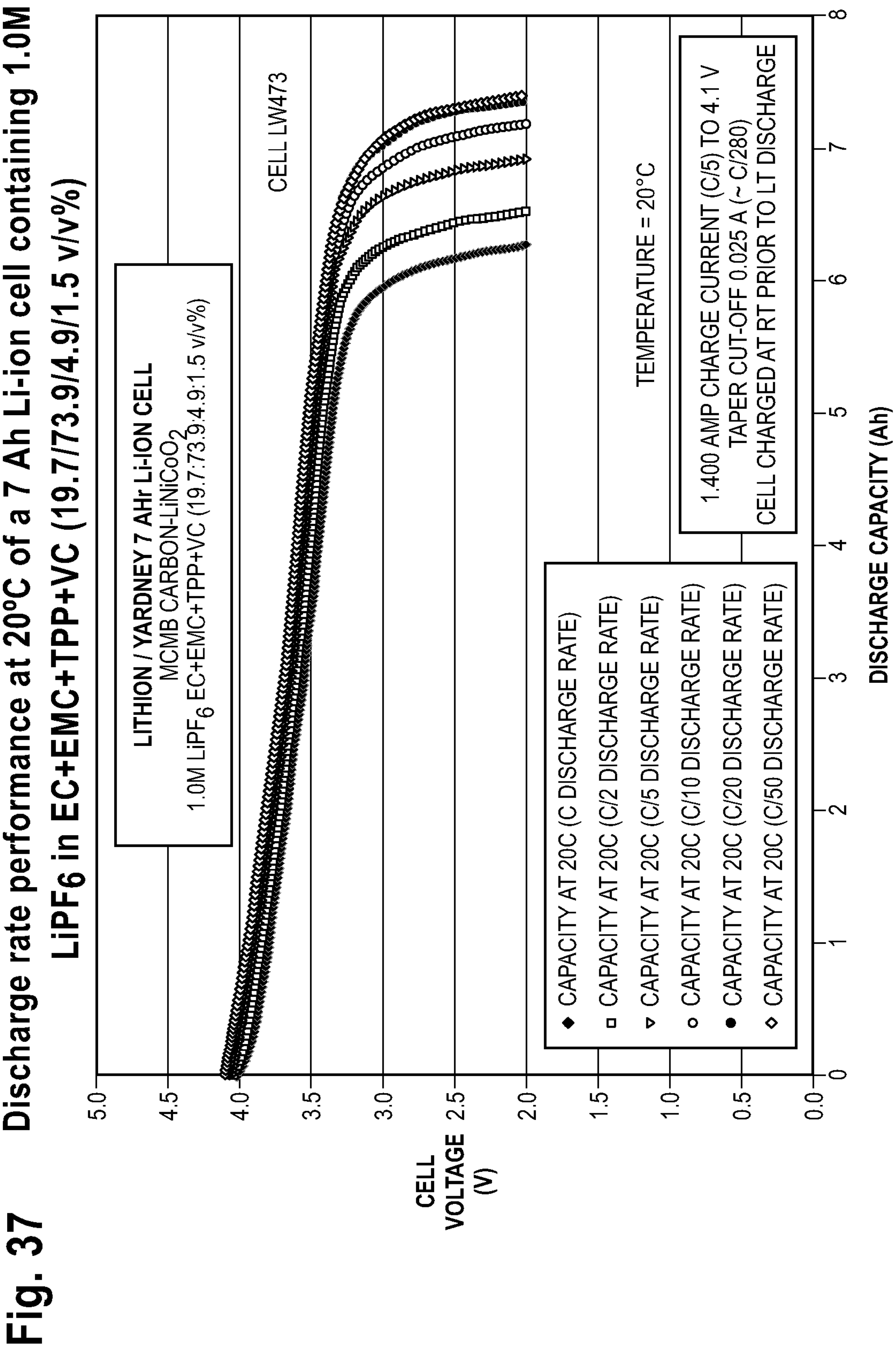
FIG. 37 is an illustration of a graph showing discharge rate performance at 20° C. of a 7 Ah Li-ion cell containing 1.0M $LiPF_6$ in EC+EMC+TPP+VC (19.7/73.9/4.9/1.5 v/v %) according to the invention.

FIG. 37 is an illustration of a graph showing discharge rate performance at 20° C. of a 7 Ah Li-ion cell containing 1.0M $LiPF_6$ in EC+EMC+TPP+VC (19.7/73.9/4.9/1.5 v/v %) according to the invention. The x-axis shows discharge capacity (Ah) and the y-axis shows cell voltage (V). In FIG. 37, the discharge rate performance of the cell is displayed at 20° C., illustrated that superior performance was obtained in the prototype cells compared to the data generated with the experimental three electrode cells. This trend has also been observed with a number of electrolyte formulations that have been scaled up to industrially manufactured Li-ion cells.

As mentioned above, charge rate characterization testing was also performed on the 7 Ah Li-ion cells, which consisted of evaluating the cell at different temperatures (20° C., 10° C., 0° C., and −10° C.) and different charge rates (ranging up to a C rate charge). Charging consisted of employing constant current to a constant potential of 4.10V, followed by taper current cut-off of C/100. It was observed that the cell could be effectively charged over the range of conditions investigated, without the evidence of lithium plating occurring which can be deleterious to cell health.

Figure 38:
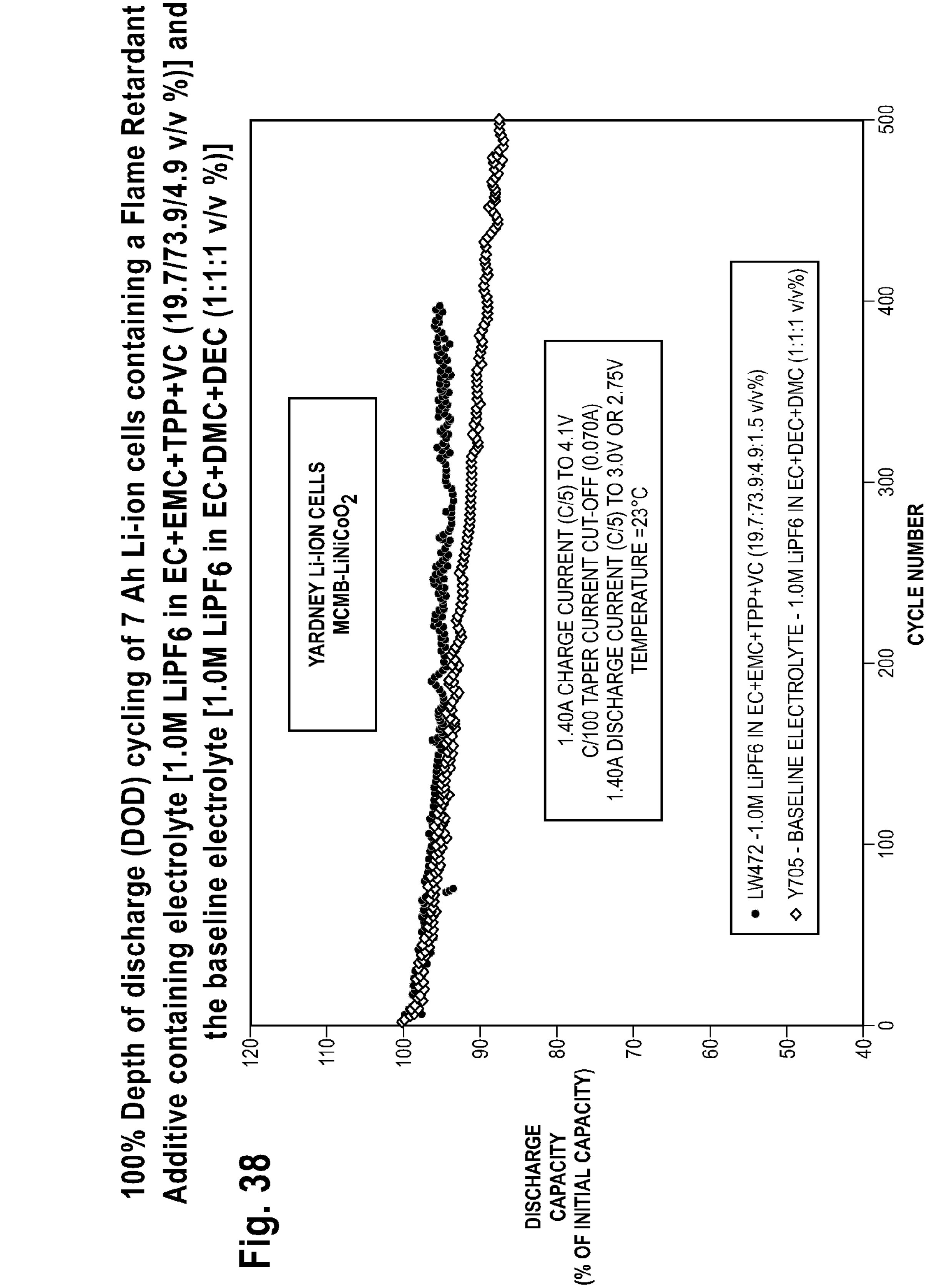
FIG. 38 is an illustration of a graph showing 100% depth of discharge (DOD) cycling of 7 Ah Li-ion cell containing flame retardant additive containing electrolyte[1.0M $LiPF_6$ in EC+EMC+TPP+VC (19.7/73.9/4.9/1.5 v/v %)] and the baseline electrolyte [1.0M $LiPF_6$ in EC+DMC+DEC (1:1:1 v/v %)] according to the invention.

In addition to these tests, a 100% depth-of-discharge (DOD) test was implemented using C/5 charge and discharge rates (over a voltage range of 2.75V to 4.10V). FIG. 38 is an illustration of a graph showing 100% depth of discharge (DOD) cycling of 7 Ah Li-ion cell containing flame retardant additive containing electrolyte [1.0M $LiPF_6$ in EC+EMC+TPP+VC (19.7/73.9/4.9/1.5 v/v %)] and the baseline electrolyte [1.0M $LiPF_6$ in EC+DMC+DEC (1:1:1 v/v %)] according to the invention. The x-axis shows cycle number and the y-axis shows discharge capacity (% of initial capacity). As illustrated in FIG. 38, excellent cycle life performance has been obtained thus far, with approximately 400 cycles being completed while still retaining 95% of the initial capacity. The cycle life observed was actually superior to that obtained with a similar cell containing the baseline electrolyte formulation, namely 1.0M $LiPF_6$ in EC+DMC+DEC (1:1:1 v/v %).

It is expected that other FRAs in the same or similar classes of compounds as discussed above, can work in a similar fashion in the invention, i.e., phosphates, phosphites, and phosphonates.

Li-Ion Battery Electrolytes Containing LiBOB

A number of lithium-ion battery electrolyte formulations containing a flame retardant additive (i.e., triphenyl phosphate (TPP)), were developed and demonstrated in high voltage systems, such as with MPG-111 graphitic anodes and Toda high voltage cathodes NMC-9100 ($Li_{1.2}Mn_{0.53}Ni_{0.18}Co_{0.1}O_2$). These electrolytes included: (i) formulations which incorporate varying concentrations of the flame retardant additive (from 5% to 15%), (ii) the use of mono-fluoroethylene carbonate (FEC) as a co-solvent, and (iii) the use of LiBOB as an electrolyte additive intended to improve the compatibility with high voltage systems. The use of higher concentrations of the flame retardant additive is known to reduce the flammability of the electrolyte solution, with 15% concentration resulting in essentially non-flammable solutions. Thus, the desired concentration of the flame retardant additive is the greatest amount tolerable without adversely affecting the performance in terms of reversibility, ability to operate over a wide temperature range, and the discharge rate capability. The use of mono-fluoroethylene carbonate (FEC) was used to reduce the inherent flammability of mixtures and improve the compatibility at the interfacial regions, due to desirable surface reactions. In summary, the most promising electrolyte identified of the group investigated was 1.0M $LiPF_6$ in EC+EMC+TPP (20:70:10 vol %)+0.15M LiBOB, which was demonstrated to have comparable performance to that of the baseline ternary electrolyte in MPG-111/Toda ($LiNiMnCoO_2$) coin cells, in terms of reversible capacity and discharge rate capability at room temperature. Thus, improved safety has been provided without loss of performance in the high voltage, high energy system.

Low flammability electrolytes to improve the safety characteristics of advanced Li-ion chemistries for the NASA Space Rated Lithium-ion Battery Program (Energy Storage Project) were developed. In addition to providing improved safety characteristics, the electrolytes should ideally provide: (i) good cycle life characteristics, (ii) good rate capability down to 0° C., and (ii) tolerance to high voltages (i.e., up to 5.0V).

Promising flame retardant additives, as well as others, were incorporated into electrolytes that have been optimized for performance and compatibility with different chemistries. Furthermore, the use of fluorinated co-solvents to further reduce the flammability of the systems was investigated. In addition, the use of electrolyte additives that are specifically targeted at improving the interfacial characteristics and the resulting electrolyte compatibility with different electrode chemistries was explored.

In order to accomplish these objectives, a number of assessment techniques and procedures were employed. These included: (1) assessment in three electrode experimental 400 mAh Li-ion cells containing MCMB anode and $LiNiCoO_2$ cathode electrodes (Yardney electrodes), (2) assessment in three electrode experimental 400 mAh Li-ion cells containing MPG-111 graphite anodes and $LiNiCoAlO_2$ cathode electrodes (Saft electrodes, obtained from SAFT America, Inc. of Cockeysville, Md.), (3) assessment coin cells consisting of lithium metal anodes and $(Li_{0.17}Ni_{0.25}Mn_{0.58})O_2$ cathodes, and (4) assessment in coin cells consisting of MPG-111 graphitic anodes and Toda high voltage cathodes NMC-9100 ($Li_{1.2}Mn_{0.53}Ni_{0.18}Co_{0.1}O_2$).

Given that the performance of the electrolyte was observed to be highly system dependent, there was a concerted effort to evaluate the performance using candidate electrode materials of the high energy cell design. Thus, coin cells were fabricated using the Saft MPG-111 graphite anode material and the Toda high voltage layered-layered composite $LiNiMnCoO_2$ cathode material. Initial results were very discouraging in that all of the electrolytes identified as being promising using the different test vehicles previously discussed yielded very poor performance in the new system.

FIG. 40 is an illustration of a table summary of formation characteristics of experimental MPG-111/Toda ($LiNiMnCoO_2$) coin cells containing electrolytes with flame retardant additives (cells TD01-TD02, TD05-TD19) according to the invention. As shown in FIG. 40, when a number of flame retardant additives (FRA) containing electrolytes were evaluated in the MPG-111/Toda system, very poor performance was obtained. The electrolytes included a number of solutions possessing triphenyl phosphate (TPP) (ranging from 5% to 15%) with and without the incorporation of vinylene carbonate (VC). The use of mono-fluoroethylene carbonate (FEC) as an electrolyte co-solvent was also explored, given the favorable results obtained with the MPG-111/$LiNiCoAlO_2$ system. However, no beneficial properties were observed in terms of electrochemical performance. Although the Yardney DMMP-based electrolyte performed the best of the FRA-containing formulations, it displayed a 40% decrease in reversible capacity after 5 cycles.

Since the performance of the FRA-containing electrolytes was unacceptably poor compared to the baseline formulation, additional electrolytes were evaluated (TPP-based) that contain LiBOB as an additive, based on the favorable performance observed with the Yardney/University of Rhode Island (URI) electrolyte (B. L. Lucht, 5$^{th}$ Lithium Mobile Power, Boston, Mass. (2009); Dalavi, et al., "Nonflammable Electrolytes for Lithium-Ion Batteries Containing Dimethyl Methylphosphonate", *Journal of the Electrochemical Society,* 157(10), A1113-A1120 (2010)). Dramatically better performance was observed, outperforming the TPP-based electrolytes that did not contain the LiBOB, as well as the Yardney electrolyte. Additional effort was devoted to cycling cells to only 4.60 V to determine the effect. As a result, greater stability in the performance was observed, and little benefit with respect to delivered capacity was observed with cycling to 4.80 V.

In an attempt to obtained improved compatibility with the MPG-111/$LiNiCoAlO_2$ system, the following electrolytes were investigated: (a) 1.0M $LiPF_6$ in EC+DEC+DMC (1:1:1 vol % (volume percent)) (Baseline Electrolyte); (b) 1.0M $LiPF_6$ in EC+EMC+TPP (20:75:5 vol %)+0.10M LiBOB; (c)

1.0M $LiPF_6$ in EC+EMC+TPP (20:70:10 vol %)+0.05M LiBOB; (d) 1.0M $LiPF_6$ in EC+EMC+TPP (20:70:10 vol %)+0.10M LiBOB; (e) 1.0M $LiPF_6$ in EC+EMC+TPP (20:70:10 vol %)+0.15M LiBOB; (f) 1.0M $LiPF_6$ in FEC+EMC+TPP (20:70:10 vol %)+0.10M LiBOB; (g) 1.0M $LiPF_6$ in EC+EMC+TPP (20:70:10 vol %)+0.05M LiBOB+1.5% VC.

Initially, the cells were cycled over a wide voltage range of 2.0 V to 4.80 V (with a taper current cut-off of C/100) using C/20 rates, as illustrated in FIG. 41. FIG. 41 is an illustration of a table summary of formation characteristics of experimental MPG-111/Toda ($LiNiMnCoO_2$) coin cells containing electrolytes with flame retardant additives (cells TD03-TD04 and TD21-TD32), where cells TD03-TD30 were all cycled over a voltage range of 2.0 V to 4.80 V (with a C/100 taper current cut-off), and cells TD31-TD32 were cycled over a voltage range of 2.0 V to 4.60 V (with a C/100 taper current cut-off) according to the invention. As shown, noticeably improved performance was obtained, which is attributed to the beneficial effect of LiBOB. Given that the TPP solutions perform well with the MPG-111/$LiNiCoAlO_2$ system, it is likely that the LiBOB has a beneficial effect upon the interfacial properties of the cathodes to prevent degradation of the flame retardant additive at high voltage. However, more research needs to be performed to clearly ascertain the mechanism by which the LiBOB is imparted beneficial properties (i.e., study in three electrode cells complemented by electrochemical characterization). As shown in FIG. 41, cells containing electrolytes with 10% TPP performed very comparable to the baseline solution, delivering ~230 mAh/g. The cells containing an electrolyte possessing FEC did not perform well, even though they contained LiBOB, suggesting that FEC was decomposing at high potential. Preliminary data also suggested that when cycling to high potential (i.e., 4.80V) greater than 0.05M LiBOB is desired, or should be augmented by an additional electrolyte additive, such as vinylene carbonate (VC).

Figure 42:
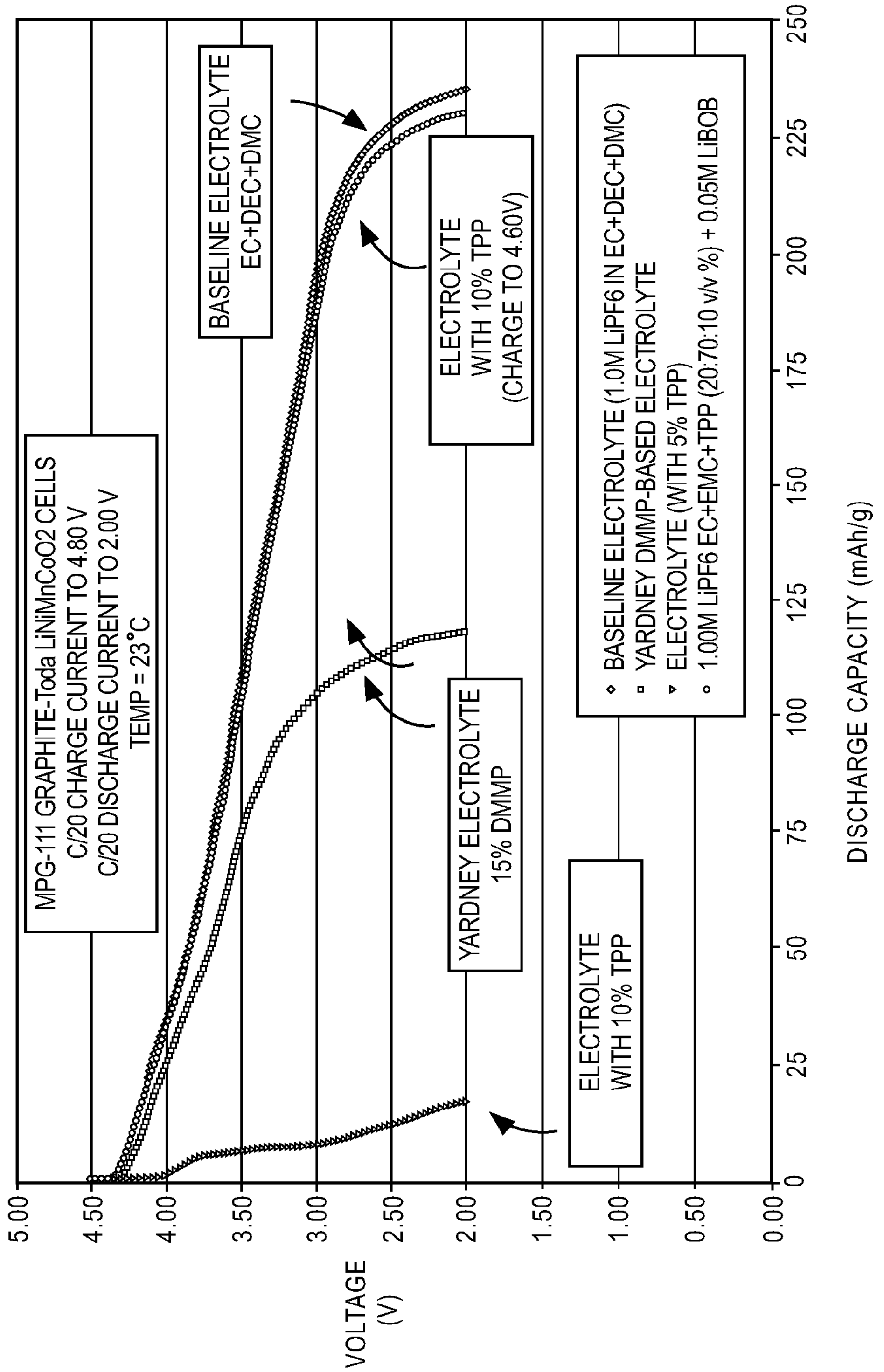
FIG. 42 is an illustration of a graph showing discharge capacity (mAh/g) delivered on the $5^{th}$ formation cycle of MPG-111/Toda ($LiNiMnCoO_2$) coin cells containing electrolytes with flame retardant additives, where cells were charged using a C/20 rate to either 4.60V or 4.80V (with a C/100 taper current cut-off) and discharged to 2.0V using a C/20 rate according to the invention.

During the course of this investigation, it was determined that cells containing the TPP-based electrolytes displayed improved performance if the cells were only charged to 4.60V, rather than being charged to 4.80V. FIG. 42 is an illustration of a graph showing discharge capacity (mAh/g) delivered on the $5^{th}$ formation cycle of MPG-111/Toda ($LiNiMnCoO_2$) coin cells containing electrolytes with flame retardant additives, where cells were charged using a C/20 rate to either 4.60V or 4.80V (with a C/100 taper current cut-off) and discharged to 2.0V using a C/20 rate according to the invention. As illustrated in FIG. 42, a cell containing 1.0M $LiPF_6$ in EC+EMC+TPP (20:70:10 vol %)+0.05M LiBOB and cycled to only 4.60V displayed very comparable performance with cells containing the baseline ternary electrolyte charged to 4.80V. Cells containing this electrolyte performed dramatically better than cells containing the Yardney electrolyte (with DMMP and LiBOB) and the electrolyte (with 5% TPP and no LiBOB), which were charged to 4.80V.

Based upon these results, another batch of cells were fabricated and subjected to formation cycling of only charging to 4.60V and discharging to 3.0V. The low voltage cut-off was selected to be in accordance with the Key Performance Parameters (KPP) values. FIG. 43 is an illustration of a table summary of formation characteristics of experimental MPG-111/Toda ($LiNiMnCoO_2$) coin cells containing electrolytes with flame retardant additives (cells TD33-TD42), where all cells were cycled over a voltage range of 3.0V to 4.60V (with a C/100 taper current cut-off) according to the invention. As shown in FIG. 43, all cells containing electrolytes with TPP and LiBOB performed comparably with the cells possessing the baseline ternary all carbonate-based electrolytes, with some cells delivering high capacity suggesting enhanced performance. Although there was not a strong dependence with regard to the behavior exhibited during the formation cycling, it was determined that higher LiBOB concentration imparted more stable performance.

Figure 44:
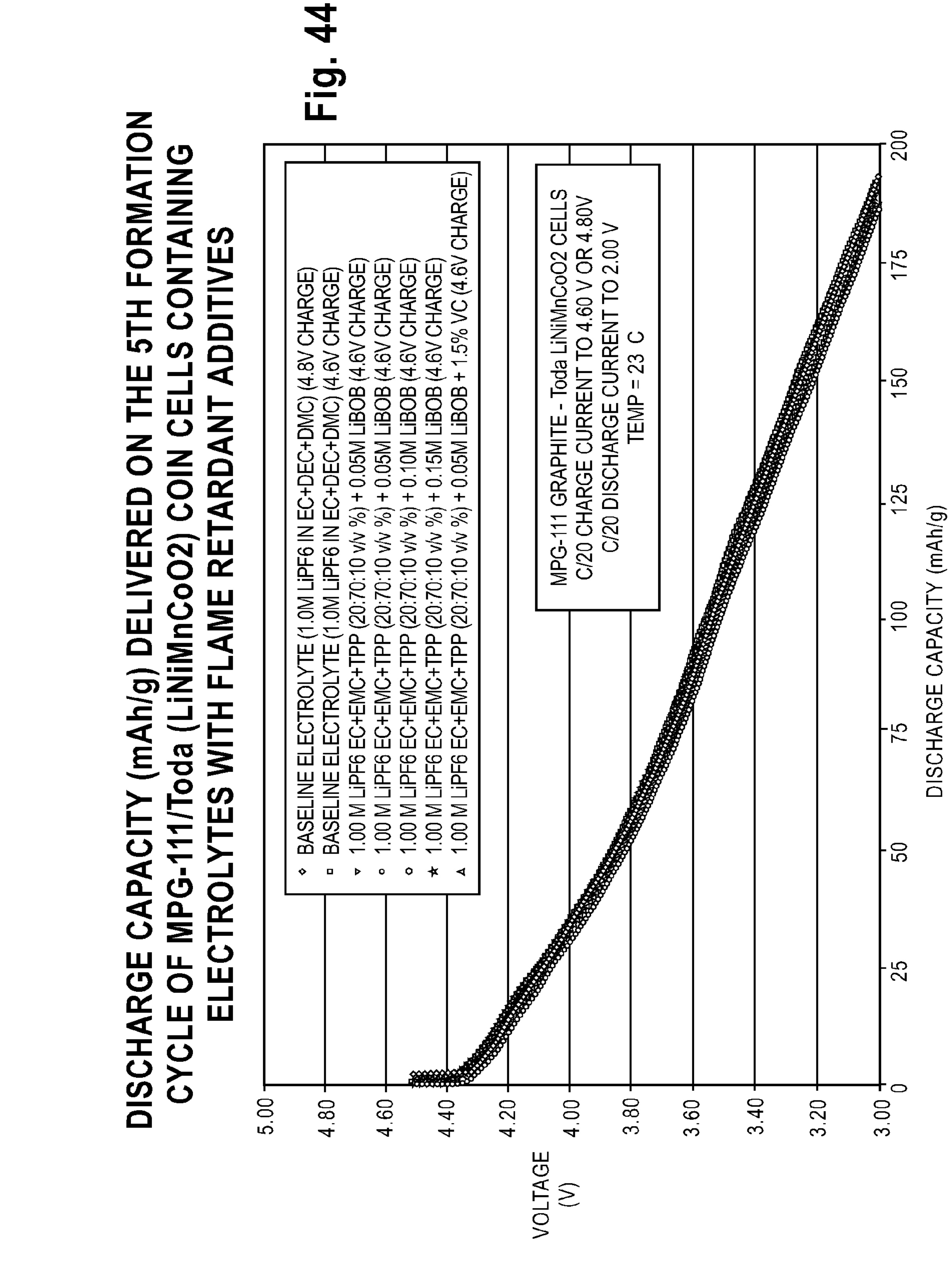
FIG. 44 is an illustration of a graph showing discharge capacity (mAh/g) delivered on the $5^{th}$ formation cycle of MPG-111/Toda ($LiNiMnCoO_2$) coin cells containing electrolytes with flame retardant additives, where cells were charged using a C/20 rate to 4.60V (with a C/100 taper current cut-off) and discharged to 3.0V using a C/20 rate according to the invention.

FIG. 44 is an illustration of a graph showing discharge capacity (mAh/g) delivered on the $5^{th}$ formation cycle of MPG-111/Toda ($LiNiMnCoO_2$) coin cells containing electrolytes with flame retardant additives, where cells were charged using a C/20 rate to 4.60V (with a C/100 taper current cut-off) and discharged to 3.0V using a C/20 rate according to the invention. When the discharge capacity was compared on the fifth formation cycle, as displayed in FIG. 44, excellent performance was obtained with the electrolytes containing TPP and LiBOB. As a result of these studies, the following electrolyte was identified to be favorable for high voltage systems: 1.0M $LiPF_6$ in EC+EMC+TPP (20:70:10 vol %)+0.15M LiBOB.

FIG. 45 is an illustration of a table summary of discharge rate characteristics of experimental MPG-111/Toda ($LiNiMnCoO_2$) coin cells containing electrolytes with flame retardant additives (cells TD33-TD36), where all cells cycled over a voltage range of 3.0V to 4.60V (with a C/100 taper current cut-off) according to the invention. FIG. 46 is an illustration of a table summary of discharge rate characteristics of experimental MPG-111/Toda ($LiNiMnCoO_2$) coin cells containing electrolytes with flame retardant additives (cells TD37-TD40), where all cells cycled over a voltage range of 3.0V to 4.60V (with a C/100 taper current cut-off) according to the invention. FIG. 47 is an illustration of a table summary of discharge rate characteristics of experimental MPG-111/Toda ($LiNiMnCoO_2$) coin cells containing electrolytes with flame retardant additives (cells TD41-TD42), where all cells cycled over a voltage range of 3.0V to 4.60V (with a C/100 taper current cut-off) according to the invention. After completing the formation cycling of these cells, discharge rate performance testing was performed at room temperature, as show in FIGS. 45-47.

Although some cell to cell variation in the rate capability of the cells was observed, some trends emerged from the testing including: (a) at moderate rates, all of the cells containing TPP+LiBOB displayed comparable performance with the baseline formulation, (ii) increasing LiBOB concentration appeared to improve the higher rate capability, and (iii) the incorporation of VC into the electrolyte appeared to have a slightly negative effect upon the performance. These results support the identification of 1.0M $LiPF_6$ in EC+EMC+TPP (20:70:10 vol %)+0.15M LiBOB as a favorable electrolyte for high voltage systems.

Figure 48:
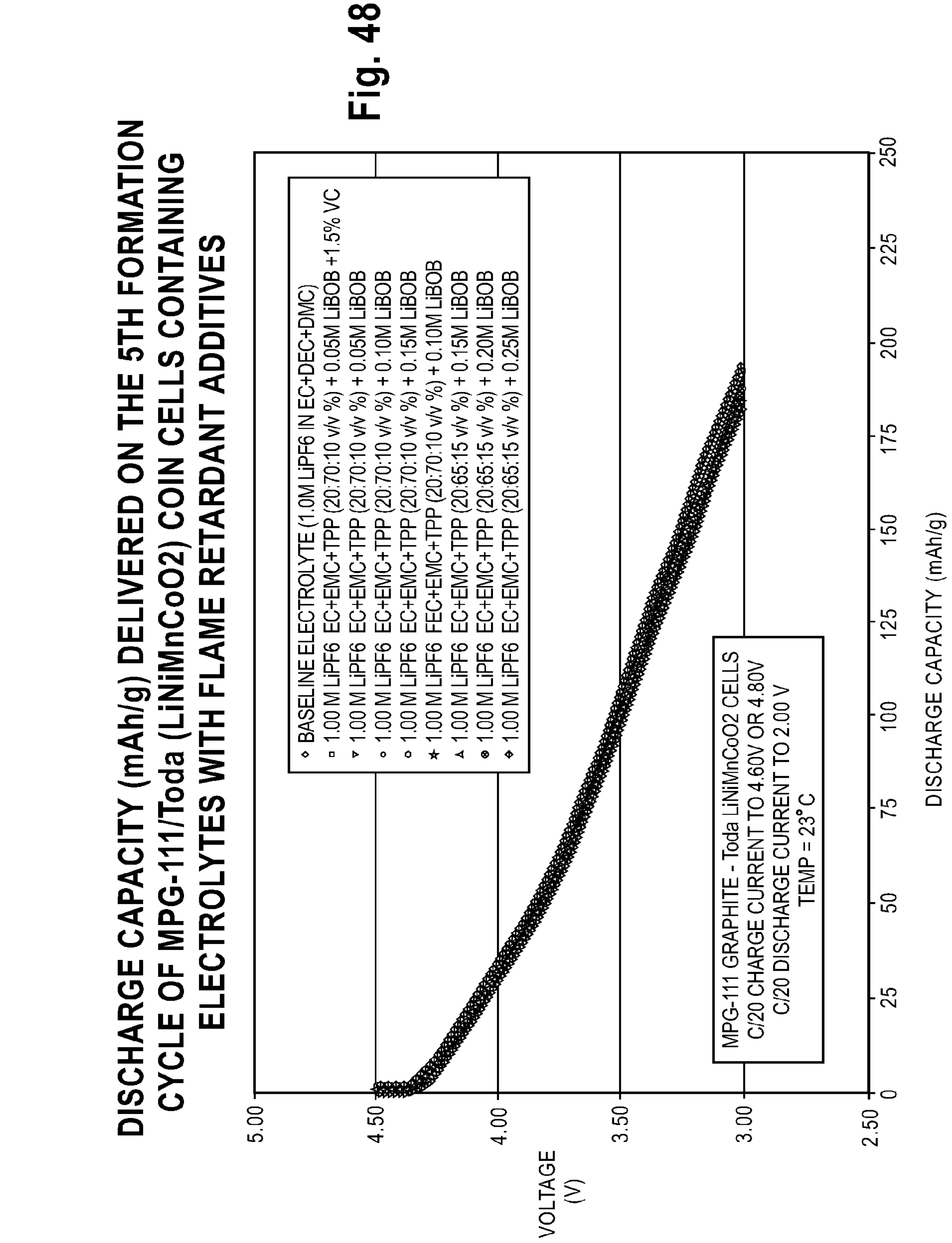
FIG. 48 is an illustration of a graph showing discharge capacity (mAh/g) delivered on the $5^{th}$ formation cycle of MPG-111/Toda ($LiNiMnCoO_2$) coin cells containing electrolytes with flame retardant additives, where cells were charged using a C/20 rate to 4.60V (with a C/100 taper current cut-off) and discharged to 3.0V using a C/20 rate according to the invention.

Current efforts focused upon: (a) evaluating solutions with higher concentration of TPP, (b) exploring strategies to improve the ionic conductivity of the electrolytes, and (c) more fully understand the stabilizing effect of LiBOB, as well as other strategies to promote compatibility with high voltage systems. FIG. 48 is an illustration of a graph showing discharge capacity (mAh/g) delivered on the $5^{th}$ formation cycle of MPG-111/Toda ($LiNiMnCoO_2$) coin cells containing electrolytes with flame retardant additives, where cells were charged using a C/20 rate to 4.60V (with a C/100 taper current cut-off) and discharged to 3.0V using a C/20 rate according to the invention. As shown in FIG. 48, efforts focused upon increasing the TPP content resulted in favorable results, with very comparable reversible capacity being delivered with concentrations as high as 15% (as well as with LiBOB concentrations as high as 0.25M).

Effort has been devoted to exploring these approaches to lower voltage systems as well, namely with $LiNiCoAlO_2$ cathodes materials. A number of similar electrolyte formulations were investigated in the lower voltage system, only differing in that many did not contain LiBOB. For example, the following electrolytes were investigated: (a) 1.0M $LiPF_6$ in EC+EMC+TPP (20:70:10 vol %); (b) 1.0M $LiPF_6$ in EC+EMC+TPP (20:65:15 vol %); (c) 1.0M $LiPF_6$ in FEC+EMC+TPP (20:70:10 vol %); (d) 1.0M $LiPF_6$ in EC+EMC+TPP (20:70:10 vol %)+0.15M LiBOB; (e) 1.0M $LiPF_6$ in FEC+EMC+TPP (20:65:15 vol %).

FIGS. 49A-49B are illustrations of table summaries of formation characteristics of experimental MPG-111/$LiNiCoAlO_2$ (NCA) cells containing electrolytes with flame retardant additives, where all cells were cycled over a voltage range of 2.75 V to 4.10 V (with a C/100 taper current cut-off) according to the invention. As illustrated in FIGS. 49A-49B, good reversibility was observed with TPP concentrations as high as 15% and with formulations containing FEC in place of EC.

Furthermore, good rate capability over a wide range of temperature was observed, as shown in FIG. 50. FIG. 50 is an illustration of a table summary of discharge characteristics of experimental MPG-111/$LiNiCoAlO_2$ (NCA) cells containing electrolytes with flame retardant additives according to the invention.

Recent efforts also focused upon incorporating low viscosity ester co-solvents, such as methyl propionate (MP) and methyl butyrate (MB), with the intent of increasing the conductivity of the electrolyte. This approach resulted in good performance in the high voltage MPG-111/Toda ($LiNiMnCoO_2$) system with very comparable capacities being obtained after completing the formation cycling, as shown in FIG. 51. FIG. 51 is an illustration of a table summary of the formation characteristics of experimental MPG-111/Toda ($LiNiMnCoO_2$) coin cells containing electrolytes with flame retardant additives (TD63-TD68), where all cells were cycled over a voltage range of 3.0 V to 4.60 V (with a C/100 taper current cut-off) according to the invention. These electrolytes included: (a) 1.0M $LiPF_6$ in EC+EMC+MP+TPP (20:50:20:10 vol %)+0.15M LiBOB and (b) 1.0M $LiPF_6$ in EC+EMC+MB+TPP (20:50:20:10 vol %)+0.15M LiBOB.

Summary of Electrolyte Development.

As a result of the recent electrolyte development effort utilizing the MPG-111/Toda ($LiNiMnCoO_2$) system, it was determined that LiBOB greatly enhances the compatibility of TPP-based formulations with the high voltage systems. Upon incorporation of LiBOB, dramatically better performance was observed, outperforming the TPP-based electrolytes that did not contain the LiBOB, as well as the Yardney electrolyte. As a result of these studies, an electrolyte consisting of 1.0M $LiPF_6$ in EC+EMC+TPP (20:70:10 vol %)+0.15M LiBOB was identified as being preferred for the high voltage system, with later studies also indicating that higher TPP concentrations may be used. This electrolyte was demonstrated to have comparable performance to that of the baseline ternary electrolyte in MPG-111/Toda ($LiNiMnCoO_2$) coin cells, in terms of reversible capacity and discharge rate capability at room temperature. To meet a program deliverable, 200 mL of this electrolyte was prepared and assessed. This electrolyte was selected for performance verification in large capacity DD-size cells manufactured by Saft America, Inc. under the NASA funded ETDP program.

Current efforts are devoted to further evaluating the electrolyte with the MPG-111/Toda ($LiNiMnCoO_2$) system, namely in larger capacity (~300 mAh) jelly roll cells equipped with reference electrodes. Electrochemical evaluation of the anodes and cathodes will be performed with the intent of determining the relative lithium kinetics. In addition, effort will be focused upon determining the nature of the irreversible capacity losses, with the purpose of providing information crucial in selecting the proper cell design aspects, such as the cathode to anode ratio.

Effort will also be devoted to further assessing the performance with respect to other cell chemistries, including the MCMB-$LiNiCoO_2$ and the MPG-111-$LiNiCoAlO_2$ systems. Cycle life assessment will also be addressed in all systems, with the intent of identifying life degradation mechanisms.

Future electrolyte development efforts will be focused upon: (a) investigating formulations with higher FRA-content, (b) strategies to improve the cycle life performance, (c) approaches to improve the ionic conductivity of the electrolytes, with the intent of increasing reversible capacity as well as rate capability, and (d) further optimization to enhance capability with promising future generations of electrode chemistries (i.e., alternative high voltage cathodes and/or high capacity Si-based anodes, as discussed below). Lastly, further investigation into the safety characteristics of the preferred electrolytes, as well as future generations, will be performed.

Li-Ion Electrolytes with Improved Safety and the Ability to Operate with High Capacity Silicon-Based Anodes and High Voltage Metal Oxide Cathodes.

A number of lithium-ion battery electrolytes that result in improved safety characteristics of lithium-ion cells were developed and were demonstrated to be compatible with a number of different electrode chemistries (Smart, et al., "Li-Ion electrolytes containing flame retardant additives for increased safety characteristics", New Technology Report NPO-46262, (May 29, 2008); Smart et al., "Li-ion electrolytes containing phosphorus-based flame retardant additives", New Technology Report NPO-46599 (Sep. 22, 2008); Smart, et al., "Optimized Li-ion electrolytes containing triphenyl phosphate as a flame retardant additive", New Technology Report NPO-47465 (Dec. 22, 2009); Smart et al., "Li-ion electrolytes with improved safety and tolerance to high voltage systems", New Technology Report NPO-47980 (Dec. 10, 2010)).

In work focused upon high voltage systems, a number of lithium-ion battery electrolytes containing a flame retardant additive (i.e., triphenyl phosphate) and the use of LiBOB as an electrolyte additive intended to improve the compatibility with high voltage systems were developed. The use of the cyclic carbonate mono-fluoroethylene carbonate (FEC) was demonstrated to effectively be used as a co-solvent, in conjunction with, or in lieu of, ethylene carbonate (EC). Lithium-ion electrolytes with improved safety that have been designed to operate with silicon-based anode materials, that can be coupled with high voltage cathode materials to produce high specific energy lithium-ion cells have been developed. Specifically, it was demonstrated that an electrolyte formulation previously described (i.e., in Smart et al., "Li-ion electrolytes with improved safety and tolerance to high voltage systems", New Technology Report NPO-47980 (Dec. 10, 2010)), namely 1.0M $LiPF_6$+0.10M LiBOB in FEC+EMC+TPP (20:70:10 vol %) was superior to baseline electrolytes when evaluated with silicon-based anodes, resulting in enhanced cycle life. In addition to demonstrating the compatibility of a number of other previously described solutions with silicon-based anodes, new electrolytes were developed that focus upon utilizing fluoroethylene carbonate in conjunction with ethylene carbonate and alternate linear carbonates, the use of film forming additives in high proportion (such as vinylene carbonate), and solutions containing a large proportion of fluorinated solvents.

To developed advanced electrolytes with improved safety for use with silicon anode-based systems to be used in conjunction with high voltage cathodes, a number of approaches can be taken to reduce the flammability of electrolytes, including the use of phosphorus-based flame retardant additives, as previously described (Smart, et al., "Li-Ion electrolytes containing flame retardant additives for increased safety characteristics", New Technology Report NPO-46262, (May 29, 2008); Smart et al., "Li-ion electrolytes containing phosphorus-based flame retardant additives", New Technology Report NPO-46599 (Sep. 22, 2008); Smart, et al., "Optimized Li-ion electrolytes containing triphenyl phosphate as a flame retardant additive", New Technology Report NPO-47465 (Dec. 22, 2009); Smart et al., "Li-ion electrolytes with improved safety and tolerance to high voltage systems", New Technology Report NPO-47980 (Dec. 10, 2010); Smith, et al., "Lithium Ion Electrolytes Containing Flame-Retardant Additives for Increased Safety Characteristics", *ECS Transactions,* 16(35), 33 (2009); Smart, et al., "The Evaluation of Triphenyl Phosphate as a Flame Retardant Additive to improve the Safety of Lithium-ion Battery Electrolytes", *ECS Transactions,* 35(13), 1 (2011)).

Of the flame retardants evaluated, triphenyl phosphate (TPP) (Doughty, et al., "Effects of Additives on Thermal Stability of Li Ion Cells", *Journal of Power Sources,* 146(1-2), 116-120 (2005)) was identified as being the most desirable, since it displayed the best overall performance with a number of systems. Based on prior work with TPP-based electrolytes with LiBOB, a number of electrolytes were developed to be compatible with the Si-based anodes, including: (a) 1.0M $LiPF_6$+0.15M LiBOB in EC+EMC+TPP (20:70:10 vol %); (b) 1.0M $LiPF_6$+0.10M LiBOB in FEC+EMC+TPP (20:70:10 vol %); (c) 0.50M $LiPF_6$+0.10M LiBOB in FEC+TFEB+TPP (20:70:10 vol %); (d) 1.0M $LiPF_6$+0.15M LiBOB in EC+EMC+TPP (20:70:10 vol %)+1.5% VC; (e) 1.0M $LiPF_6$+0.15M LiBOB in EC+EMC+TPP (20:70:10 vol %)+5% VC; (f) 0.50M LiPF6 in FEC+TFEB (20:80 v/v %); (g) 1.0M LiPF6+0.10M LiBOB in FEC+EC+DMC+TPP (30:30:30:10 v/v %).

The electrolytes embody a number of technical approaches, including: (1) evaluation of currently developed electrolyte formulations in the context of silicon, (2) the use of mono-fluoroethylene carbonate (FEC) in lieu of ethylene carbonate (EC), (3) the use of high proportions of fluorinated solvents, and (4) the use of vinylene carbonate (VC) to stabilize the silicon/carbon (Si/C) electrode. To evaluate the electrolytes, they were assessed in coin cells consisting of: (a) Si—C composite electrodes and lithium metal counter electrodes, and (b) Si—C composite anodes and Toda high voltage lithium excess layered-layered metal oxide cathodes (i.e., NMC 9100 $Li(MnNiCo)O_2$).

To address this, the current work focused upon developing advanced electrolytes that display both reduced flammability and enhanced stability toward silicon anodes and high voltage cathodes.

When a series of TPP-containing electrolytes were evaluated in Li/Si—C coins cells, generally high reversible capacity was displayed (i.e., >1750 mAh/g) with all cells, although somewhat lower capacities were observed compared with the baseline electrolyte (i.e., 8-20% lower), as shown in FIG. 52. FIG. 52 is an illustration of a table summary of formation characteristics of experimental Li/Si—C coin cells containing electrolytes with low flammability according to the invention. All of the cells performed comparably when subjected to discharge rate characterization, with over 89% of the C/20 discharge capacity being displayed at a C/2 discharge rate.

Figure 53:
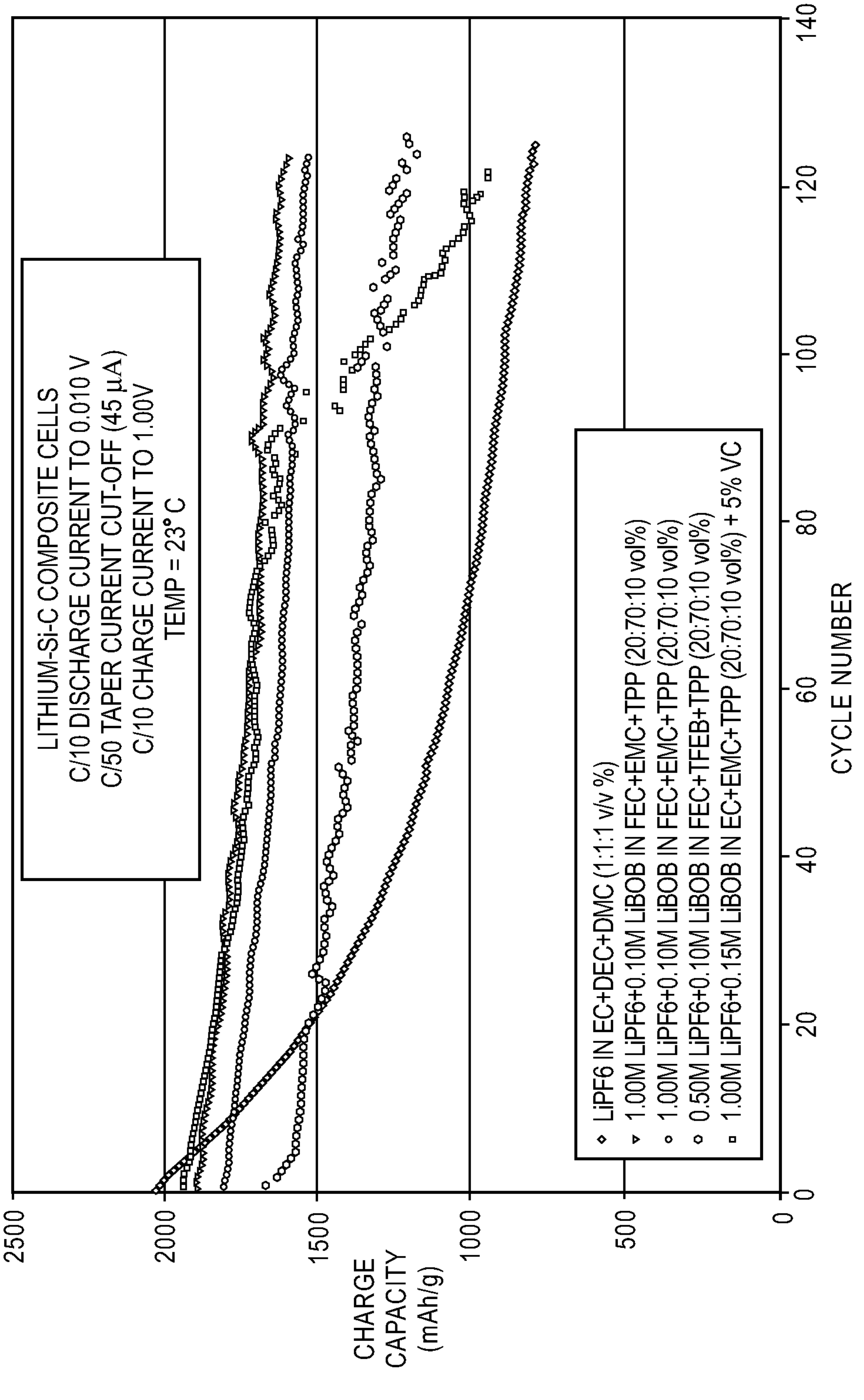
FIG. 53 is an illustration of a graph showing cycle life performance of Li/Si—C cells containing low flammability electrolytes, where cells were discharged using a C/10 rate to 0.010V (with a C/50 taper current cut-off) and charged to 1.0V using a C/10 rate according to the invention.

Although the baseline electrolyte delivered good performance at the beginning of life, in terms of high reversible capacity, rapid capacity fade was observed with cycling, as illustrated in FIG. 53. FIG. 53 is an illustration of a graph showing cycle life performance of Li/Si—C cells containing low flammability electrolytes, where cells were discharged using a C/10 rate to 0.010V (with a C/50 taper current cut-off) and charged to 1.0V using a C/10 rate according to the invention. In contrast, cells containing 1.0M $LiPF_6$+0.10M LiBOB in FEC+EMC+TPP (20:70:10 v/v %) delivered improved performance, with significantly less capacity fade.

When a number of low flammability electrolytes were evaluated in Si—C/Toda $LiNiCoMnO_2$ coins cells, consisting of heavy loading Si—C electrodes, very comparable reversible capacity was observed with all cells, being very much more similar with the baseline electrolyte, as shown in FIGS. 54A-54B. FIGS. 54A-54B are illustrations of table summaries of formation characteristics of experimental Si—C/Li $(NiCoMn)O_2$ coin cells containing electrolytes with low flammability according to the invention. These results illustrate the compatibility of these electrolytes with high voltage cathodes, being able to sustain charge voltages of 4.6 V.

Figure 55:
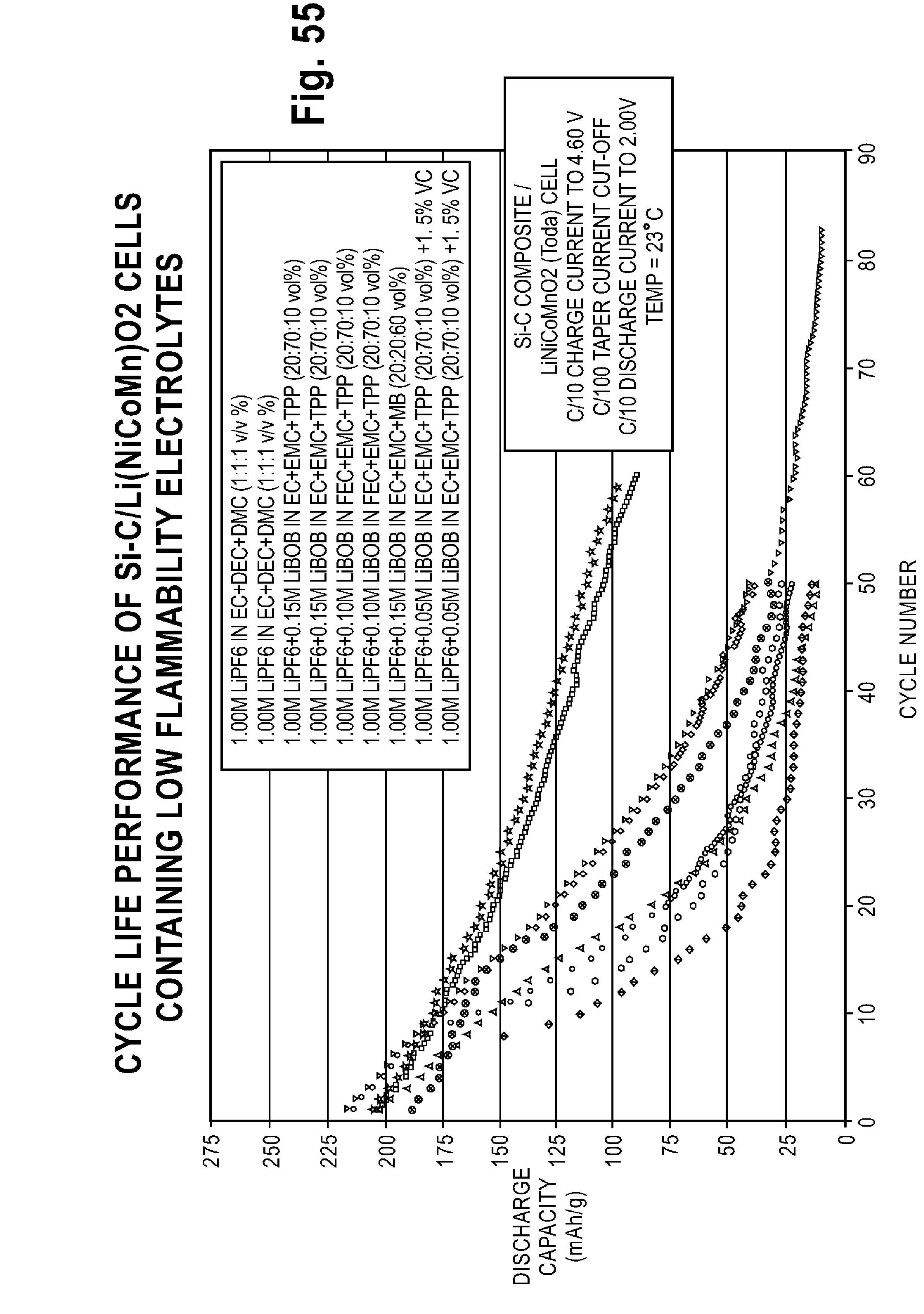
FIG. 55 is an illustration of a graph showing cycle life performance of Si—C/Li$(NiCoMn)O_2$ cells containing low flammability electrolytes, where cells were charged using a C/10 rate to either 4.60V (with a C/50 taper current cut-off) and discharged to 2.0V using a C/10 rate according to the invention; and, FIG. 56 is an illustration of a graph showing cycle life performance of Si—C/Li$(NiCoMn)O_2$ cells containing low flammability electrolytes. Cells were charged using a C/10 rate to either 4.60V (with a C/50 taper current cut-off) and discharged to 2.0V using a C/10 rate according to the invention.

When the cells were subjected to full depth of discharge cycling over a voltage range of 4.6 V to 2.0 V, the cells containing 1.0M $LiPF_6$+0.10M LiBOB in FEC+EMC+TPP (20:70:10 v/v %) again were observed to deliver improved performance, with significantly less capacity fade, as illustrated in FIG. 55. FIG. 55 is an illustration of a graph showing cycle life performance of Si—C/$Li(NiCoMn)O_2$ cells containing low flammability electrolytes, where cells were charged using a C/10 rate to either 4.60 V (with a C/50 taper current cut-off) and discharged to 2.0V using a C/10 rate according to the invention.

Figure 56:
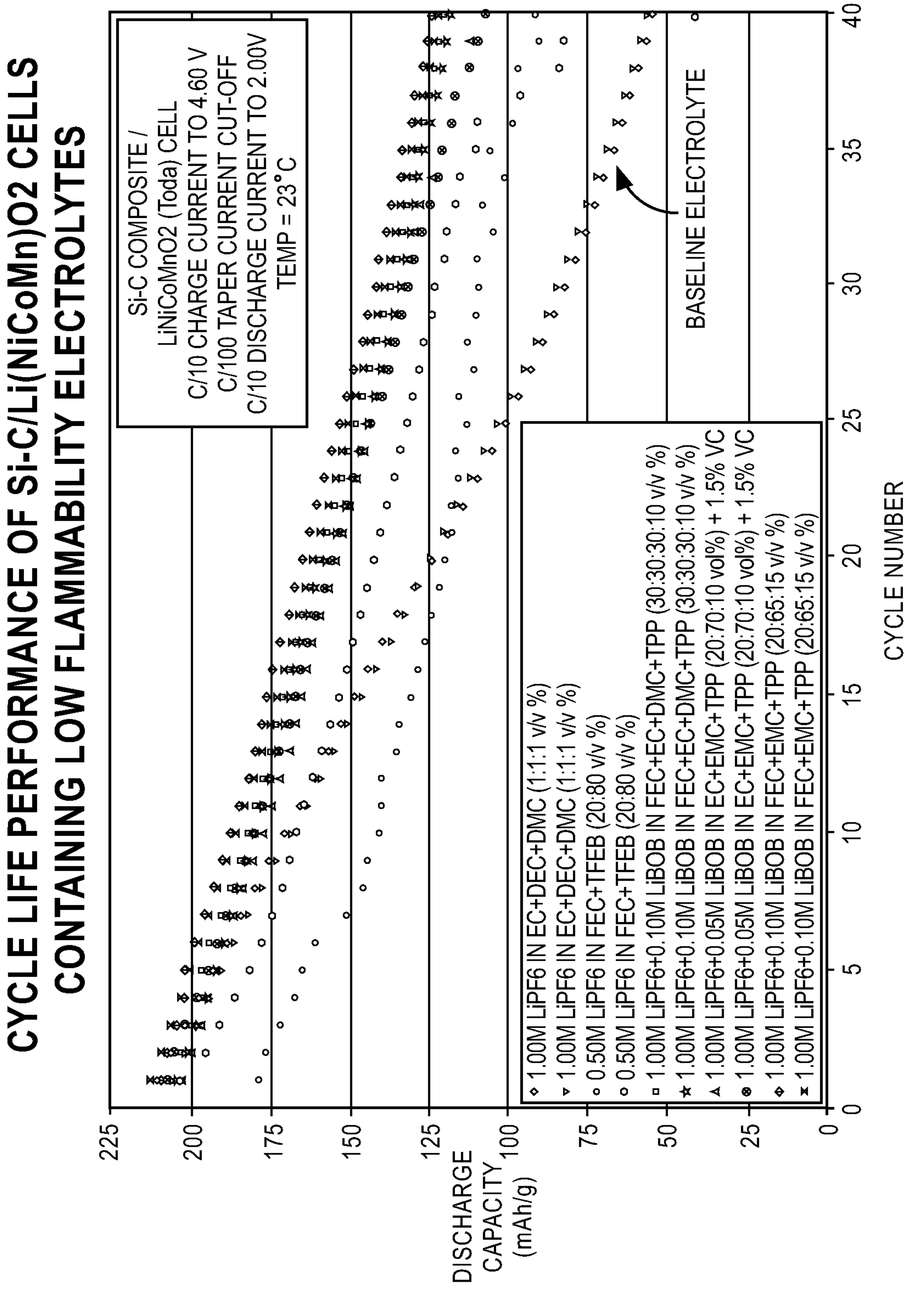

When a second group of electrolytes were evaluated with the heavy loading Si—C electrodes in Si—C/Toda $LiNiCoMnO_2$ coins cells, improved cycle life was observed in all cases, as shown in FIG. 56. FIG. 56 is an illustration of a graph showing cycle life performance of Si—C/$Li(NiCoMn)O_2$ cells containing low flammability electrolytes. Cells were charged using a C/10 rate to either 4.60 V (with a C/50 taper current cut-off) and discharged to 2.0V using a C/10 rate according to the invention.

The best performance was observed with cells containing 1.0M $LiPF_6$+0.10M LiBOB in FEC+EMC+TPP (20:65:15 v/v %), illustrating that formulations containing 15% TPP in conjunction with FEC and LiBOB can function effectively in the high voltage, high specific energy system. An electrolyte formulation possessing both FEC and EC, with DMC replacing EMC to afford lower viscosity, namely 1.0M $LiPF_6$+0.10M LiBOB in FEC+EC+DMC+TPP (30:30:30:10 v/v %), also displayed very comparable cycle life characteristics outperforming the baseline electrolyte.

Promising performance was also exhibited with cells containing an electrolyte possessing exclusively partially fluorinated co-solvents, namely 0.50M $LiPF_6$ in FEC+2,2,2-trifluoroethyl butyrate (TFEB) (20:80 v/v). Although somewhat increased capacity fade was observed compared with the solutions described above, the cells displayed improved performance over the baseline solutions. It should be noted that permutations of this electrolyte have been investigated in the context of C/$Li(NiCoMn)O_2$ cells and are anticipated to be viable with systems involving Si-based anodes and high voltage cathodes. These electrolyte include the following: (a) 0.50M $LiPF_6$+0.10M LiBOB in FEC+TFEB+TPP (20:70:10 vol %); (b) 0.50M $LiPF_6$+0.10M LiBOB in FEC+TFEB+MB+TPP (20:50:20:10 vol %); and, (c) 0.50M $LiPF_6$+0.10M $LiBF_4$ in FEC+TFEB+TPP (20:70:10 vol %).

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting. Although specific terms are employed herein, they are used in a generic and descriptive sense only and not for purposes of limitation.

What is claimed is:

1. An electrolyte comprising a mixture of:

ethylene carbonate (EC);

ethyl methyl carbonate (EMC) or dimethyl carbonate (DMC);

a flame retardant additive;

a lithium salt comprising lithium hexafluorophosphate ($LiPF_6$); and, an electrolyte additive, wherein the electrolyte additive comprises lithium bis(oxalato) borate (LiBOB);

wherein the electrolyte comprises 1.0M lithium hexafluorophosphate ($LiPF_6$) in 20% by volume ethylene carbonate (EC) plus 65% to 70% by volume ethyl methyl carbonate (EMC) plus 10% to 15% by volume of the flame retardant additive of triphenyl phosphate (TPhPh/TPP/TPPa) plus 0.15M lithium bis(oxalato) borate (LiBOB).

2. The electrolyte of claim 1 wherein the electrolyte further comprises methyl propionate (MP) or methyl butyrate (MB).

3. The electrolyte of claim 1, wherein the electrolyte further comprises a flame retardant additive selected from the group consisting of tributyl phosphate (TBP/TBuPh), triethyl phosphate (TEP/TEtPh), bis(2,2,2-trifluoroethyl) methyl phosphonate (BTFEMP/TFMPo), tris(2,2,2-trifluoroethyl) phosphate, diethyl ethylphosphonate, diethyl phenylphosphonate, and mixtures thereof.

4. The electrolyte of claim 1, wherein the electrolyte further comprises a lithium salt selected from the group consisting of lithium tetrafluoroborate ($LiBF_4$), lithium hexafluoroarsenate ($LiAsF_6$), lithium perchlorate ($LiClO_4$), lithium trifluoromethanesulfonate ($LiCF_3SO_3$), lithium bistrifluoromethanesulfonate sulfonyl imide ($LiN(SO_2CF_3)_2$), and mixtures thereof.

5. The electrolyte of claim 1, wherein the electrolyte further comprises di-2,2,2-trifluoroethyl carbonate (DTFEC) co-solvent.

6. The electrolyte of claim 5, wherein di-2,2,2-trifluoroethyl carbonate (DTFEC) co-solvent is present in 20-40% by volume.

7. The electrolyte of claim 1, wherein the electrolyte further comprises an electrolyte additive selected from the group consisting of lithium difluoro(oxalato) borate (LiODFB), lithium tetrafluorooxalatophosphate ($LiPF_4(C_2O_4)$), and mixtures thereof.

8. An electrolyte comprising a mixture of:

ethyl methyl carbonate (EMC) or dimethyl carbonate (DMC);

20%-30% by volume of mono-fluoroethylene carbonate (FEC) co-solvent;

a flame retardant additive;

a lithium salt comprising lithium hexafluorophosphate ($LiPF_6$); and, an electrolyte additive, wherein the electrolyte additive comprises lithium bis(oxalato) borate (LiBOB);

wherein the electrolyte comprises 1.0M lithium hexafluorophosphate ($LiPF_6$) in 20% by volume mono-fluoroethylene carbonate (FEC) co-solvent plus 65% to 70% by volume ethyl methyl carbonate (EMC) plus 10% to 15% by volume of the flame retardant additive of triphenyl phosphate (TPhPh/TPP/TPPa) plus 0.10M lithium bis (oxalato) borate (LiBOB).

9. The electrolyte of claim 8, wherein the electrolyte further comprises a flame retardant additive selected from the group consisting of tributyl phosphate (TBP/TBuPh), triethyl phosphate (TEP/TEtPh), bis(2,2,2-trifluoroethyl) methyl phosphonate (BTFEMP/TFMPo), tris(2,2,2-trifluoroethyl) phosphate, diethyl ethylphosphonate, diethyl phenylphosphonate, and mixtures thereof.

10. The electrolyte of claim 8, wherein the electrolyte further comprises a lithium salt selected from the group consisting of lithium tetrafluoroborate ($LiBF_4$), lithium hexafluoroarsenate ($LiAsF_6$), lithium perchlorate ($LiClO_4$), lithium trifluoromethanesulfonate ($LiCF_3SO_3$), lithium bistrifluoromethanesulfonate sulfonyl imide ($LiN(SO_2CF_3)_2$), and mixtures thereof.

11. The electrolyte of claim 8, wherein the electrolyte further comprises di-2,2,2-trifluoroethyl carbonate (DTFEC) co-solvent.

12. The electrolyte of claim 11, wherein di-2,2,2-trifluoroethyl carbonate (DTFEC) co-solvent is present in 20-40% by volume.

13. The electrolyte of claim 8, wherein the electrolyte further comprises an electrolyte additive selected from the group consisting of lithium difluoro(oxalato) borate (LiODFB), lithium tetrafluorooxalatophosphate ($LiPF_4(C_2O_4)$), and mixtures thereof.

* * * * *